US012786446B1

(12) United States Patent
Kim et al.

(10) Patent No.: US 12,786,446 B1
(45) Date of Patent: Nov. 3, 2026

(54) ENCODING AND DECODING METHOD USING TEMPORAL CONTEXT OF NEURAL NETWORK-BASED MULTI-SCALE FEATURE MAPS

(71) Applicants: SAMSUNG ELECTRONICS CO., LTD., Suwon-si (KR); UNIVERSITY-INDUSTRY COOPERATION GROUP OF KYUNG HEE UNIVERSITY, Suwon-si (KR)

(72) Inventors: Seungeon Kim, Suwon-si (KR); Hui Yong Kim, Daejeon (KR); Janghyun Yu, Suwon-si (KR); Yeongwoong Kim, Suwon-si (KR); Dokwan Oh, Suwon-si (KR); Wonhee Lee, Suwon-si (KR)

(73) Assignees: SAMSUNG ELECTRONICS CO., LTD., Suwon-si (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 19/258,082

(22) Filed: Jul. 2, 2025

(30) Foreign Application Priority Data

| | | |
|---|---|---|
| Jul. 3, 2024 | (KR) | 10-2024-0087766 |
| Oct. 18, 2024 | (KR) | 10-2024-0143314 |
| Mar. 18, 2025 | (KR) | 10-2025-0034739 |

(51) Int. Cl.
*H04N 19/31* (2014.01)
*H04N 19/124* (2014.01)
(Continued)

(52) U.S. Cl.
CPC .......... *H04N 19/31* (2014.11); *H04N 19/124* (2014.11); *H04N 19/137* (2014.11);
(Continued)

(58) Field of Classification Search
None
See application file for complete search history.

(56) References Cited

U.S. PATENT DOCUMENTS

| | | | | |
|---|---|---|---|---|
| 9,497,460 | B2 * | 11/2016 | Tanaka | H04N 19/61 |
| 11,544,881 | B1 | 1/2023 | Finlay et al. | |

(Continued)

FOREIGN PATENT DOCUMENTS

| | | | |
|---|---|---|---|
| CN | 115278262 | A | 11/2022 |
| CN | 115529457 | A | 12/2022 |
| WO | 2023 245460 | A1 | 12/2023 |

OTHER PUBLICATIONS

Dailan He et al., "ELIC: Efficient Learned Image Compression with Unevenly Grouped Space-channel Contextual Adaptive Coding", 2022 IEEE/CVF Conference on Computer Vision and Pattern Recognition (CVPR), 2022, pp. 5718-5727 (10 pages total).

(Continued)

*Primary Examiner* — Talha M Nawaz
(74) *Attorney, Agent, or Firm* — Sughrue Mion, PLLC

(57) ABSTRACT

An encoding method includes generating a current reduced feature map by reducing a dimension of a current multilayer feature map, generating a scaled current reduced feature map by performing channel-wise scaling on the current reduced feature map, extracting prior information based on the scaled current reduced feature map, acquiring a scaled previous reduced feature map, extracting a temporal context based on the prior information and the scaled previous reduced feature map, estimating a probability distribution of the current reduced feature map based on the temporal context, and
(Continued)

encoding the current reduced feature map based on the probability distribution.

20 Claims, 40 Drawing Sheets

(51) Int. Cl.

| | |
|---|---|
| ***H04N 19/137*** | (2014.01) |
| ***H04N 19/187*** | (2014.01) |
| ***H04N 19/33*** | (2014.01) |
| ***H04N 19/42*** | (2014.01) |

(52) U.S. Cl.

CPC ........... *H04N 19/187* (2014.11); *H04N 19/33* (2014.11); *H04N 19/42* (2014.11)

(56) References Cited

U.S. PATENT DOCUMENTS

| | | | | |
|---|---|---|---|---|
| 11,743,486 | B2 * | 8/2023 | Lim | H04N 19/52 375/240.12 |
| 11,889,084 | B2 * | 1/2024 | Jang | H04N 19/52 |
| 11,936,866 | B2 | 3/2024 | Finlay et al. | |
| 12,526,420 | B2 * | 1/2026 | Galpin | H04N 19/13 |
| 2019/0258925 | A1 * | 8/2019 | Li | G06F 16/583 |
| 2024/0146934 | A1 | 5/2024 | Kwong et al. | |
| 2024/0146938 | A1 | 5/2024 | Zou et al. | |
| 2025/0056024 | A1 | 2/2025 | Kim et al. | |
| 2026/0161330 | A1 * | 6/2026 | Huang | G06F 3/08 |

OTHER PUBLICATIONS

Johannes Balle et al., “Variational image compression with a scale hyperprior”, ICLR 2018, arXiv:1802.01436v2 [eess.IV], May 1, 2018, pp. 1-23 (23 pages total).

David Minnen et al., “Joint Autoregressive and Hierarchical Priors for Learned Image Compression”, 32nd Conference on Neural Information Processing Systems (NeurIPS 2018), pp. 1-10 (10 pages total).

“Algorithm Description of FCTM”, WG04, MPEG Video Coding, ISO/IEC JTC 1/SC 29/WG 04 N0498, Oct. 2023, pp. 1-11 (12 pages total).

Ze Cui et al., “Asymmetric Grained Deep Image Compression With Continuous Rate Adaptation”, CVPR, 2021, pp. 10532-10541 (10 pages total).

Zhihao Hu et al., “FVC: A New Framework towards Deep Video Compression in Feature Space,” 2021 IEEE/CVF Conference on Computer Vision and Pattern Recognition (CVPR), 2021, pp. 1502-1511 (10 pages total).

Jifeng Dai et al., “Deformable convolutional networks”, IEEE/ICCV, 2017, pp. 764-773 (10 pages total), https://github.com/msracver/Deformable-ConvNets.

David Minnen et al., “Channel-wise autoregressive entropy models for learned image compression”, arXiv:2007.08739v1 [eess.IV], Jul. 17, 2020, pp. 1-16 (16 pages total).

Dailan He et al., “Checkerboard Context Model for Efficient Learned Image Compression”, 2021 IEEE/CVF Conference on Computer Vision and Pattern Recognition (CVPR), 2021, pp. 14771-14780 (10 pages total).

Yichen Qian et al., “Entroformer: A Transformer-based Entropy Model for Learned Image Compression”, arXiv:2202.05492v2 [eess.IV] Mar. 14, 2022, pp. 1-14 (14 pages total).

Jiayu Yang et al., “Learned Video Compression with Adaptive Temporal Prior and Decoded Motion-aided Quality Enhancement”, ACM Transactions on Multimedia Computing, Communications and Applications, vol. 20, No. 8, Article No. 238, Jun. 2024, pp. 1-21, DOI: 10.1145/3661824, XP059523696.

Janghyun Yu et al., “[FCM] CE3.1: Results on L-MSFC-v2 extension for inter coding”, ISO/IEC JTC 1/SC 29/WG 4, MPEG No. m68881, Jul. 2024, 11 pages, XP030322478.

Communication dated Dec. 4, 2025, issued by the European Patent Office in European Application No. 25187274.3.

* cited by examiner

210

ENCODING AND DECODING METHOD USING TEMPORAL CONTEXT OF NEURAL NETWORK-BASED MULTI-SCALE FEATURE MAPS

CROSS-REFERENCE TO RELATED APPLICATIONS

This application claims priority under 35 U.S.C. § 119 to Korean Patent Application No. 10-2024-0087766, filed on Jul. 3, 2024, Korean Patent Application No. 10-2024-0143314, filed on Oct. 18, 2024, and Korean Patent Application No. 10-2025-0034739, filed on Mar. 18, 2025 in the Korean Intellectual Property Office, the disclosures of which are incorporated by reference herein in their entireties.

BACKGROUND

1. Field

The present disclosure relates generally to neural networks, and more particularly, to an encoding and decoding method using a temporal context of a neural network-based multi-scale feature map.

2. Description of Related Art

Recently, advancements in machine vision and image processing techniques may have been implement using artificial neural networks (ANNs). For example, these machine vision and image processing techniques may exhibit a relatively high accuracy and/or performance in various tasks such as, but not limited to, object recognition, tracking, and segmentation, for which using multi-scale (or multilayer) feature maps may be typically used. The multilayer feature maps may include feature information of various resolutions extracted from input images from respective layers, which may enable machine learning models to perform analyses that may be more refined than related machine learning models.

However, as these multilayer feature maps may include high-dimensional data, efficiently processing and/or transmitting the data associated with the multilayer feature maps may be challenging. Related image compression techniques may focus on data compression using the spatial redundancy of natural images, however, multilayer feature maps may be different from general images with respect to their characteristics and/or structures. Consequently, the related image compression techniques may not be effective when applied to the multilayer feature maps, and thus, may require new encoding and/or decoding techniques.

The above information is presented as background information only to assist with an understanding of the present disclosure. No determination has been made, and no assertion is made, as to whether any of the above might be applicable as related art with regard to the present disclosure.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

According to an aspect of the present disclosure, an encoding method includes generating a current reduced feature map by reducing a dimension of a current multilayer feature map, generating a scaled current reduced feature map by performing channel-wise scaling on the current reduced feature map, extracting prior information based on the scaled current reduced feature map, acquiring a scaled previous reduced feature map, extracting a temporal context based on the prior information and the scaled previous reduced feature map, estimating a probability distribution of the current reduced feature map based on the temporal context, and encoding the current reduced feature map based on the probability distribution.

The acquiring of the scaled previous reduced feature map may include acquiring a previous reduced feature map from a buffer memory, and acquiring the scaled previous reduced feature map by performing channel-wise scaling on the previous reduced feature map.

The acquiring of the scaled previous reduced feature map may include acquiring the scaled previous reduced feature map from a buffer memory.

The extracting of the prior information may include extracting the prior information based on the scaled current reduced feature map and the scaled previous reduced feature map.

The encoding method may further include acquiring a first scaled previous reduced feature map by performing channel-wise scaling on a previous reduced feature map, based on a first scaling parameter, and acquiring a second scaled previous reduced feature map by performing channel-wise scaling on the previous reduced feature map, based on a second scaling parameter. The extracting of the temporal context may include extracting the temporal context based on the prior information and the first scaled previous reduced feature map. The extracting of the prior information may include extracting the prior information based on the scaled current reduced feature map and the second scaled previous reduced feature map.

The extracting of the temporal context may further include extracting an offset based on the prior information, and extracting the temporal context based on the offset and the scaled previous reduced feature map.

The generating of the current reduced feature map may include generating the current reduced feature map based on the current multilayer feature map and the scaled previous reduced feature map.

The generating of the current reduced feature map may include generating an intermediate latent feature map by reducing the current multilayer feature map, and generating the current reduced feature map based on the intermediate latent feature map and the scaled previous reduced feature map.

The generating of the current reduced feature map may include concatenating, in a second reduction operation, the intermediate latent feature map and the scaled previous reduced feature map to generate a concatenated feature map. The generating of the scaled current reduced feature map may include performing channel-wise scaling on the concatenated feature map to generate the current reduced feature map.

The encoding method may further include generating a quantized reduced feature map by quantizing the current reduced feature map. The extracting of the prior information may include extracting the prior information based on at least one of the scaled current reduced feature map or the quantized reduced feature map.

The encoding method may further include storing the quantized reduced feature map in a buffer memory. The acquiring of the scaled previous reduced feature map may include acquiring a previously quantized reduced feature map from the buffer memory.

The encoding method may further include generating quantized prior information by quantizing the prior information. The extracting of the temporal context may include extracting the temporal context based on the quantized prior information and the scaled previous reduced feature map.

The encoding method may further include extracting a prior context based on the prior information. The estimating of the probability distribution may include estimating the probability distribution based on the temporal context and the prior context.

The encoding method may further include extracting a spatial context based on the scaled current reduced feature map. The estimating of the probability distribution may include estimating the probability distribution based on the temporal context, the prior context, and the spatial context.

The encoding method may further include extracting a channel context based on the scaled current reduced feature map. The estimating of the probability distribution may include estimating the probability distribution based on the temporal context, the prior context, and the channel context.

According to an aspect of the present disclosure, a decoding method includes receiving an input bitstream including information about a scaled current reduced feature map and prior information, acquiring decoded prior information by decoding the input bitstream, acquiring a scaled previous reduced feature map, extracting a temporal context based on the decoded prior information and the scaled previous reduced feature map, estimating a probability distribution of the scaled current reduced feature map, based on the temporal context, acquiring a decoded scaled current reduced feature map by decoding the input bitstream, based on the probability distribution, reconstructing a current reduced feature map by performing channel-wise scaling on the decoded scaled current reduced feature map, and generating a current multilayer feature map by reconstructing the reconstructed current reduced feature map.

The acquiring of the scaled previous reduced feature map may include acquiring the scaled previous reduced feature map from a buffer memory.

The extracting of the temporal context may include extracting the temporal context based on the decoded prior information and the scaled previous reduced feature map.

The extracting of the temporal context may include extracting an offset based on the decoded prior information, and extracting the temporal context based on the offset and the scaled previous reduced feature map.

According to an aspect of the present disclosure, an electronic device includes at least one processor including processing circuitry, and a memory storing instructions. The instructions, when executed individually or collectively by the at least one processor, cause the electronic device to receive an input bitstream including information about a scaled current reduced feature map and prior information, acquire decoded prior information by decoding the input bitstream, acquire a scaled previous reduced feature map, extract a temporal context based on the decoded prior information and the scaled previous reduced feature map, estimate a probability distribution of the scaled current reduced feature map, based on the temporal context, acquire a decoded scaled current reduced feature map by decoding the input bitstream, based on the probability distribution, reconstruct a current reduced feature map by performing channel-wise scaling on the decoded scaled current reduced feature map, and generate a current multilayer feature map by reconstructing the decoded scaled current reduced feature map.

BRIEF DESCRIPTION OF THE DRAWINGS

The above and/or other aspects, features, and advantages of certain embodiments of the present disclosure may be more apparent from the following description taken in conjunction with the accompanying drawings, in which.

DETAILED DESCRIPTION

Figure 1A:
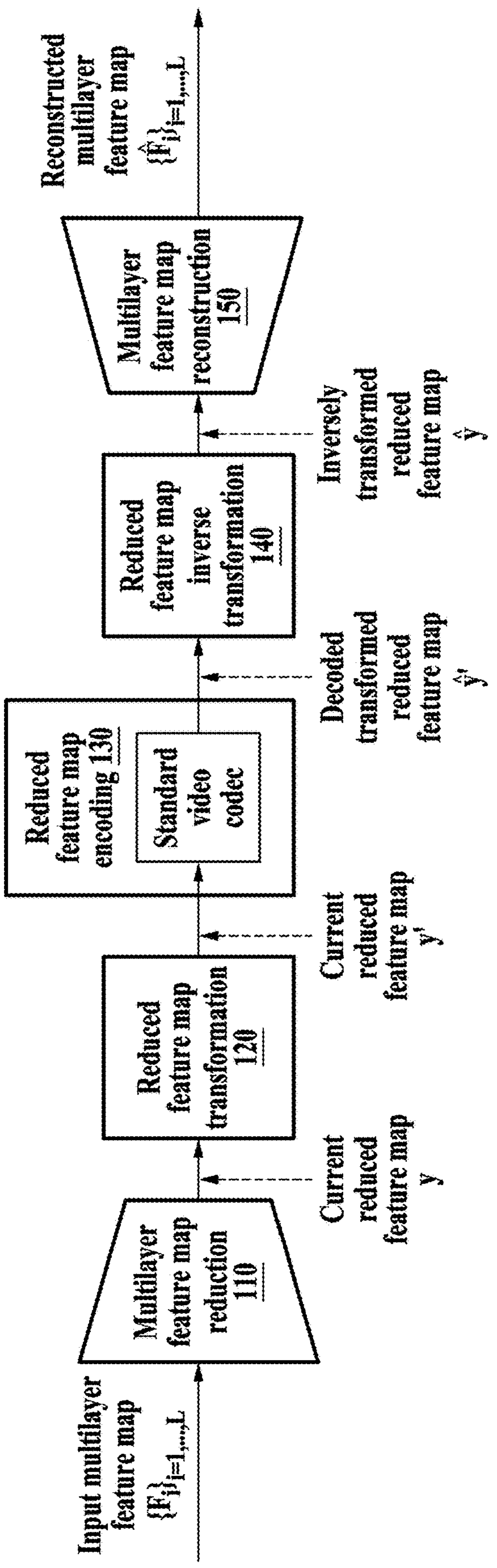
FIG. 1A is a diagram illustrating a method of encoding a multilayer feature map using a standard video codec, according to an embodiment.

The following structural or functional descriptions of example embodiments are provided to merely describe the example embodiments, and the scope of the example embodiments is not limited to the descriptions provided in the disclosure. Various changes and modifications may be made thereto by those of ordinary skill in the art.

Although terms "first," "second," or the like are used to explain various components, the components are not limited to the terms. These terms should be used only to distinguish one component from another component. For example, a "first" component may be referred to as a "second" component, or similarly, the "second" component may be referred to as the "first" component within the scope of the right according to the concept of the present disclosure.

It is to be understood that when a component is referred to as being "connected to," "coupled to," or "joined to" another component, the component may be directly connected or coupled to the other component or intervening components may be present therebetween. Also, when a component is described as being "directly connected to," "directly coupled to," or "directly joined to" another component, there may be no other elements intervening therebetween. Likewise, expressions such as, for example, "between" and "immediately between" and "adjacent to" and "immediately adjacent to" may also be construed as described in the foregoing.

As used herein, the singular forms are intended to include the plural forms as well, unless the context clearly indicates otherwise. It may be further understood that terms such as, but not limited to, "comprises," "comprising," "includes," and/or "including," as used herein, may specify the presence of stated features, integers, steps, operations, elements, components or a combination thereof, but may not preclude the presence and/or addition of one or more other features, integers, steps, operations, elements, components, and/or groups thereof.

Unless otherwise defined, all terms used herein including technical or scientific terms have the same meanings as those generally understood by one of ordinary skill in the art. Terms defined in dictionaries generally used should be construed to have meanings matching with contextual meanings in the related field and are not to be construed as an ideal or excessively formal meaning unless otherwise defined herein.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units, parts, or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

The embodiments described herein may be implemented in various forms of products including, for example, a personal computer (PC), a laptop computer, a tablet computer, a smartphone, a television (TV), a smart home appliance, an intelligent vehicle, a kiosk, a wearable device, an Internet of Things (IoT) device, or the like. Hereinafter, the embodiments are described with reference to the accompanying drawings. When describing the embodiments with reference to the accompanying drawings, like reference numerals refer to like components and a repeated description related thereto may be omitted for the sake of brevity.

Artificial neural networks (ANNs) may be increasingly used to perform machine tasks such as, but not limited to, various machine vision tasks including, for example, object classification, object recognition, object detection, object segmentation, and object tracking, and various image processing tasks including, for example, super-resolution (SR) and frame interpolation. An ANN model that performs a machine task may include two parts: a feature map extraction part that may extract features from input data or input images, and a machine task execution part that may perform a specific machine task based on the extracted features. In such a case, when an input is provided in the form of an image, an extracted feature may be referred to as a feature map. Although the term feature map may be used to describe various embodiments provided herein, a description thereof may also be applied to features that are not in the form of a map. According to an embodiment, a multilayer feature map may include a feature map in the structure of a pyramid.

In a case where an input is an image, the shape of a feature map may be represented as a two-dimensional (2D) arrangement of width×height, and since the feature map of one layer may include multiple channels, the feature map of each layer may be represented as a three-dimensional (3D) arrangement having the size of width size×height size×number of channels. That is, when a feature map of k layers is FR and Fk may be represented as a 3D arrangement $F_k[x][y][c]$ including extracted feature values, where x and y may denote a horizontal position and a vertical position of a feature value, respectively, and c may denote a channel index. For example, according to an embodiment, a multilayer feature map Fx may include a multilayer feature map ck or multilayer feature maps pk extracted from a feature pyramid network (FPN). A multilayer feature map may have a pyramid structure with multiple layers of feature maps with different resolutions. As a feature map may belong to a higher layer, the resolution of the feature map may decrease, and as a feature map may belong to a lower layer, the resolution of the feature map may increase. In addition, feature maps in the same layer may have the same resolution. The same may apply to the FPN, and as a layer is deeper, the horizontal and vertical size (e.g., width and height) of a feature map becomes smaller than the size of an input image. However, in general, a relationship between a layer index k and a resolution of a feature map Fx may not be fixed, and therefore the horizontal and vertical size (e.g., width and height) of the feature map may become smaller or larger than the size of the input image as the layer index k increases, depending on a type of a multilayer feature map.

As the machine task may be used in various devices (e.g., mobile devices, servers, or the like), the feature map extraction part and the task execution part may not be executed or performed in the same device but in different devices. For example, the feature map extraction part may reside (or be executed) on a mobile device, however, the task execution part for a specific task such as, but not limited to, object segmentation, disparity map estimation, or image reconstruction (or restoration) may reside (or be executed) on a cloud server. In such a case, a feature map extracted from the mobile device may be transmitted to the server, and a result of performing a task by the server may be transmitted back to the mobile device. In a case where the feature map extraction part and the task execution part are separated as described above, an extracted feature map may need to be transmitted to the task execution part, and feature map encoding may be required to minimize the amount of data of the feature map to be transmitted or stored while minimizing degradation of the task performance.

A multilayer feature map may include feature maps of multiple layers with different spatial resolutions, and a feature map of each layer may also have multiple channels and may thus have a relatively high dimension compared to a related image/video. Therefore, a related multilayer feature map encoding method may include a feature reduction (or multilayer feature map reduction) part, a feature conversion (or reduced feature map transformation) part, and a feature inner encoding (or reduced feature map encoding) part.

The multilayer feature map reduction part may be used to dramatically reduce the number of dimensions of a multilayer feature map. For example, the multilayer feature map reduction part may perform, using a multilayer feature map $\{F_k\}_{k=1, \ldots, L}$ as an input, at least one of the following processes: 1) reducing a temporal or spatial resolution of a feature map of each layer of the multilayer feature map, 2) reducing the number of layers by fusing feature maps of layers of the multilayer feature map, and 3) compressing and representing a feature map of each layer of the multilayer feature map or a fused feature map between the layers into a smaller number of channels, and may output a reduced feature map y. The processes 1), 2), and 3) may be performed independently, however, two (2) or more specific processes may be combined into a single process.

The reduced feature map transformation part may perform, using the reduced feature map y as an input, at least one of the following processes: 1) rearranging the dimensions of the reduced feature map and 2) performing quantization on component values of the reduced feature map, and may output a transformed (or converted) feature map $y_c$. The reduced feature map transformation part may be used to transform a format of the reduced feature map such that it is to be used as an input to the reduced feature map encoding part or to improve the encoding efficiency of a reduced feature map encoding and decoding part. However, the reduced feature map transformation part may be omitted depending on a type of the reduced feature map encoding part.

The reduced feature map encoding part may use the transformed feature map $y_c$ as an input and output an encoded bitstream. The reduced feature map encoding part may be performed by an encoder of a standard video codec, such as, for example, high efficiency video coding (HEVC), versatile video coding (VVC), or the like. Alternatively or additionally, the reduced feature map encoding part may be performed via an ANN-based entropy encoding method. A related method of encoding a multilayer feature map using the standard video codec is described with reference to FIG. 1A, and a related method of encoding a multilayer feature map using the ANN-based entropy encoding method is described with reference to FIG. 1B.

A multilayer feature map decoding method to reconstruct (or restore) a multilayer feature map from a bitstream output by the multilayer feature map encoding method described above may include the following parts: 1) a feature inner decoding (or reduced feature map decoding) part, 2) a feature inverse conversion (or reduced feature map inverse transformation) part, and 3) a feature restoration (or multilayer feature map reconstruction) part.

The reduced feature map decoding part may reconstruct, using an encoded bitstream as an input, a transformed (or converted) feature map $\hat{y}_c$. The reduced feature map decoding part may be performed by a decoder of the standard video codec such as HEVC and VVC. The reduced feature map decoding part may be performed using an ANN-based entropy decoding method.

The reduced feature map inverse transformation part, which may an inverse process of the reduced feature map transformation part of the multilayer feature map encoding method, may perform, using the transformed feature map $\hat{y}_c$ as an input, at least one of the following processes: rearranging the dimensions of the reduced feature map and performing inverse quantization on component values of the reduced feature map, and may reconstruct a reduced feature map y. However, the reduced feature map inverse transformation part may be omitted depending on a type of the reduced feature map decoding part.

The multilayer feature map reconstruction part may be used to reconstruct (or restore) the original multilayer feature map from information embedded in the reduced feature map. The multilayer feature map reconstruction part may perform, using the reduced feature map § as an input, at least one of the following processes: 1) reconstructing each layer of the original multilayer feature map from the reduced feature map, 2) reconstructing a temporal or spatial resolution of the reduced feature map or a feature map of a reconstructed layer, and 3) reconstructing the number of channels of the reduced feature map or the feature map of the reconstructed layer, and may reconstruct the multilayer feature map $\{\hat{F}\}_{k=1,\ldots,L}$. The processes 1), 2), and 3) may be performed independently, however, two (2) or more specific processes may be combined into a single process.

FIG. 1A is a diagram illustrating a method of encoding a multilayer feature map using a standard video codec, according to an embodiment.

An encoding/decoding system shown in FIG. 1A may include a multilayer feature map reduction part 110, a reduced feature map transformation part 120, a reduced feature map encoding part 130, a reduced feature map inverse transformation part 140, and a multilayer feature map reconstruction part 150 to process an input multilayer feature map.

The multilayer feature map reduction part 110 may receive an input multilayer feature map and reduce layers with different resolutions to generate a current reduced feature map y. This reduced feature map may have a reduced amount of data with spatial and channel dimensions reduced. The reduced feature map may be transformed into a format suitable for a standard video codec via the reduced feature map transformation part 120. This transformation process may reconfigure the format of the feature map into a format that is to be processed by the standard codec.

The reduced feature map encoding part 130 may encode the transformed reduced feature map using the standard video codec. The reduced feature map encoding part 130 may use a high-efficiency video codec, such as, but not limited to, HEVC or VVC, by which data may be transformed into a bitstream, improving the compression efficiency. The encoded bitstream may be transformed into a format to be stored or transmitted.

The reduced feature map may be reconstructed back into its original format via the reduced feature map inverse transformation part 140. In such a process, the encoded bitstream may be transformed back into a reconstructed reduced feature map. Additionally, the multilayer feature map reconstruction part 150 may reconstruct the original multilayer feature map based on the reconstructed reduced feature map. This may enable the reuse of the original multilayer feature map required for the machine or image processing tasks.

However, this method may have some limitations. For example, when using the standard video codec, there may be an issue in that learning and optimization may not be performed along with multilayer feature map reduction and reconstruction parts based on an ANN, which may prevent obtaining an optimal performance in the encoding process.

Figure 1B:
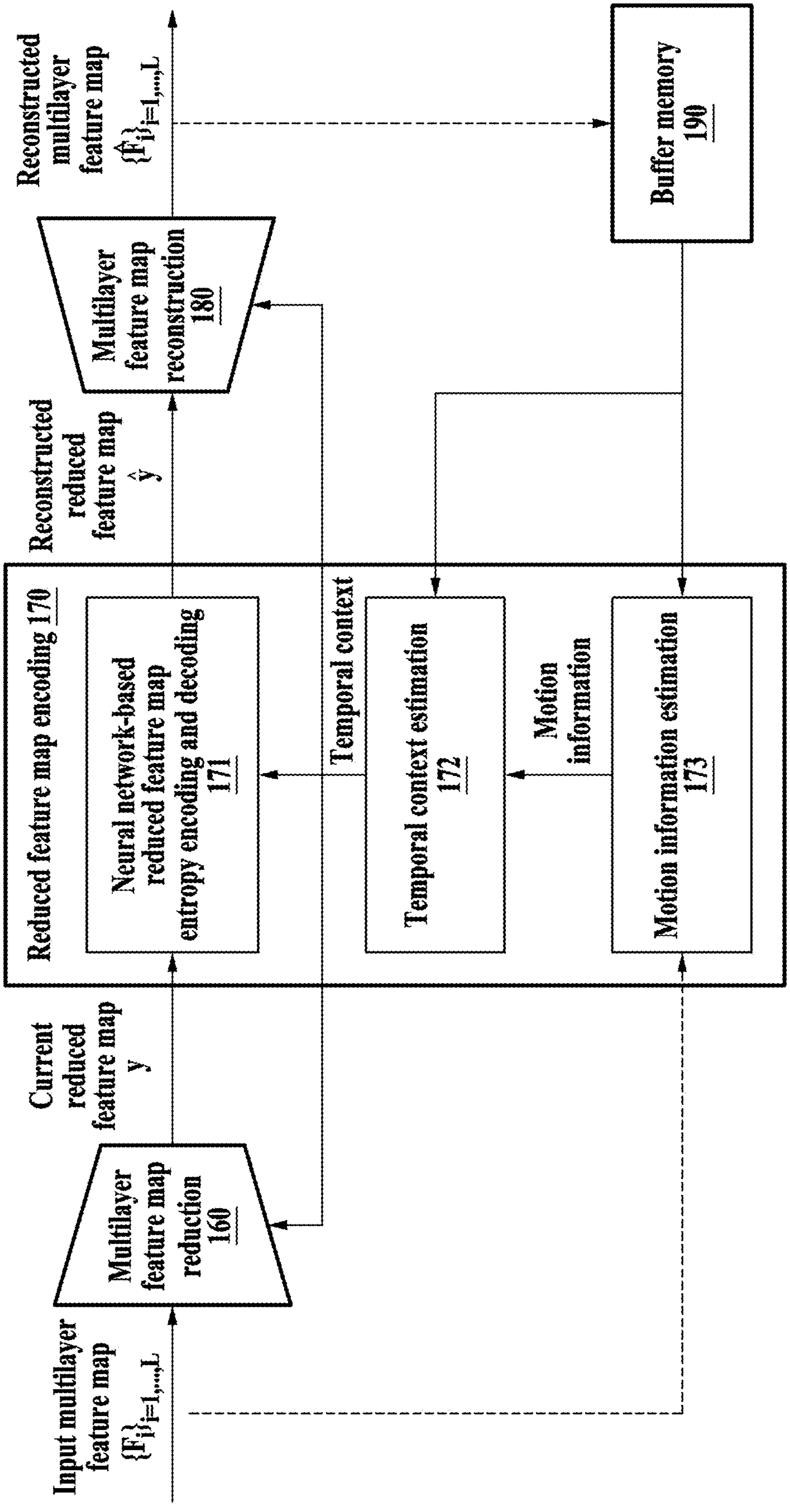
FIG. 1B is a diagram illustrating a method of performing encoding based on a temporal context extracted based on motion information between a previously reconstructed multilayer feature map and a multilayer feature map that is subject to current encoding, according to an embodiment.

FIG. 1B is a diagram illustrating a method of performing encoding based on a temporal context extracted based on motion information between a previously reconstructed multilayer feature map and a multilayer feature map that is subject to current encoding, according to an embodiment.

Referring to FIG. 1B, an encoding/decoding system may include a multilayer feature map reduction part 160, a reduced feature map encoding part 170, and a multilayer feature map reconstruction part 180. The reduced feature map encoding part 170 may include a neural network-based reduced feature map entropy encoding and decoding part 171, a temporal context extraction part 172, and a motion information estimation part 173.

The motion information estimation part 173 may estimate motion information between a previously reconstructed multilayer feature map and a current multilayer feature map that is subject to current encoding, and the temporal context extraction part 172 may extract a temporal context based on the motion information. The neural network-based reduced feature map entropy encoding and decoding part 171 may perform encoding and decoding based on the temporal context. A reconstructed feature map may be stored in a buffer memory 190 and may be used for subsequent processing.

Although the encoding/decoding system of FIG. 1B may use a temporal context to more accurately estimate a probability distribution of a current feature map that is subject to current encoding, the process of extracting motion information between multilayer feature maps may be complex and challenging. In particular, unlike estimating motion information between natural images, extracting the motion information between the multilayer feature maps and the temporal context may degrade the accuracy.

Figure 1C:
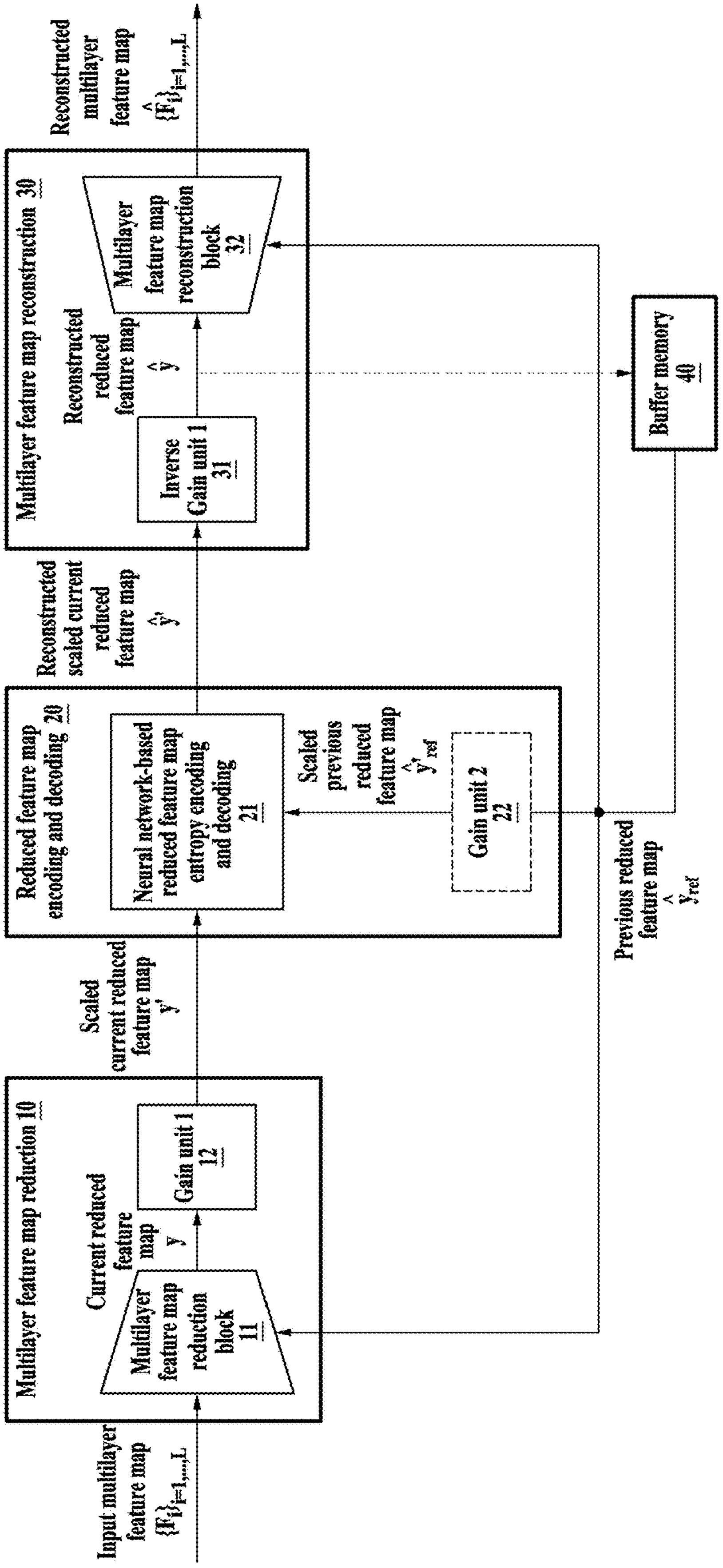
FIGS. 1C and 1D are diagrams illustrating a method of performing encoding of a multilayer feature map based on a previous reduced feature map, according to an embodiment.
Figure 1D:
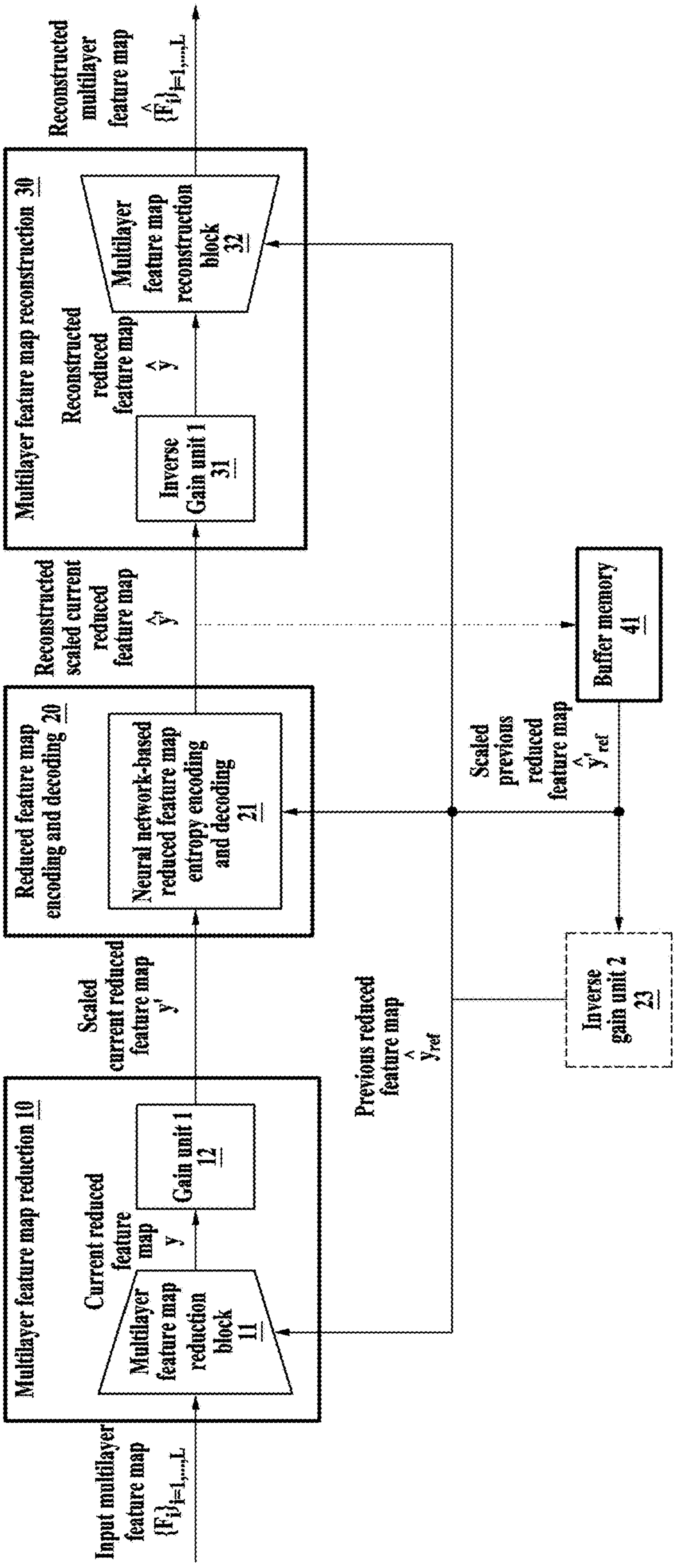

FIGS. 1C and 1D are diagrams illustrating a method of performing encoding of a multilayer feature map based on a previous reduced feature map, according to an embodiment.

Referring to FIGS. 1C and 1D, an encoding/decoding system according to an embodiment may include a multilayer feature map reduction part 10, a reduced feature map encoding and decoding part 20, and a multilayer feature map reconstruction part 30. The multilayer feature map reduction part 10 may include a multilayer feature map reduction block 11, the reduced feature map encoding and decoding part 20 may include neural network-based reduced feature map entropy encoding and decoding part 21, and the multilayer feature map reconstruction part 30 may include a multilayer feature map reconstruction block 32. However, not all the components shown are essential components. An encoding/decoding system may be implemented with more components than the illustrated components, or may be implemented with fewer components.

The number and arrangement of components of the encoding/decoding system shown in FIGS. 1C and 1D are provided as an example. In practice, there may be additional components, fewer components, different components, or differently arranged components than those shown in FIGS. 1C and 1D. Furthermore, two or more components shown in FIG. 1C or 1D may be implemented within a single component, or a single component shown in FIG. 1C or 1D may be implemented as multiple, distributed components. Alternatively or additionally, a set of (one or more) components shown in FIG. 1C or 1D may be integrated with each other, and/or may be implemented as an integrated circuit, as software, and/or a combination of circuits and software.

As described below, the neural network-based reduced feature map entropy encoding and decoding part 21 of one embodiment may process data in a scaled domain. However, an input of the multilayer feature map reduction block 11 may be data (e.g., an input multilayer feature map) of an unscaled domain. Accordingly, the multilayer feature map reduction part 10 of one embodiment may receive unscaled data (e.g., current reduced feature map y) through a first gain unit 12 and output scaled data (e.g., channel-wise scaled current reduced feature map y').

In addition, while the neural network-based reduced feature map entropy encoding and decoding part 21 outputs data of a scaled domain, the multilayer feature map reconstruction block 32 may receive data of an unscaled domain as input. Accordingly, the multilayer feature map reconstruction part 30 of one embodiment may receive scaled data (e.g., reconstructed scaled current reduced feature map) through a first inverse gain unit 31 and output unscaled data (e.g., reconstructed current reduced feature map).

In addition, the neural network-based reduced feature map entropy encoding and decoding part 21 of one embodiment may use a previous reduced feature map in the encoding and decoding process (e.g., a prior information extraction process or a temporal context extraction process). However, since the neural network-based reduced feature map entropy encoding and decoding part 21 may only process data in a scaled domain, the previous reduced feature map may also require scaling.

Referring to FIG. 1C, the reduced feature map encoding and decoding part 20 according to an embodiment may further include a second gain unit 22. In particular, for each step, a reduced feature map (e.g., a reduced feature map reconstructed through the first inverse gain unit 31) may be stored in a buffer memory 40, and a reduced feature map (a previous reduced feature map) of a previous step stored in the buffer memory 40 may be scaled through the second gain unit 22 and input to the neural network-based reduced feature map entropy encoding and decoding part 21.

Alternatively, referring to FIG. 1D, a scaled reduced feature map (e.g., a scaled current reduced feature map reconstructed through the neural network-based reduced feature map entropy encoding and decoding part 21) may be stored in a buffer memory 41 for each step, and a scaled reduced feature map (e.g., a scaled previous reduced feature map) of a previous step stored in the buffer memory 41 may be input to the neural network-based reduced feature map entropy encoding and decoding part 21. For example, a scaled version of a previously generated reduced feature map (e.g., a version from an earlier step in the process) may be stored in buffer memory 41, and this stored feature map may then be directly used as an input to the neural network-based reduced feature map entropy encoding and decoding part 21. The scaling refers to resizing or otherwise adjusting the feature map (e.g., in resolution or amplitude), and no further preprocessing or transformation is needed before the neural network processes it.

The multilayer feature map reduction block 11 and the multilayer feature map reconstruction block 32 may use the previous reduced feature map in the feature map reduction process and the feature map reconstruction process. However, since the multilayer feature map reduction block 11 and the multilayer feature map reconstruction block 32 may only process data of an unscaled domain, the scaled previous reduced feature map stored in the buffer memory 41 may not be used as is. Consequently, the scaled previous reduced feature map stored in the buffer memory 41 may be reconstructed to the previous reduced feature map by a second inverse gain unit 23, and the reconstructed previous reduced feature map may be input to the multilayer feature map reduction block 11 and the multilayer feature map reconstruction block 32.

In the following description, for the sake of brevity, an embodiment referring to FIG. 1C is described, however, embodiments of the present disclosure may not be limited thereto. The encoding method and the decoding method, according to an embodiment, may also include an embodiment referring to FIG. 1D, and the technical idea described below may be applied to the embodiment referring to FIG. 1D as well as to the embodiment referring to FIG. 1C. Therefore, the technical idea described below is not limited to a particular embodiment and may be variously modified and applied.

When the reduced feature map encoding and decoding part 20 performs an encoding operation, the reduced feature map encoding and decoding part 20 may operate as an encoder together with the multilayer feature map reduction part 10. Alternatively or additionally, when the reduced feature map encoding and decoding part 20 performs a decoding operation, the reduced feature map encoding and decoding part 20 may operate as a decoder together with the multilayer feature map reconstruction part 30.

The multilayer feature map reduction block 11 of one embodiment may sequentially fuse and transform a multilayer feature map to output a current reduced feature map y. The first gain unit 12 may receive a current reduced feature map as input and output a channel-wise scaled current reduced feature map y'. The first gain unit 12 may adjust information of a specific channel of the current reduced feature map by multiplying a scaling factor learned for each channel. The first gain unit 12 may play a role in increasing or decreasing the importance of a specific channel, and may enable a neural network to process information more effectively, when compared to a related neural network.

The neural network-based reduced feature map entropy encoding and decoding part 21 may perform encoding and decoding of a scaled current reduced feature map based on a previous reduced feature map $\hat{y}_{ref}$ or a scaled previous reduced feature map $$\hat{y}'_{ref}.$$

By transforming the previous reduced feature map into a scaled previous reduced feature map $$\hat{y}'_{ref}.$$

through the second gain unit 22, the transformed previous reduced feature map may have similar characteristics to a scaled current reduced feature map.

The structure of second gain unit (e.g., the second gain unit 22 of FIG. 1C, or the second gain unit 23 of FIG. 1D) may be substantially similar to and/or the same as the structure of first gain unit 12 used in the multilayer feature map reduction part 10. The structure of second gain unit may have the same weight (e.g., a scale value) of the first gain unit 12 used in the multilayer feature map reduction part 10 for a given scaling factor, or may have different values.

The first inverse gain unit 31 of the multilayer feature map reconstruction part 30 may output a reconstructed reduced feature map ŷ in which channel-wise scaling is corrected through the reconstructed scaled current reduced feature map ŷ'. When the first gain unit 12 of the multilayer feature map reduction block 10 has amplified and/or attenuated a specific channel, the first inverse gain unit 31 may adjust the channel in an opposite manner in order to reconstruct the original feature. The reconstructed reduced feature map may be stored in the buffer memory 40 and may be used for subsequent processing. The multilayer feature map reconstruction block 32 may receive the reconstructed reduced feature map as input and may sequentially generate feature maps of multiple layers.

Figure 2A:
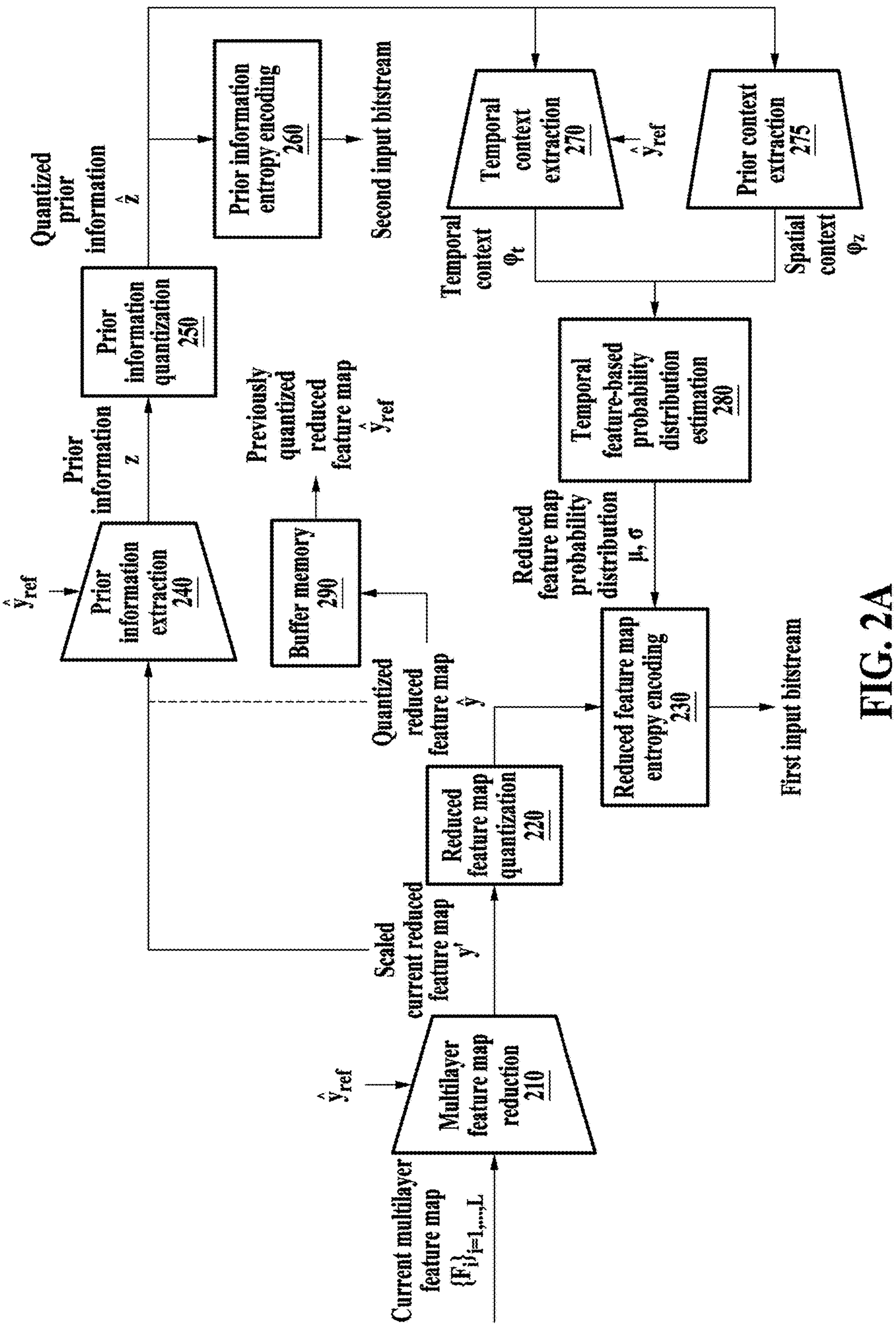
FIG. 2A is a block diagram illustrating an encoder, according to an embodiment.

FIG. 2A is a block diagram illustrating an encoder, according to an embodiment. The description provided with reference to FIG. 1C may be substantially or equally applicable to the description of FIG. 2A.

Referring to FIG. 2A, an encoder of one embodiment may include a multilayer feature map reduction part 210, a reduced feature map quantization part 220, a reduced feature map entropy encoding part 230, a prior information extraction part 240, a prior information quantization part 250, a prior information entropy encoding part 260, a temporal context extraction part 270, a prior context extraction part 275, and a temporal feature-based probability distribution estimation part 280.

The number and arrangement of components of the encoder shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Alternatively or additionally, a set of (one or more) components shown in FIG. 2 may be integrated with each other, and/or may be implemented as an integrated circuit, as software, and/or a combination of circuits and software.

The encoder of one embodiment may use the reduced feature map entropy encoding part 230 that is based on a neural network to encode a reduced feature map, unlike the one described above with reference to FIG. 1A, and may extract a temporal context from a reduced feature map and prior information to estimate a probability distribution of the reduced feature map that is subject to current encoding or decoding, unlike the one described above with reference to FIG. 1B.

The multilayer feature map reduction part 210 of one embodiment may output, using a current multilayer feature map (e.g., $\{F_i\}_{i=1,\ldots,L}$) as an input, a scaled current reduced feature map (e.g., y'). The current multilayer feature map, which is a multilayer feature map to be encoded in a current step or a multilayer feature map that is subject to encoding in a current step, may also be referred to as an input multilayer feature map. The multilayer feature map reduction part 210 may sequentially fuse and transform the multilayer feature map to output the scaled reduced feature map y'. As described with reference to FIG. 1C, the multilayer feature map reduction part 210 may include a multilayer feature map reduction block and a first gain unit, and the multilayer feature map reduction block may use a current multilayer feature map as an input and output a current reduced feature map, and the first gain unit may use the current reduced feature map as an input and output a scaled current reduced feature map. The multilayer feature map reduction part 210 of one embodiment may output the scaled current reduced feature map (e.g., y') by additionally using a previous reduced feature map $\hat{y}_{ref}$.

According to one embodiment, the scaled current reduced feature map y' may be quantized via the reduced feature map quantization part 220. Alternatively or additionally, depending on the embodiment, a reduced feature map y may be quantized via the reduced feature map quantization part 220. A quantized reduced feature map y may refer to a feature map acquired as the dimension of the multilayer feature map is reduced and each feature value is transformed into a discrete value instead of having a continuous value. That is, the quantized reduced feature map y may be a result acquired as values in the original reduced feature map are approximated to discrete values within a limited range through a quantization process. Quantization may refer to a process intended to increase compression efficiency, and may involve reducing the precision or definition of data to reduce the size of input data. For example, feature values that may originally be in a real number range may be transformed into discrete values represented by a fixed bit number through quantization. The quantization may be performed to reduce the size of data while retaining as much important information as possible. Therefore, the quantized reduced feature map may refer to a feature map including discrete values quantized from feature values into a specific bit number with the dimension of the multilayer feature map being reduced, and may be used mainly in encoding and compression processes.

The quantized reduced feature map ŷ acquired by the reduced feature map quantization part 220 may be stored in a buffer memory 290 of the encoder. The quantized reduced feature map ŷ stored in the buffer memory 290 in the current step may be used to encode a subsequent multilayer feature map. This may indicate that a quantized reduced feature map stored in the buffer memory 290 in a previous step (which may be referred to herein as a previously quantized reduced feature map $\hat{y}_{ref}$) may be used for encoding in the current step.

The reduced feature map entropy encoding part 230 of one embodiment may, using the quantized reduced feature map ŷ and a reduced feature map probability distribution (e.g., μ, σ) as an input, encode the quantized reduced feature map to output a bitstream. The bitstream output from the reduced feature map entropy encoding part 230 may be referred to herein as a first bitstream. In this case, entropy encoding (or entropy coding) may refer to a technique used in data compression, which may encode data based on a probability distribution of the data to remove data redundancy and maximize information representation efficiency.

An entropy encoding process may be performed, based on a probability distribution of given data, to minimize the number of bits occupied by the data. This process may start by analyzing the probability distribution of data that is subject to encoding. A probability of each data element occurring may be estimated, and data with a high probability may be transformed into a shorter length of code while data with a low probability may be transformed into a longer length of code. That is, the entropy encoding process may be performed to minimize an average code length of the entire data and potentially reduce a storage space.

First, a pattern of the data that is subject to encoding may be analyzed, and a frequency or probability of occurrence of each data item may be calculated. In this case, a frequently occurring item may be set to be represented by a shorter bit sequence, while an infrequently occurring item may be set to be represented by a longer bit sequence. In such a manner, the overall data length may be reduced.

An encoded result may be output in the form of a bitstream, which may include a minimum amount of information for representing the original data. The bitstream may be configured in a form that may be easily stored and/or transmitted and may include information for reconfiguring compressed data.

The reduced feature map entropy encoding part 230 of one embodiment may receive the quantized reduced feature map y from the reduced feature map quantization part 220, and may receive the reduced feature map probability distribution μ, σ from the temporal feature-based probability distribution estimation part 280.

To improve the encoding performance of the reduced feature map entropy encoding part 230, it may be necessary to acquire a highly accurate reduced feature map probability distribution (e.g., μ, σ). The temporal feature-based probability distribution estimation part 280 of one embodiment may acquire a highly accurate reduced feature map probability distribution μ, σ, using a temporal context $\Phi_t$ generated by the temporal context extraction part 270. The temporal context extraction part 270 of one embodiment may generate the temporal context $\Phi_t$ based on the prior information (or quantized prior information) and the previous reduced feature map $\hat{y}_{ref}$. According to one embodiment, a temporal context may refer to information that reflects therein a temporal correlation between a multilayer feature map that may be subject to current encoding or decoding (e.g., a target to be encoded or decoded in a current step) and a multilayer feature map from a previous step. The temporal context may be used to analyze a change between a previously processed (e.g., encoded or decoded) feature map and a current feature map and may increase the efficiency of information acquired by the analysis in the encoding or decoding process. In particular, in the encoding process, the temporal context may be used to analyze a pattern of change between a previously quantized multilayer feature map and a current multilayer feature map that is subject to current encoding to more accurately estimate a probability distribution of the current feature map. In the decoding process, the temporal context may be used to estimate a probability distribution of a current feature map that is subject to current decoding by referring to a previously decoded feature map. Using this temporal context may reflect data continuity over time, thereby improving the encoding and decoding efficiency when compared to related methods.

According to one embodiment, the previous reduced feature map $\hat{y}_{ref}$ may include a previously quantized input feature map. A previous input feature map used in the encoding process may be a previously quantized input feature map, which may be referred to as an input feature map quantized in a previous step. The previously quantized feature map, which may be past data to be referred to when performing encoding in a current step, may enable efficient encoding based on a difference and change from the current multilayer feature map. The previous reduced feature map $\hat{y}_{ref}$ may be acquired from the buffer memory 290.

To generate the temporal context $\Phi_t$ in the temporal context extraction part 270, the prior information (or the quantized prior information) may be required. The prior information may be generated by the prior information extraction part 240.

The prior information extraction part 240 of one embodiment may extract prior information z from the scaled current reduced feature map y' or the quantized reduced feature map y. The prior information z may be and/or may include additional information used in the encoding and decoding processes, and may provide additional and useful information about data (e.g., the current multilayer feature map) that is subject to current encoding. The prior information may be extracted based primarily on a correlation between previously encoded data (e.g., the previous reduced feature map) and data that is subject to current encoding. The prior information may be input to the encoding system, either quantized or intact, and may play an important role in increasing the compression efficiency of encoded data. In the decoding process, the prior information may be used again to ensure that an encoded bitstream is to be accurately reconstructed.

According to one embodiment, the prior information may be quantized by the prior information quantization part 250 of one embodiment. The prior information may need to be used also for decoding and may therefore need to be transmitted to a decoder. For this purpose, quantized prior information $\hat{z}$ may be encoded by the prior information entropy encoding part 260 and may be transmitted to the decoder. A bitstream output from the prior information entropy encoding part 260 may be referred to as a second bitstream.

The temporal feature-based probability distribution estimation part 280 of one embodiment may estimate the reduced feature map probability distribution, using a prior context $\Phi_z$ in addition to the temporal context $\Phi_z$. The prior context extraction part 275 of one embodiment may generate the prior context $\Phi_z$ based on the prior information (or the quantized prior information). According to one embodiment, the prior context may refer to a context used as additional information to more accurately estimate a probability distribution of a feature map that is subject to current encoding or decoding, which may be generated based on the prior information and used to more accurately predict a pattern of the feature map and used in the encoding or decoding process.

Figure 2B:
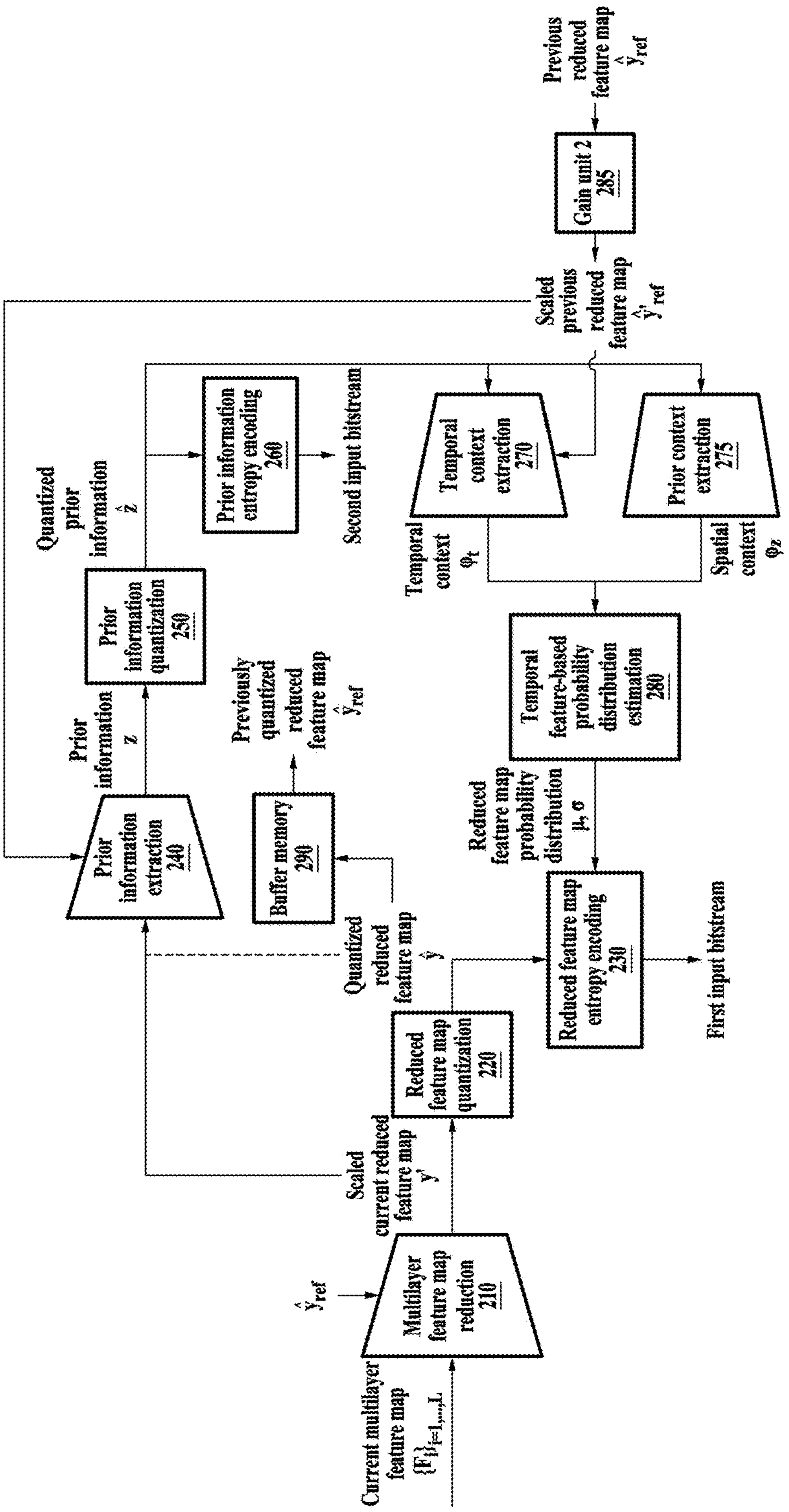
FIG. 2B is a block diagram illustrating an encoder using a scaled previous reduced feature map, according to an embodiment.

FIG. 2B is a block diagram illustrating an encoder using a scaled previous reduced feature map according to an embodiment. The description provided above with reference to FIGS. 1C to 2A may be equally applicable to the description provided below with reference to FIG. 2B.

Referring to FIG. 2B, an encoder of one embodiment may further include a second gain unit 285. The second gain unit 285 may support various bitrates by using a scaling factor q in various ways, thereby adjusting the importance of each channel by applying an additional weight to a previous reduced feature map according to the scaling factor q. The second gain unit 285 may transform a previous reduced feature map $\hat{y}_{ref}$ into a scaled previous reduced feature map $$\hat{y}'_{ref},$$

through the second gain unit 285, such that the scaled previous reduced feature map may have similar characteristics to the scaled current reduced feature map, thereby allowing probability distribution estimation to be more effective. The scaled previous reduced feature map may be used in the prior information extraction part 240 and the temporal context extraction part 270.

Figure 3A:
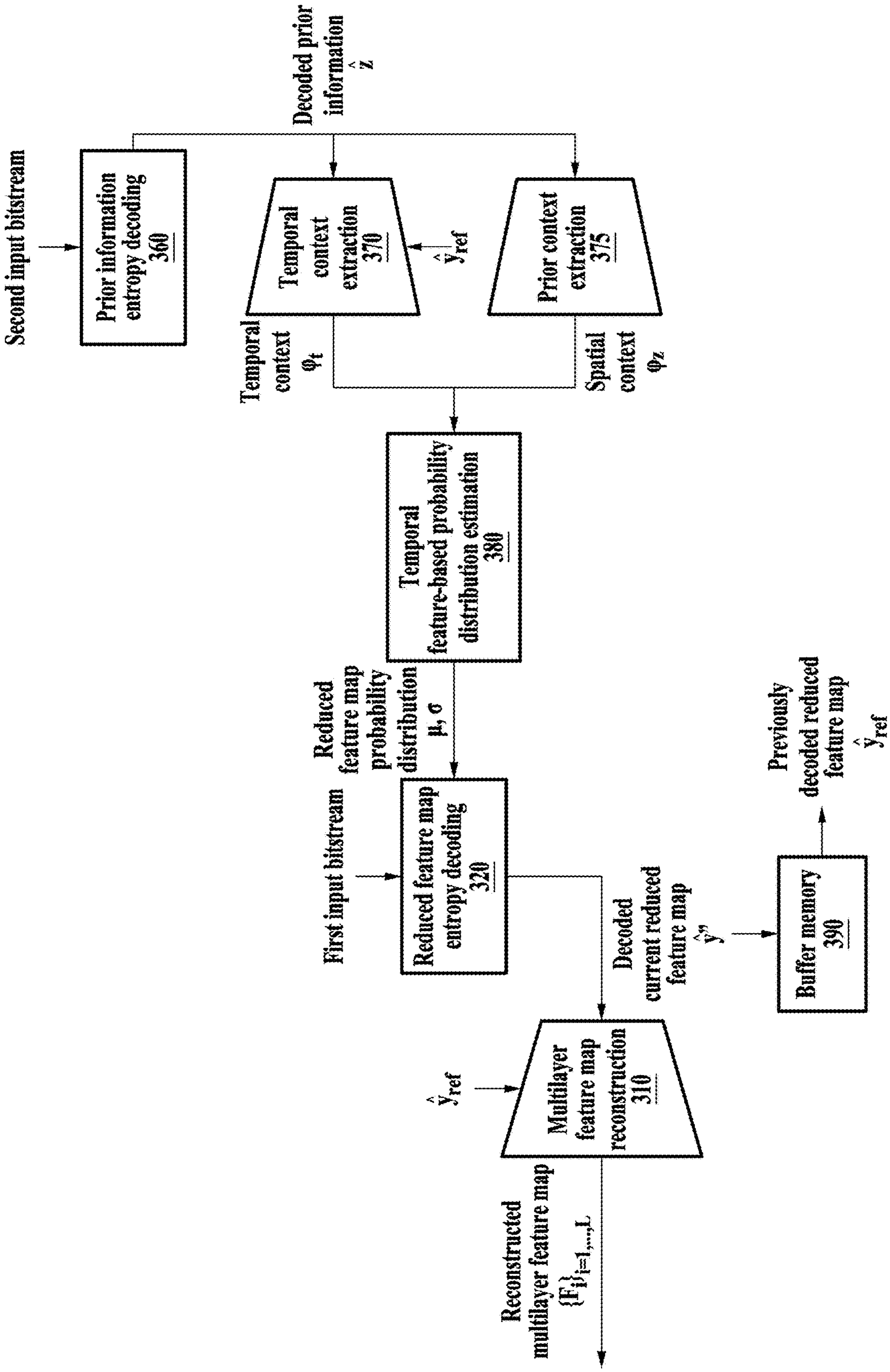
FIG. 3A is a block diagram illustrating a decoder, according to an embodiment.

FIG. 3A is a block diagram illustrating a decoder, according to an embodiment. The description provided with reference to FIGS. 1C to 2B may be equally applicable to the description of FIG. 3A.

Referring to FIG. 3A, a decoder of one embodiment may include a multilayer feature map reconstruction part 310, a reduced feature map entropy decoding part 320, a temporal context extraction part 370, a prior context extraction part 375, a prior information entropy decoding part 360, and a temporal feature-based probability distribution estimation part 380.

The number and arrangement of components of the decoder shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Alternatively or additionally, a set of (one or more) components shown in FIG. 3 may be integrated with each other, and/or may be implemented as an integrated circuit, as software, and/or a combination of circuits and software.

In a similar manner as described with reference to the encoder of FIG. 2A, the decoder of one embodiment may perform a decoding process via the reduced feature map entropy decoding part 320 that is based on a neural network. When an encoded scaled current reduced feature map is transmitted from the encoder to the decoder, the bitstream may be decoded and transformed into a scaled current reduced feature map $\hat{y}'$ by the reduced feature map entropy decoding part 320. In this case, the scaled current reduced feature map may be reconstructed based on a reduced feature map probability distribution (e.g., $\mu$, $\sigma$), for which a probability distribution may be estimated via the temporal feature-based probability distribution estimation part 380.

Alternatively, a current reduced feature map, which is not scaled by the encoder, may be transferred to the decoder, and in this case, the decoder may decode the current reduced feature map.

The probability distribution may be acquired via the temporal context extraction part 370 and the prior context extraction part 375. The temporal context extraction part 370 may extract a temporal context $\Phi_t$ from a previous reduced feature map $\hat{y}_{ref}$ and decoded prior information $\hat{z}$. Here, the temporal context may reflect therein a temporal correlation between a previous feature map and a current feature map in the decoding process, which may contribute to increasing the accuracy of the decoding process.

As described with reference to FIG. 1C, the multilayer feature map reconstruction part 310 may include the first inverse gain unit and a multilayer feature map reconstruction block, and the first inverse gain unit may use the reconstructed scaled current reduced feature map $\hat{y}'$ as an input and output the reconstructed current reduced feature map $\hat{y}$, and the multilayer feature map reconstruction block may use the reconstructed current reduced feature map $\hat{y}$ as an input and output the reconstructed multilayer feature map.

The decoded current reduced feature map $\hat{y}$ may be stored in a buffer memory 390 of the decoder. The decoded current reduced feature map $\hat{y}$ stored in the buffer memory 390 in a current step may be used to decode a subsequent multilayer feature map. This may indicate that a decoded reduced feature map stored in the buffer memory 390 in a previous step (which may be referred to herein as a previously decoded reduced feature map $\hat{y}_{ref}$) may be used for encoding in the current step (or current encoding).

According to one embodiment, the previous reduced feature map may include the previously decoded reduced feature map $\hat{y}_{ref}$. A previous input feature map used in the decoding process may be a previously decoded input feature map, which may be referred to as an input feature map decoded in the previous step. It may be a feature map that has been decoded in the past and may be used to maintain a temporal context and correlation in a reconstruction process of a multilayer feature map that is subject to current decoding. The previously decoded input feature map used in the decoding process and the previously quantized input feature map used in the encoding process may be the same.

The prior context extraction part 375 of one embodiment may extract a prior context Pz from the prior information. Here, the prior context may be used in the reconstruction process of a scaled current reduced feature map that is subject to current decoding and may play an important role in estimating a probability distribution of a decoded feature map. Further, the prior information entropy decoding part 360 may decode a prior information bitstream (or a second input bitstream) transmitted to the decoder to extract the decoded prior information.

The multilayer feature map reconstruction part 310 of one embodiment may output, using the decoded scaled current reduced feature map as an input, a reconstructed multilayer feature map (e.g., $\{F_i\}_{i=1,\ldots,L}$). The multilayer feature map reconstruction part 310 of one embodiment may output, additionally using the previous reduced feature map $\hat{y}_{ref}$, the multilayer feature map (e.g., $\{F_i\}_{i=1,\ldots,L}$).

Figure 3B:
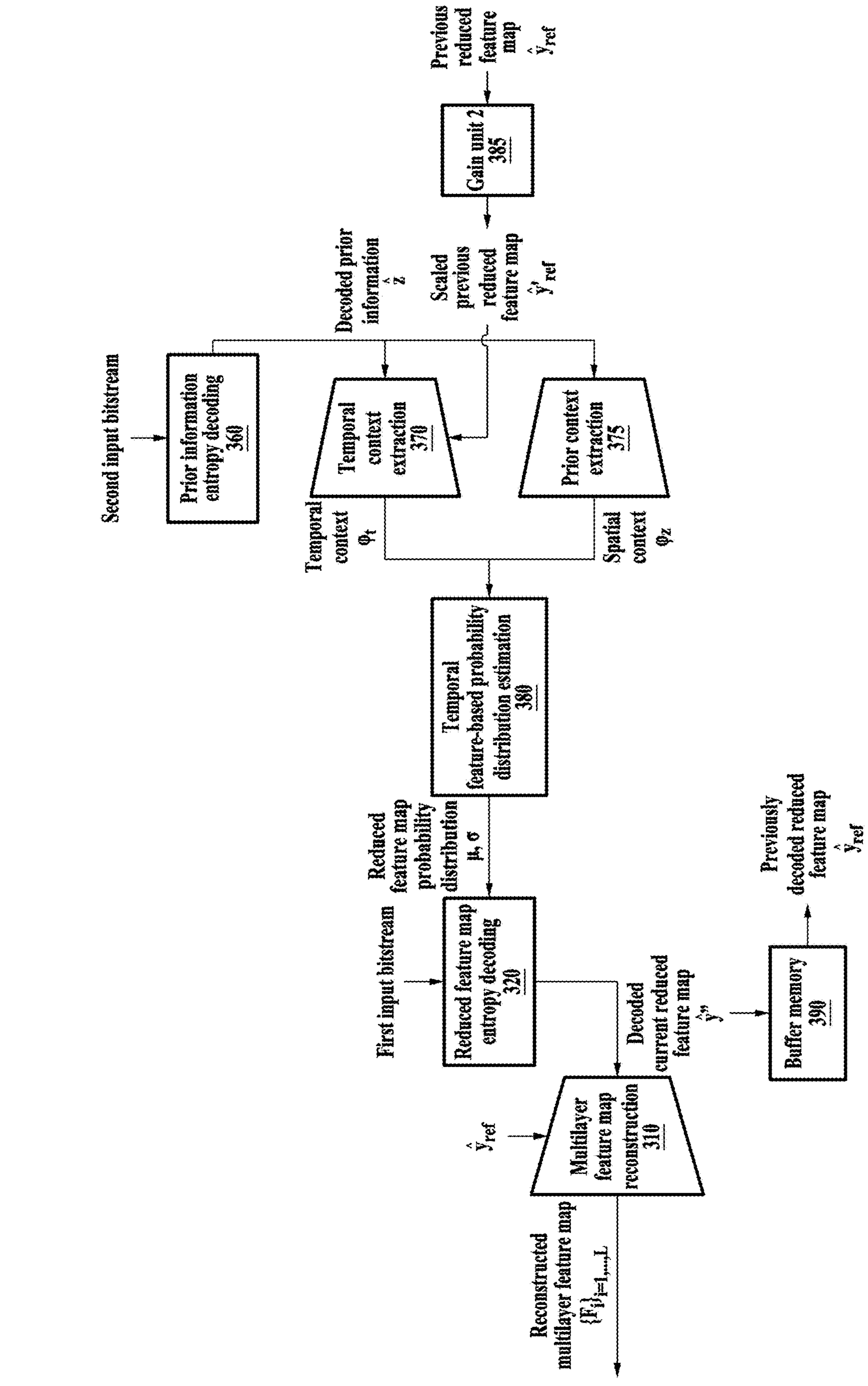
FIG. 3B is a block diagram illustrating a decoder using a scaled previous reduced feature map, according to an embodiment.

FIG. 3B is a block diagram illustrating a decoder using a scaled previous reduced feature map, according to an embodiment. The description provided with reference to FIGS. 1C to 3A may be equally applicable to the description of FIG. 3B.

Referring to FIG. 3B, a decoder of one embodiment may further include a second gain unit 385. The second gain unit 385 may support various bitrates by using a scaling factor q in various ways, thereby adjusting the importance of each channel by applying an additional weight to a previous reduced feature map according to the scaling factor q. The second gain unit 385 may transform a previous reduced feature map ref into a scaled previous reduced feature map $$\hat{y}'_{ref},$$

through the second gain unit 285, such that the scaled previous reduced feature map may have similar characteristics to the scaled current reduced feature map, thereby allowing probability distribution estimation to be more effective. The scaled previous reduced feature map may be used in the temporal context extraction part 370.

Figure 4A:
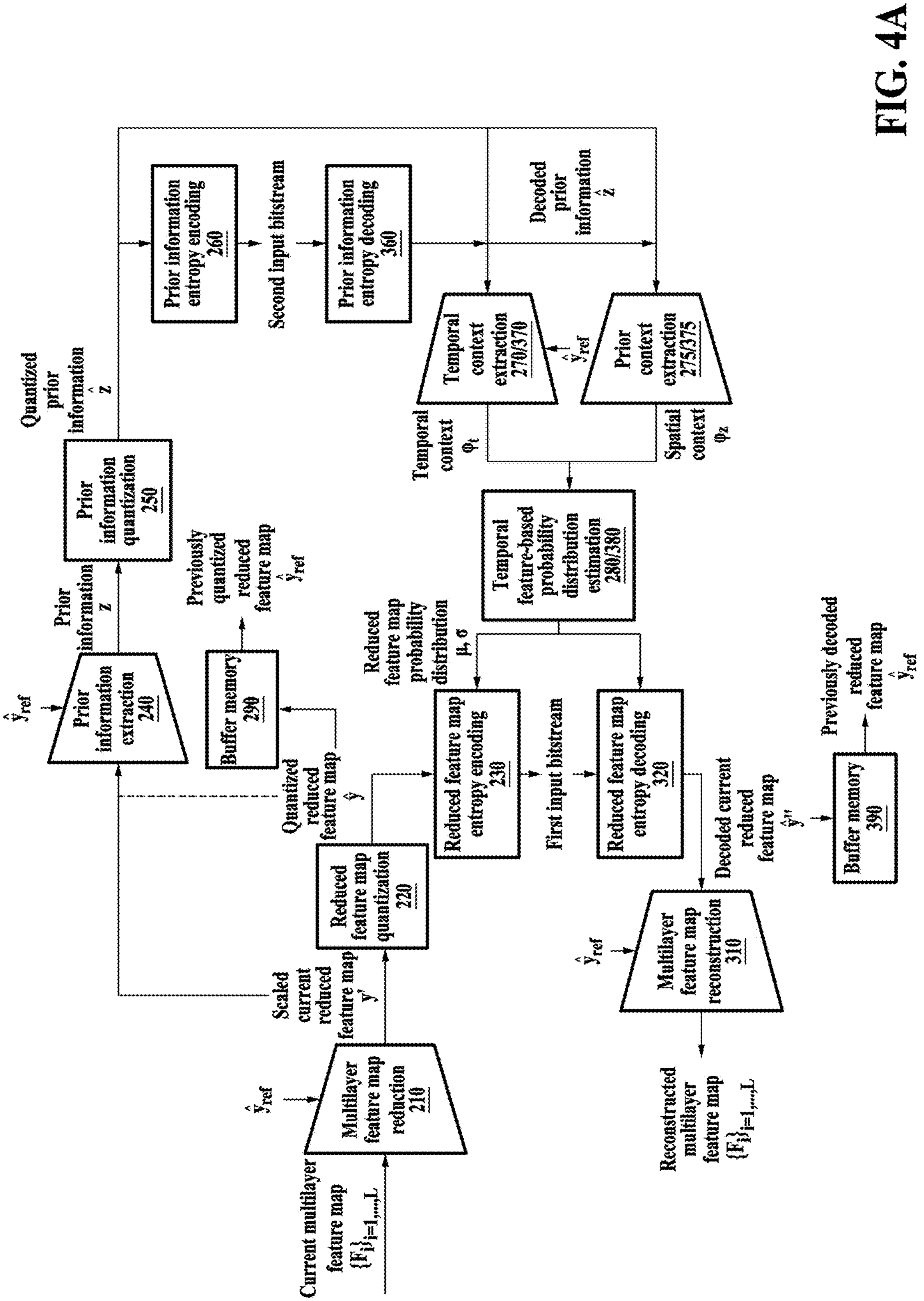
FIG. 4A is a block diagram illustrating an encoder and decoder combined structure, according to an embodiment.

FIG. 4A is a block diagram illustrating an encoder and decoder combined structure, according to an embodiment. The description provided with reference to FIGS. 1C to 3B may be equally applicable to the description of FIG. 4A. The encoder and decoder of FIG. 4 may include and/or may be similar in many respects to the encoder and decoder described above with reference to FIGS. 2 and 3, and may include additional features not mentioned above. Consequently, repeated descriptions of the encoder and decoder described above with reference to FIGS. 2 and 3 may be omitted for the sake of brevity.

A related method described above with reference to FIG. 1B may be intended to extract a temporal context by estimating motion information between multilayer feature maps, but estimating the motion information between the multilayer feature maps is considerably complex and challenging. To overcome such limitations, an encoder and a decoder of one embodiment may instead use a previous reduced feature map and prior information, without estimating motion information, to extract a temporal context and use the temporal context to estimate a probability distribution of a reduced feature map that is subject to current encoding or decoding.

Referring to FIG. 4A, the encoder and the decoder of one embodiment may perform an encoding process and a decoding process, respectively, and may both use a temporal context extraction part (e.g., temporal context extraction part 270 of FIG. 2 and/or temporal context extraction part 370 of FIG. 3), a prior context extraction part (e.g., prior context extraction part 275 of FIG. 2 and/or prior context extraction part 375 of FIG. 3), and a temporal feature-based probability distribution estimation part (e.g., temporal feature-based probability distribution estimation part 280 of FIG. 2 and/or temporal feature-based probability distribution estimation part 380 of FIG. 3), with the same structure used in both.

The encoder may generate a scaled current reduced feature map by reducing a current multilayer feature map via the multilayer feature map reduction part 210, and may quantize the scaled current reduced feature map via the reduced feature map quantization part 220. The quantized reduced feature map may be encoded by the reduced feature map entropy encoding part 230 and output as a first input bitstream.

Further, the prior information extraction part 240 may extract prior information z from the scaled current reduced feature map or the quantized reduced feature map, and this prior information may be quantized by the prior information quantization part 250 and encoded by the prior information entropy encoding part 260 to be transmitted in the form of a second input bitstream to the decoder.

The temporal context extraction part 270 may extract a temporal context from the previously quantized reduced feature map and the prior information, without estimating motion information between multilayer feature maps, unlike the related method. The temporal context extraction part 270 may therefore more accurately estimate a probability distribution of a reduced feature map while omitting a complex motion information estimation process of the related method. The prior context extraction part 275 may also extract a prior context from the prior information and use it to estimate the probability distribution.

The temporal feature-based probability distribution estimation part 280 may estimate the probability distribution by combining the temporal context and the prior context, and may thus provide higher efficiency in the entropy encoding process of the reduced feature map when compared to a related encoder. In such a manner, the encoder may efficiently compress the reduced feature map.

Of the decoder of one embodiment, the reduced feature map entropy decoding part 320 may decode the first input bitstream to reconstruct the reduced feature map, and the multilayer feature map reconstruction part 310 may generate a finally reconstructed multilayer feature map. In this process, the prior information transmitted via the second input bitstream may be decoded by the prior information entropy decoding part 360, and the temporal context extraction part 370 and the prior context extraction part 375 may extract contexts to be used in the decoding process using the reconstructed prior information.

The temporal context extraction part 370 may generate a temporal context using the previously decoded reduced feature map and the decoded prior information, and the prior context extraction part 375 may generate a prior context. The temporal feature-based probability distribution estimation part 380 may estimate the probability distribution of the reduced feature map more accurately by combining these two contexts, and may thus enable more efficient data reconstruction in the decoding process.

The encoder and the decoder of one embodiment may extract a temporal context using only a reduced feature map and prior information, without estimating motion information between multilayer feature maps. This may enable a significantly simpler and relatively high accurate estimation of a probability distribution of a reduced feature map, and may significantly improve the efficiency of the encoding and decoding processes, when compared to related encoders and decoders.

Figure 4B:
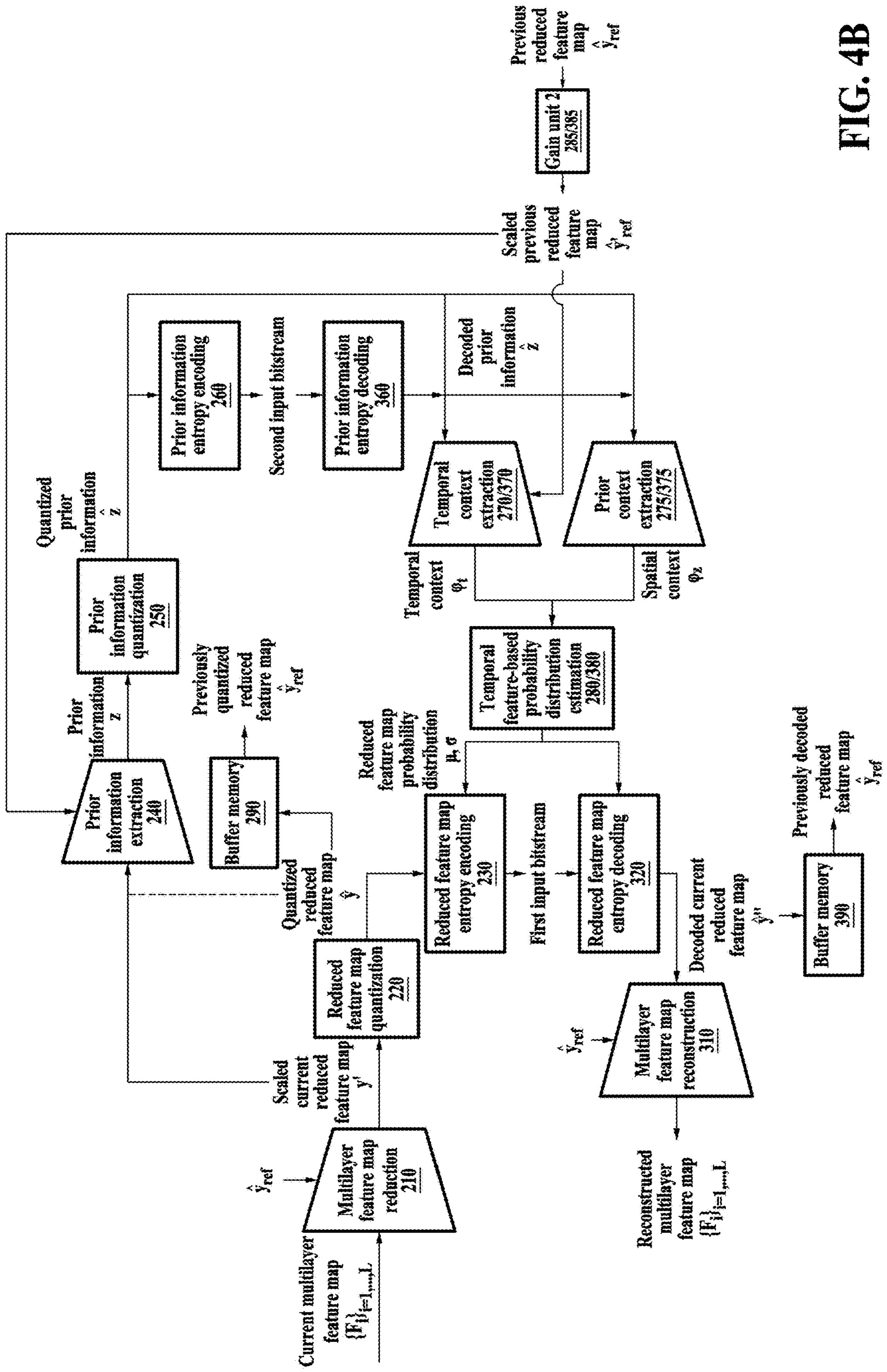
FIG. 4B is a block diagram illustrating an encoder and decoder combined structure that uses a scaled previous reduced feature map, according to an embodiment.

FIG. 4B is a block diagram illustrating an encoder and decoder combined structure that uses a scaled previous reduced feature map, according to an embodiment. The description provided with reference to FIGS. 1C to 4A may be equally applicable to the description of FIG. 4B.

Referring to FIG. 4B, an encoder of one embodiment may further include the second gain unit 285, and a decoder of one embodiment may further include the second gain unit 385.

A scaled previous reduced feature map of one embodiment may be used in the prior information extraction parts 270 and 370 and the temporal context extraction part 240.

Figure 4C:
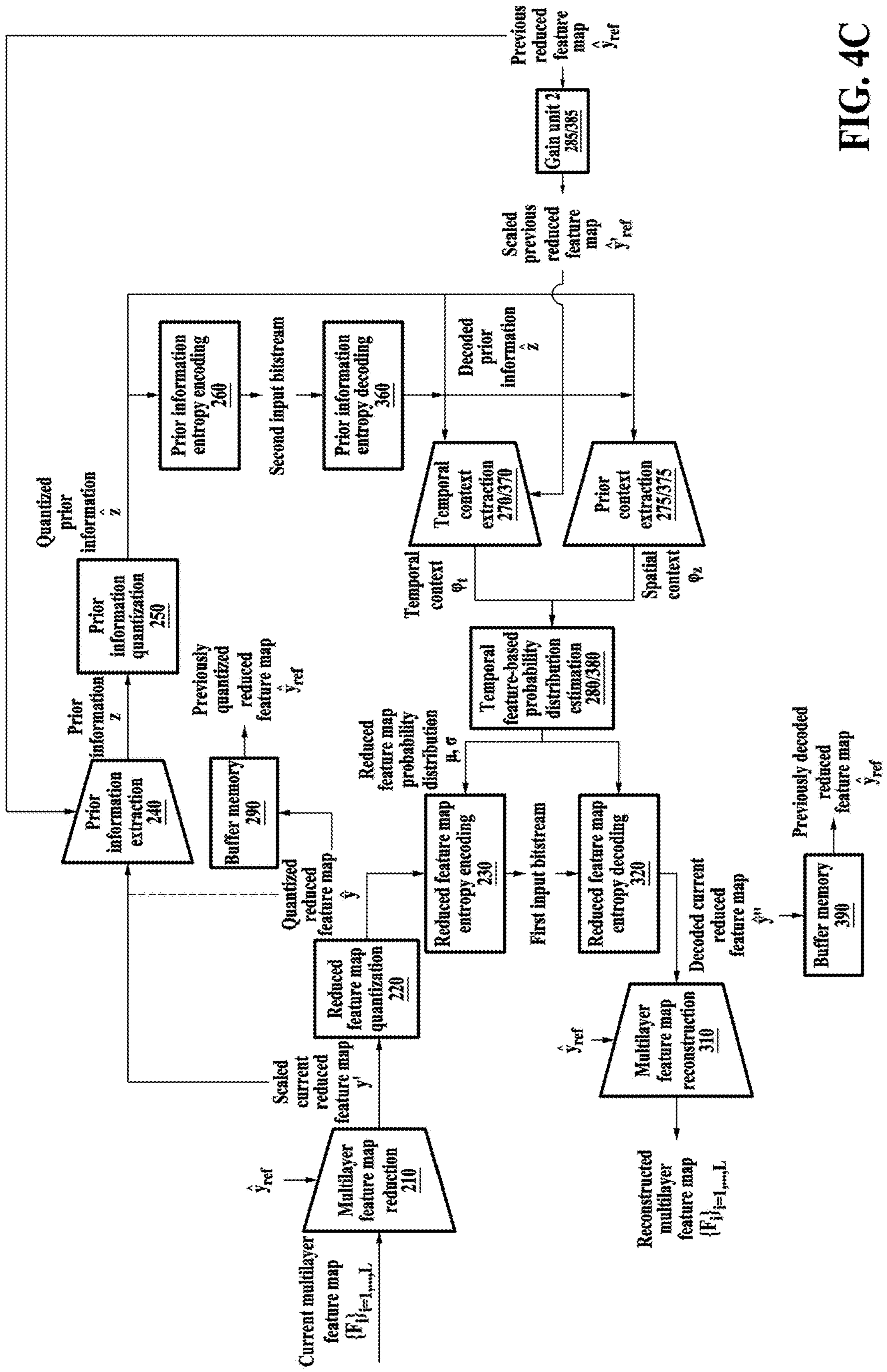
FIG. 4C is a block diagram illustrating an encoder and decoder combined structure that uses a scaled previous reduced feature map and a previous reduced feature map, according to an embodiment.

FIG. 4C is a block diagram illustrating an encoder and decoder combined structure that uses a scaled previous reduced feature map and a previous reduced feature map, according to an embodiment. The description provided with reference to FIGS. 1C to 4B may be equally applicable to the description of FIG. 4C.

Referring to FIG. 4C, an encoder of one embodiment may further include the second gain unit 285, and a decoder of one embodiment may further include the second gain unit 385.

In one embodiment, the temporal context extraction parts 270 and 370 may use a scaled previous reduced feature map, and the prior information extraction part 240 may use the previous reduced feature map. Alternatively, the prior information extraction part 240 may use the scaled previous reduced feature map, and the temporal context extraction parts 270 and 370 may use the previous reduced feature map.

Figure 4D:
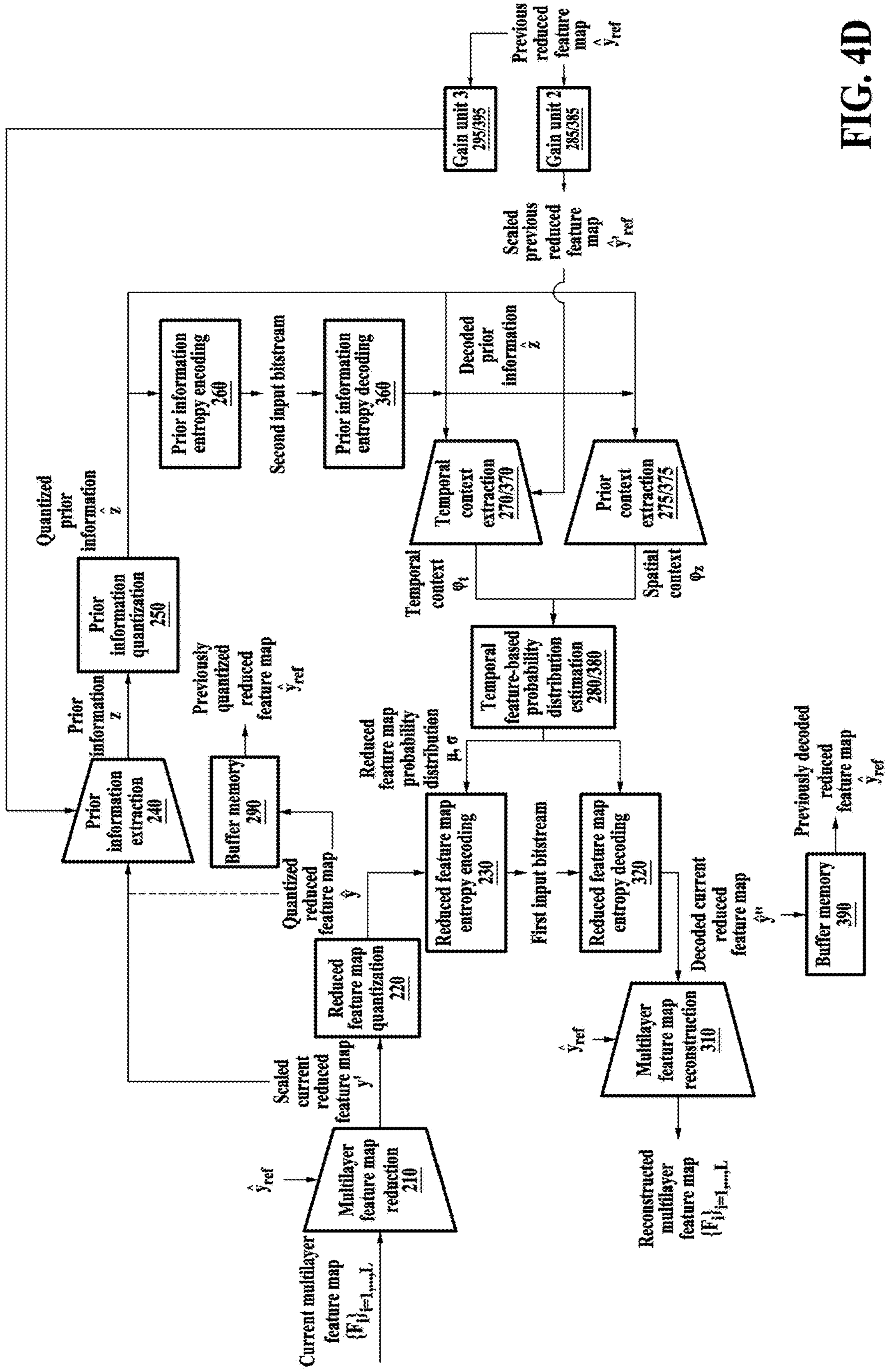
FIG. 4D is a block diagram illustrating a combined structure that uses multiple gain units to generate a scaled previous reduced feature map, according to an embodiment.

FIG. 4D is a block diagram illustrating a combined structure that uses multiple gain units to generate a scaled previous reduced feature map, according to an embodiment.

Referring to FIG. 4D, an encoder of one embodiment may further include the second gain unit 285 and a third gain unit 295, and a decoder of one embodiment may further include the second gain unit 385 and a third gain unit 395.

According to one embodiment, when a scaled previous reduced feature map used in the temporal context extraction parts 270 and 370 and a scaled previous reduced feature map used in the prior information extraction part 240 are generated, gain units having different weights (e.g., different scale values) may be used. For example, a scaled previous reduced feature map used in the temporal context extraction parts 270 and 370 may be generated through the second gain units 285 and 385, and a scaled previous reduced feature map used in the prior information extraction part 240 may be generated through the third gain units 295 and 395.

The encoding and decoding method according to one embodiment may be applied to a method using a scaled current reduced feature map as well as a method using a current reduced feature map. The scaled current reduced feature map may be a feature map that enables emphasis or normalization of features by performing channel-wise weight adjustment on a scaled current reduced feature map.

Therefore, the encoding and decoding method according to one embodiment may be applied to process reduced feature maps in various ways regardless of scaling.

Figure 5:
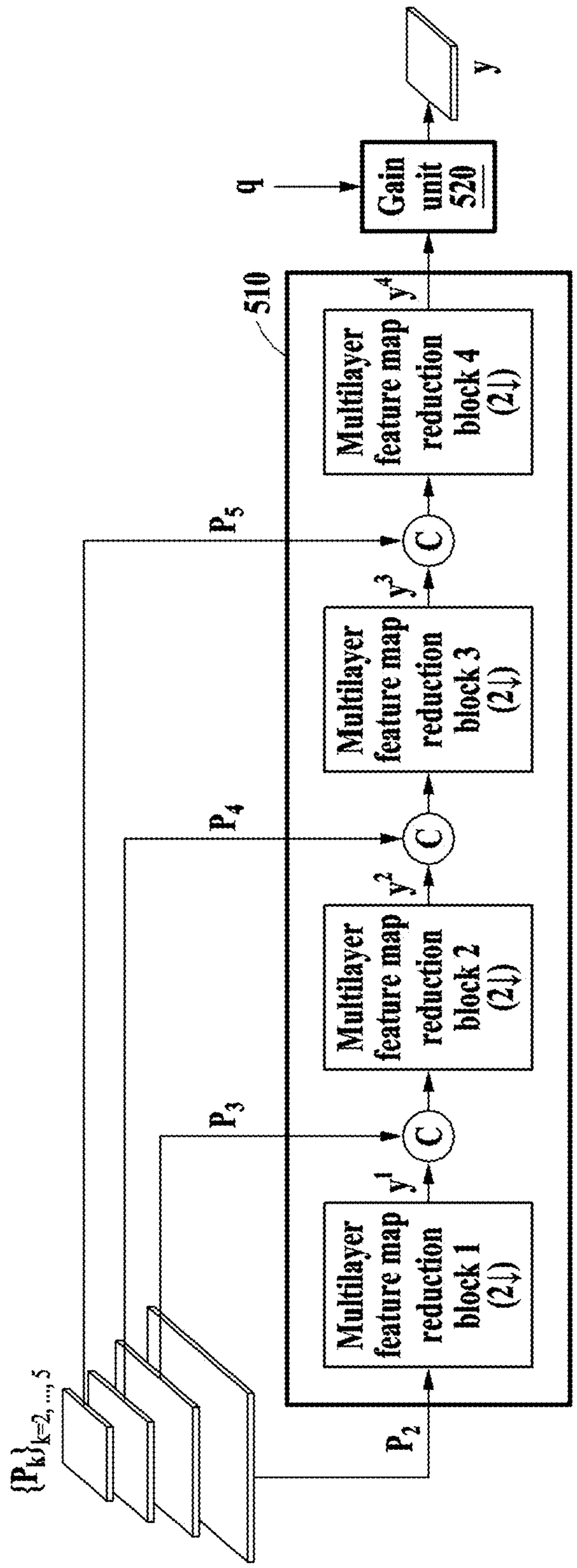
FIG. 5 is a diagram illustrating an operation of a multilayer feature map reduction part, according to an embodiment.

FIG. 5 is a diagram illustrating an operation of a multilayer feature map reduction part according to an embodiment. The description provided above with reference to FIGS. 1C through 4D may be equally applicable to the description provided below with reference to FIG. 5. The multilayer feature map reduction part 210 of FIG. 5 may include and/or may be similar in many respects to the multilayer feature map reduction part 210 described above with reference to FIGS. 1C through 4, and may include additional features not mentioned above. Consequently, repeated descriptions of the multilayer feature map reduction part 210 described above with reference to FIGS. 2 to 4 may be omitted for the sake of brevity.

Referring to FIG. 5, the multilayer feature map reduction part 210 of one embodiment may output a current reduced feature map by sequentially fusing and transforming a current multilayer feature map. For example, the multilayer feature map reduction part 210 may receive, as an input, a current multilayer feature map $\{P_k\}_{k=2, \ldots, 5}$ and reduce respective layers to finally output a current reduced feature map y. In this case, respective feature maps $P_2$, $P_3$, $P_4$, and $P_5$ of the layers may be reduced to $y_1$, $y_2$, $y_3$, and $y_4$ sequentially through multilayer feature map reduction blocks, and may finally pass through a gain unit 520 to be output as the reduced feature map y.

Each multilayer feature map reduction block may be configured based on a neural network structure. In this case, a multilayer feature map reduction block may include a residual block (or a residual unit), which may use a residual learning method to perform a multilayer feature map reduction process. For example, the multilayer feature map reduction block may reduce spatial and channel information of an input feature map using a convolution layer, and the feature maps reduced through the respective layers may be ultimately summed up.

Additionally, the gain unit 520 may perform channel-wise scaling. This may serve to adjust the importance of each channel by applying an additional weight to an input intermediate latent feature map (e.g., $y_4$), which may contribute to improving the quality of a final output y. For example, the gain unit 520 may generate an adjusted reduced feature map y by multiplying, channel-wise, an intermediate latent feature map $y_4$ by a scaling factor q. According to one embodiment, scaling may be used to assign a greater weight to a specific channel or to normalize data within a specific range. The gain unit 520 may independently scale each channel of an input reduced feature map to generate an optimized reduced feature map. Further, varying the scaling factor q of the gain unit 520 may support different bitrates in a single model. For example, a high scaling factor q may be used when using a high bitrate, and a low scaling factor q may be used when using a low bitrate.

Therefore, the multilayer feature map reduction part 210 of one embodiment may efficiently reduce the current multilayer feature map, and maximize the performance using different neural network structures in this process. The respective reduction blocks may use different neural network structures, and residual learning may be used to efficiently process spatial and channel information while maintaining the quality of a reduced feature map.

Figure 6:
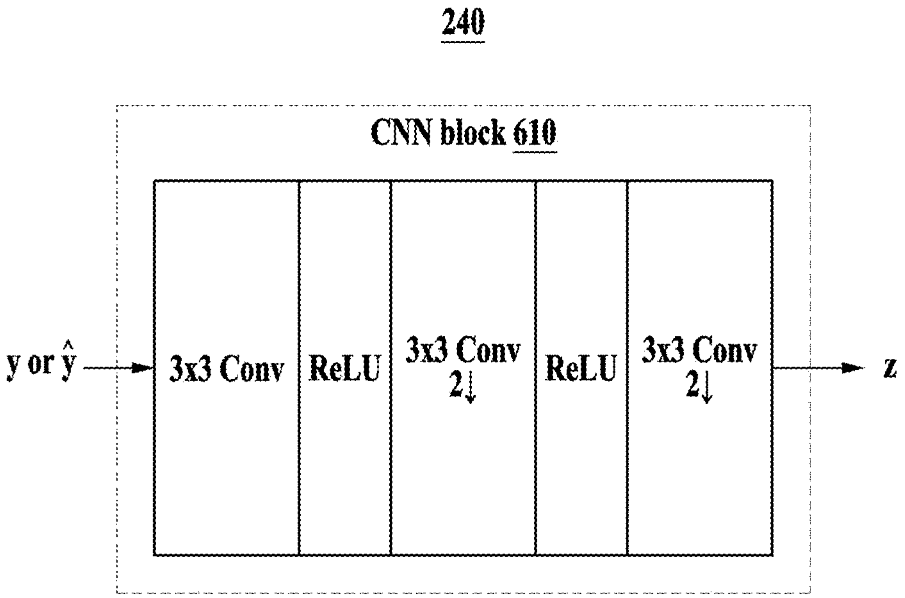
FIG. 6 is a diagram illustrating an operation of a prior information extraction part, according to an embodiment.

FIG. 6 is a diagram illustrating an operation of a prior information extraction part, according to an embodiment. The prior information extraction part 240 of FIG. 6 may include and/or may be similar in many respects to the prior information extraction part 240 described above with reference to FIGS. 1C through 5, and may include additional features not mentioned above. Consequently, repeated descriptions of the prior information extraction part 240 described above with reference to FIGS. 1C to 5 may be omitted for the sake of brevity.

Referring to FIG. 6, the prior information extraction part 240 of one embodiment may be configured in a neural network structure that receives, as an input, a current reduced feature map (or a scaled current reduced feature map) or a quantized current reduced feature map and outputs prior information. The prior information, which may include additional information of the current reduced feature map, may be used to facilitate more accurate estimation of a probability distribution of the feature map. This may enable more efficient data compression in encoding and decoding processes, when compared to related encoding and decoding processes.

According to one embodiment, the prior information may have a relatively smaller spatial resolution and fewer channels, compared to the current reduced feature map. This may be designed to reduce the amount of data while retaining important information, thereby maximizing the encoding and decoding performance, when compared to related encoding and decoding processes.

The prior information extraction part 240 of one embodiment may include a convolutional neural network (CNN) block 610. The CNN block 610 may extract the prior information from the input reduced feature map via a multilayer convolutional operation and an activation function (e.g., a rectified linear unit (ReLU)). The CNN block 610 may include a 3×3 convolution filter, the activation function (e.g., ReLU), and a downsampling layer, and this structure may serve to gradually process the input reduced feature map to finally generate the prior information. However, the configuration of the prior information extraction part 240 is not limited thereto, and the prior information extraction part 240 may be implemented in combination with other related neural network-based blocks.

That is, the prior information extraction part 240 may efficiently extract additional information from a reduced feature map through various neural network structures, thereby more accurately estimating a probability distribution of the reduced feature map that is subject to current encoding or decoding, when compared to related encoding and decoding processes.

Figure 7:
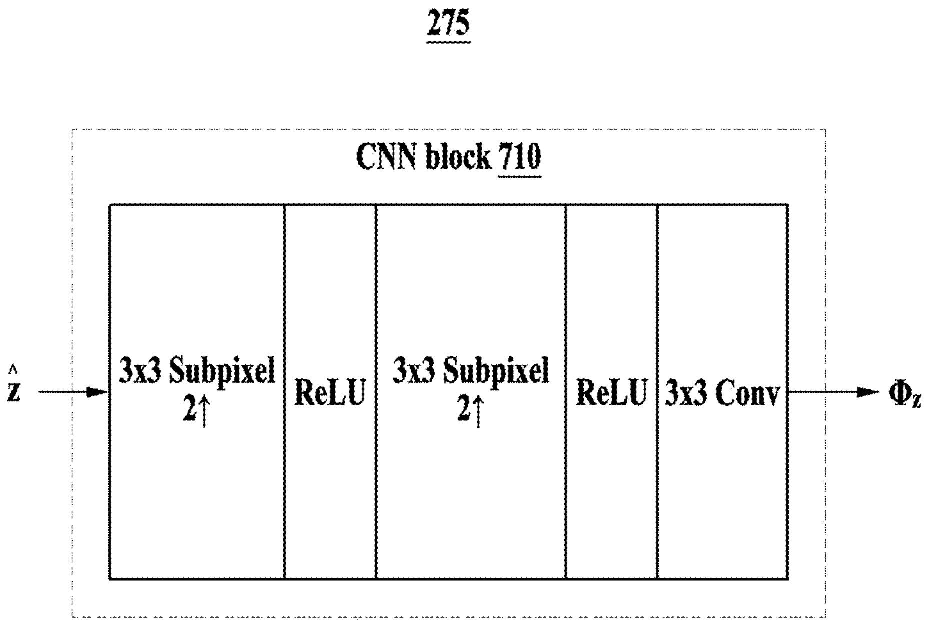
FIG. 7 is a diagram illustrating an operation of a prior context extraction part, according to an embodiment.

FIG. 7 is a diagram illustrating an operation of a prior context extraction part, according to an embodiment. The prior context extraction part 275 of FIG. 7 may include and/or may be similar in many respects to the prior context extraction part 275 described above with reference to FIGS. 1C through 6, and may include additional features not mentioned above. Consequently, repeated descriptions of the prior context extraction part 275 described above with reference to FIGS. 1C to 6 may be omitted for the sake of brevity.

Referring to FIG. 7, the prior context extraction part 275 of the encoder of one embodiment may receive quantized prior information as an input to generate a prior context, and the prior context extraction part 375 of the decoder of one embodiment may receive decoded prior information as an input to perform the same. The prior context may be used to more accurately estimate a probability distribution of a reduced feature map that is subject to current encoding or decoding, and may be used as an entropy parameter.

According to one embodiment, the prior context may preferably have the same spatial resolution as the reduced feature map, and when it has a larger number of channels, its efficiency may be maximized.

A prior context extraction part (e.g., prior context extraction part 275 of FIG. 2 and/or prior context extraction part 375 of FIG. 3) may include a CNN block 710, which may include a 3×3 convolution filter, an activation function (ReLU), and a subpixel upsampling (Subpixel 2 ↑) layer. The CNN block 710 may gradually process input prior information to generate a prior context. The convolution filter may closely analyze the input information, the activation function may add nonlinearity to extract a complex feature, and the upsampling layer may extract the context while increasing the resolution of data.

However, the configuration of the prior context extraction part (e.g., prior context extraction part 275 of FIG. 2 and/or prior context extraction part 375 of FIG. 3) is not limited thereto, and the prior context extraction part may be implemented in combination with other related neural network-based blocks. In this case, various structures and methods may be used to generate a prior text efficiently.

Figure 8:
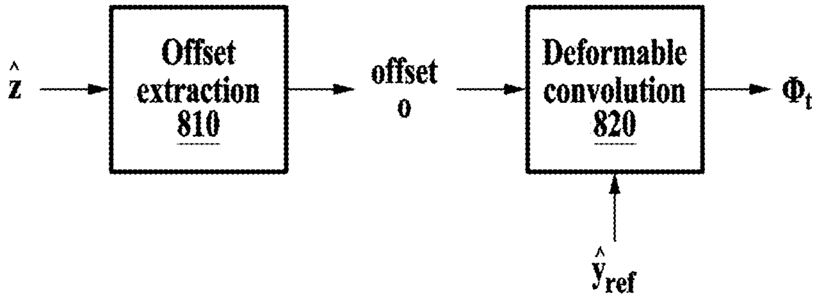
FIGS. 8 and 9 are diagrams illustrating an operation of a temporal context extraction part, according to an embodiment.
Figure 9:
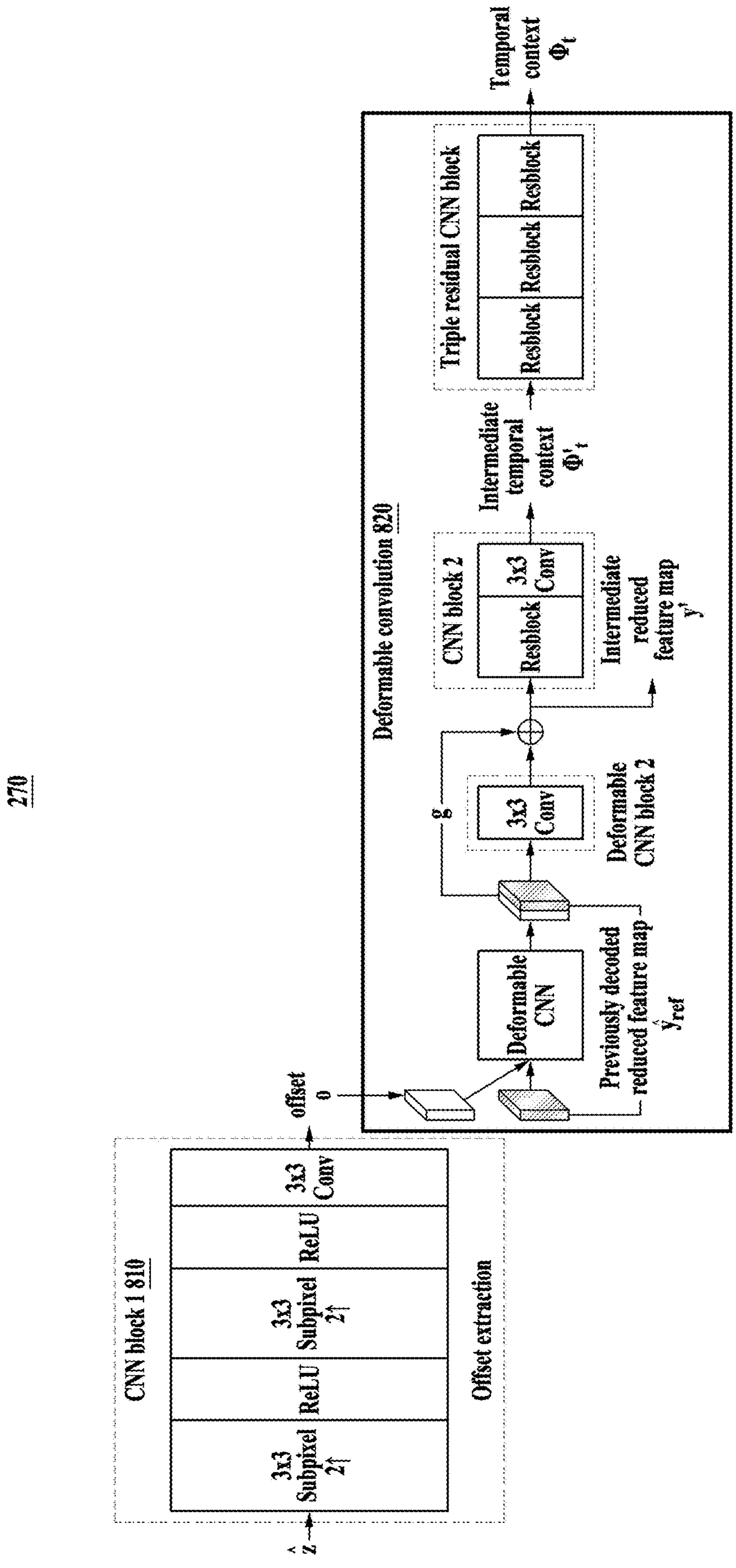

FIGS. 8 and 9 are diagrams illustrating an operation of a temporal context extraction part, according to an embodiment. The temporal context extraction part 270 of FIGS. 8 and 9 may include and/or may be similar in many respects to the temporal context extraction part 270 described above with reference to FIGS. 1C through 7, and may include additional features not mentioned above. Consequently, repeated descriptions of the temporal context extraction part 270 described above with reference to FIGS. 1C to 7 may be omitted for the sake of brevity.

Referring to FIG. 8, the temporal context extraction part 270 of the encoder of one embodiment may be and/or may include a neural network that outputs a temporal context using, as an input, quantized prior information and a previously quantized reduced feature map, and the temporal context extraction part 370 of the decoder of one embodiment may be a neural network that outputs a temporal context using, as an input, decoded prior information and a previously decoded reduced feature map. The temporal context may include temporal information of a current reduced feature map and may be used to more accurately estimate a probability distribution of the current reduced feature map.

An offset extraction part 810 of one embodiment may extract an offset using the prior information (or quantized prior information or decoded prior information) as an input. The offset may be a value that dynamically adjusts a position to which a filter is applied in a deformable convolutional operation. A deformable convolution part 820 of one embodiment may output a temporal context using, as an input, the extracted offset and a previous reduced feature map (or a previously quantized reduced feature map or a previously decoded reduced feature map). In this case, the offset and the temporal context may have the same spatial resolution and the same number of channels as the reduced feature map.

Referring to FIG. 9, the offset extraction part 810 of one embodiment may be configured as a multilayer CNN block, which may include a 3×3 convolution filter, an activation function (ReLU), and a subpixel upsampling (Subpixel 2 ↑) layer. This structure may extract an offset from input prior information, and the deformable convolution part 820 may receive, as an input, the extracted offset and the previously quantized reduced feature map or decoded reduced feature map to generate a temporal context through a deformable convolutional operation.

The deformable convolution part 820 of one embodiment may include two deformable CNN blocks and a step of generating an intermediate temporal context. A first deformable CNN block may perform a convolutional operation that uses a filter deformed by applying an offset, and a second deformable CNN block may gradually generate a temporal context by referring to a previously reduced feature map. Then, a final temporal context may be output through a triple residual CNN block.

Figure 10:
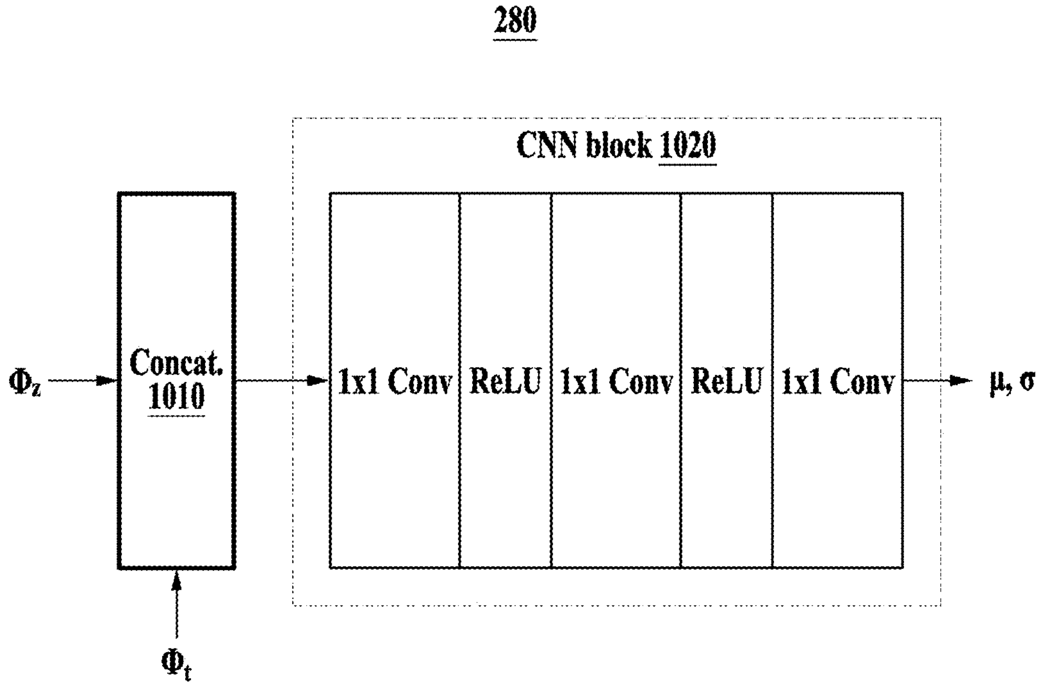
FIGS. 10 and 11 are diagrams illustrating an operation of a temporal feature-based probability distribution estimation part, according to an embodiment.
Figure 11:
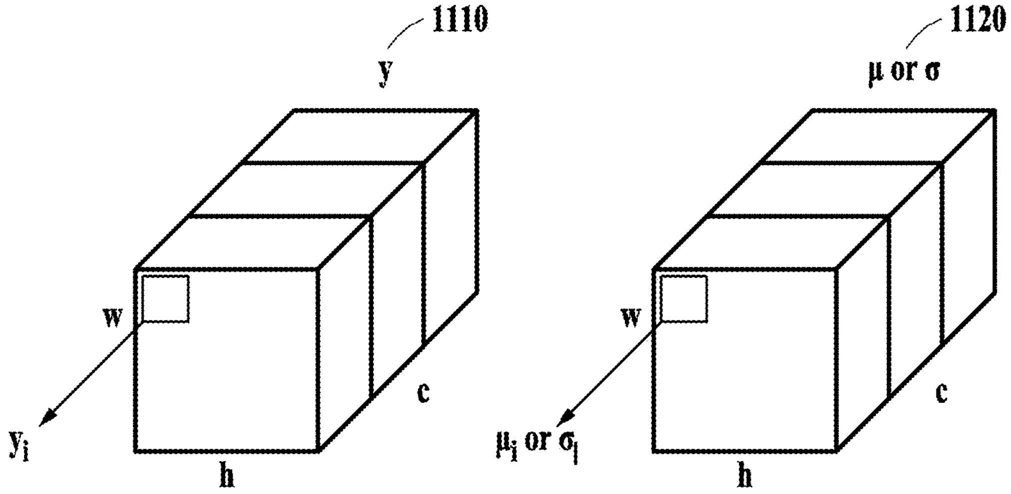

FIGS. 10 and 11 are diagrams illustrating an operation of a temporal feature-based probability distribution estimation part according to an embodiment. The temporal feature-based probability distribution estimation part 280 of FIGS. 10 and 11 may include and/or may be similar in many respects to the temporal feature-based probability distribution estimation part 280 described above with reference to FIGS. 1C through 9, and may include additional features not mentioned above. Consequently, repeated descriptions of the temporal feature-based probability distribution estimation part 280 described above with reference to FIGS. 1C to 9 may be omitted for the sake of brevity.

Referring to FIG. 10, a temporal feature-based probability distribution estimation part (e.g., temporal feature-based probability distribution estimation part 280 of FIG. 2 and/or temporal feature-based probability distribution estimation part 380 of FIG. 3) of one embodiment may be configured in a neural network structure that receives, as an input, a prior context or a temporal context and outputs a probability distribution of a current reduced feature map. This probability distribution may be used to process the current reduced feature map in encoding and decoding processes.

Although the temporal context and the prior context are different pieces of information, the two contexts may be combined (or concatenated) effectively into a single input using inter-channel connection 1010 as shown in FIG. 10. The inter-channel connection 1010 may be used to concatenate the prior context and the temporal context into a single tensor, and spatial resolutions of the two contexts may be preferably the same as a spatial resolution of the reduced feature map. The number of channels in the two contexts may be different, but after the concatenation, they may maintain the same spatial resolution for efficient processing.

A CNN block 1020 of one embodiment may process the concatenated context to finally estimate the probability distribution. The CNN block 1020 may include a series of a 1×1 convolution layer and an activation function (ReLU), and may efficiently process the input data to estimate the probability distribution of the current reduced feature map. This probability distribution may be set to be the same as the number of channels and the spatial resolution of the reduced feature map to maintain consistency during the encoding and decoding processes.

Further, a temporal feature-based probability distribution estimation part (e.g., probability distribution estimation part 280 of FIG. 2 and/or probability distribution estimation part 380 of FIG. 3) of one embodiment may be implemented using a combination of various neural network blocks used in image processing and machine learning, in addition to the CNN block 1020 shown in FIG. 10. This may be deformed to a structure that is more optimized for the characteristics of specific data.

Referring to FIG. 11, according to one embodiment, an average u of a reduced feature map y may refer to an average of values of a reduced feature map that is subject to current encoding or decoding. For example, $\mu_i$ may be an average value of a reduced feature map $y_i$ corresponding to an index i. The average μ may be a result of averaging values of y corresponding to respective positions, having the same structure as the reduced feature map y at a spatial resolution, e.g., the number of channels c, a horizontal size (or width) w, and a vertical size (or height) h.

In addition, a standard deviation σ of the reduced feature map y may refer to a standard deviation of values of a reduced feature map that is subject to current encoding or decoding. For example, $\sigma_i$ may be a standard deviation value of a reduced feature map $y_i$ corresponding to an index i. The standard deviation σ may refer to a standard deviation calculated based on values of y corresponding to respective positions, having the same resolution as the reduced feature map y in terms of the number of channels, the horizontal size (width), and the vertical size (height).

Figure 12:
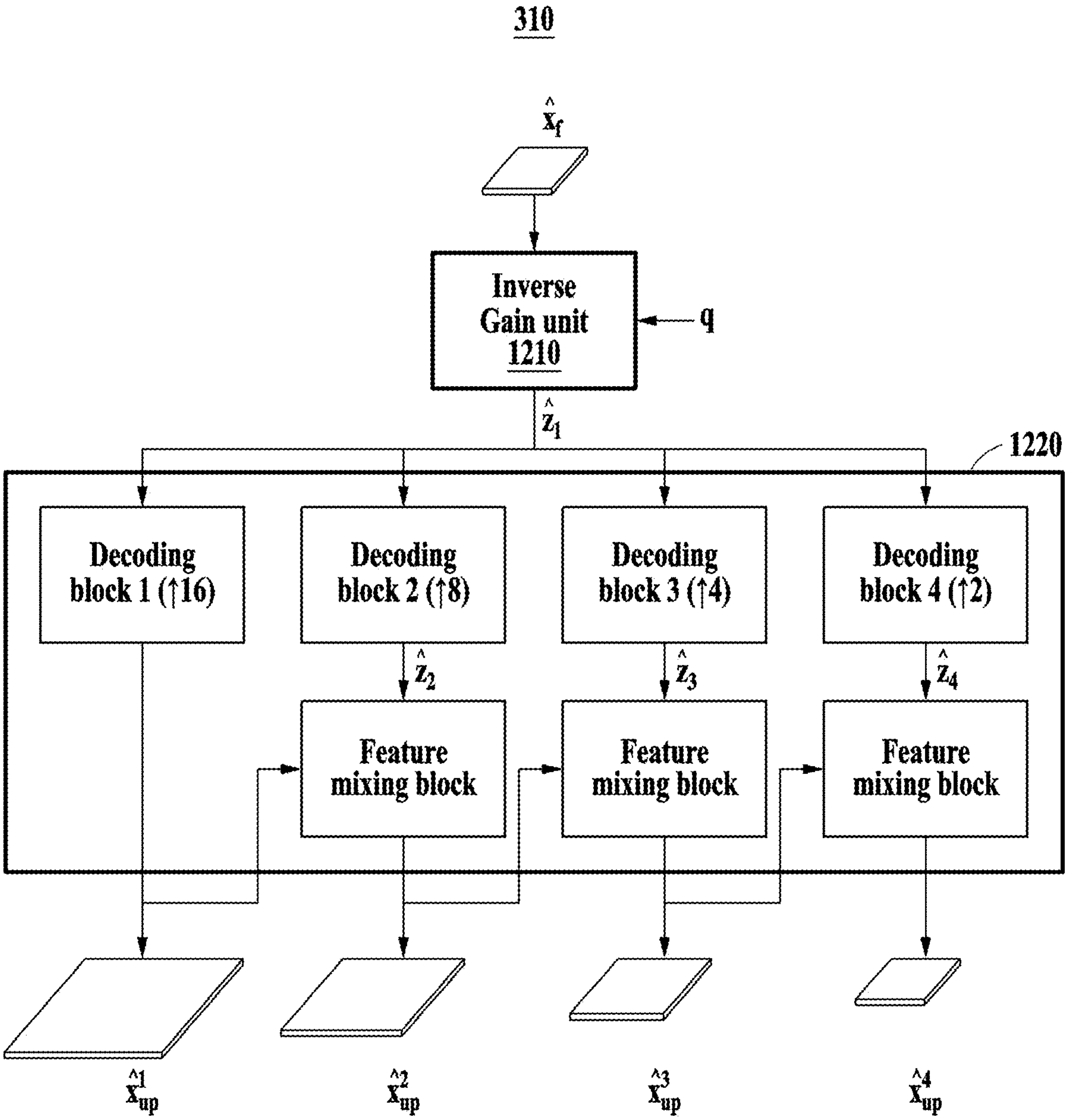
FIG. 12 is a diagram illustrating an operation of a multilayer feature map reconstruction part, according to an embodiment.

FIG. 12 is a diagram illustrating an operation of a multilayer feature map reconstruction part according to an embodiment. The multilayer feature map reconstruction part 310 of FIG. 12 may include and/or may be similar in many respects to the multilayer feature map reconstruction part 310 described above with reference to FIGS. 1C through 11, and may include additional features not mentioned above. Consequently, repeated descriptions of the multilayer feature map reconstruction part 310 described above with reference to FIGS. 1C to 11 may be omitted for the sake of brevity.

Referring to FIG. 12, the multilayer feature map reconstruction part 310 of one embodiment may have a neural network structure that reconstructs and outputs a multilayer feature map based on a decoded reduced feature map. For example, the multilayer feature map reconstruction part 310 may be configured based on a decoding and reconstruction network (e.g., DRNet).

An inverse gain unit 1210 of one embodiment may reconstruct the decoded reduced feature map to its original state using scaling information q applied to each channel of a reduced feature map by a gain unit (e.g., the gain unit 520 of FIG. 5) in an encoding process. In this process, the scaling applied channel-wise may be inversely applied, and as a result thereof, a feature map in which a difference between channels is corrected may be output. Additionally, varying the scaling factor q of the gain unit 520 may support various bitrates in one model.

A reconstruction block 1220 of one embodiment may receive an output of the inverse gain unit 1210 as an input and sequentially reconstruct it to generate a multilayer feature map. The reconstruction block 1220 may include a plurality of decoding blocks and feature mixing blocks. A decoding block may gradually upsample a resolution of an input feature map, and may transform a reduced feature map into a higher resolution in each step. Each decoding block may be designed to reconstruct a reduced feature map to a higher resolution. For example, a first decoding block may expand a resolution of an input feature map by a factor of 16, a second decoding block by a factor of 8, a third decoding block by a factor of 4, and finally a fourth decoding block by a factor of 2. In each step, a feature mixing block may be used to mix feature information from different layers to increase the quality of a reconstructed feature map of each layer. As a result, the multilayer feature map may be reconstructed sequentially through each decoding block and feature mixing block.

Figure 13A:
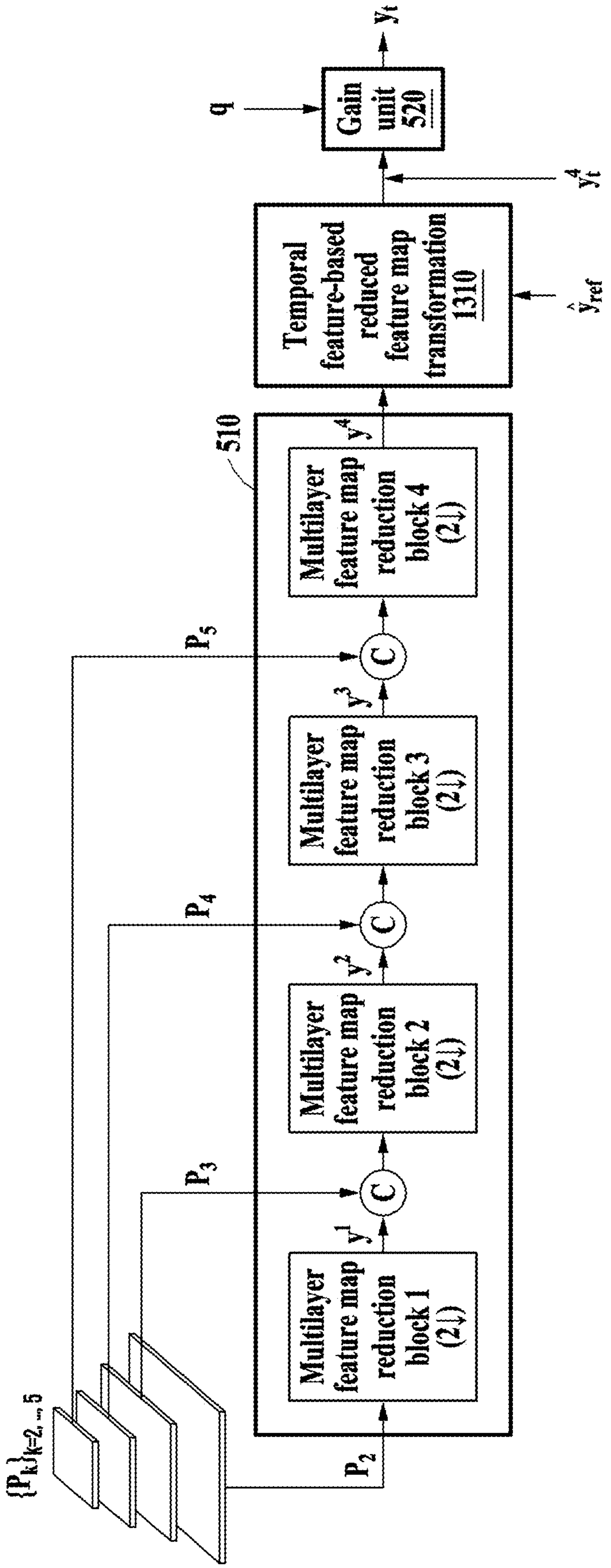
FIGS. 13A through 13C are diagrams illustrating an operation of a temporal feature-based multilayer feature map reduction part, according to an embodiment.
Figure 13B:
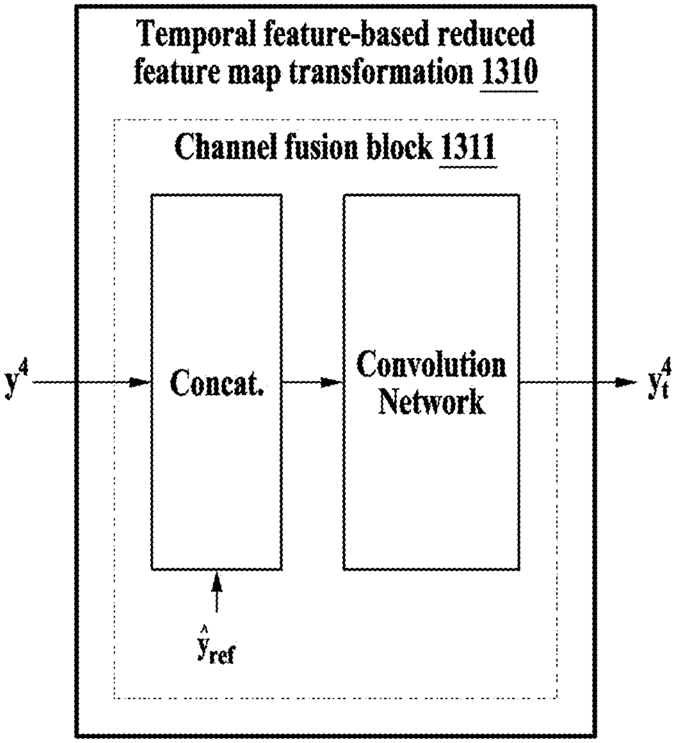
Figure 13C:
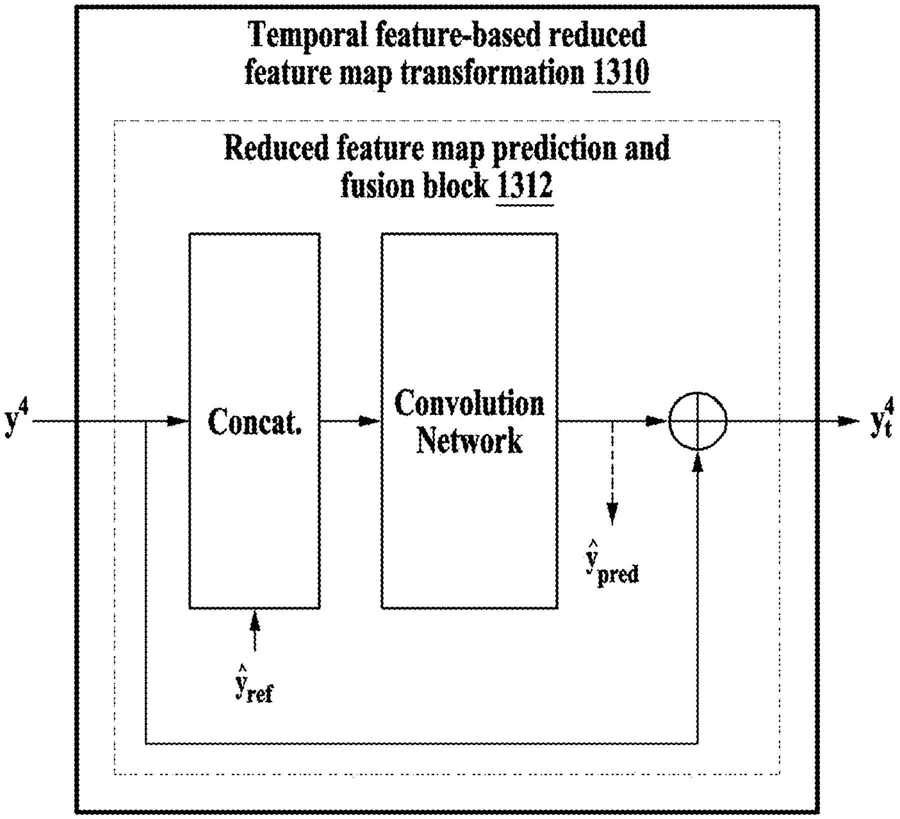

FIGS. 13A through 13C are diagrams illustrating an operation of a temporal feature-based multilayer feature map reduction part according to an embodiment. The description provided above with reference to FIGS. 1C through 12 may be equally applicable to the description provided below with reference to FIGS. 13A through 13C.

Referring to FIG. 13A, when outputting a current reduced feature map by reducing a dimension of a current multilayer feature map, the multilayer feature map reduction part 210 of one embodiment may output a temporal feature-based current reduced feature map by additionally using a previously quantized reduced feature map.

A temporal feature-based reduced feature map transformation part 1310 of one embodiment may receive, as an input, an intermediate latent feature map (e.g., $y^4$) which is an output of a multilayer feature map reduction block (e.g., multilayer feature map reduction block 4) and a previously quantized reduced feature map ref, and may concatenate the two to transform it into a temporal feature-based intermediate reduced feature map $$y_c^4$$

Referring to FIG. 13B, a channel fusion block 1311 of one embodiment may concatenate an intermediate latent feature map and a previously quantized reduced feature map, and may perform a convolutional operation on this concatenated input to generate a temporal feature-based intermediate reduced feature map. In this case, a CNN used for the convolutional operation of the channel fusion block 1311 may use various CNNs including, for example, a 1×1 CNN, a 3×3 CNN, and a deformable CNN.

Referring to FIG. 13C, a reduced feature map prediction and fusion block 1312 of one embodiment may concatenate an intermediate latent feature map and a previously quantized reduced feature map and perform a convolutional operation on this concatenated input to output a predicted intermediate latent feature map (e.g., $y_{pred}$), and the intermediate latent feature map may be added to the predicted intermediate latent feature map to finally generate a temporal feature-based intermediate reduced feature map.

As described above, the temporal feature-based reduced feature map transformation part 1310 may concatenate current information and previous information (or past information) of a multilayer feature map to generate a reduced feature map in which a temporal correlation thereof is reflected therein.

Alternatively, the multilayer feature map reduction part 210 may output a current reduced feature map based on a difference between an intermediate latent feature map (e.g., $y^4$) and a previously quantized reduced feature map ref $\hat{y}_{ref}$.

The gain unit 520 may apply an additional weight q to a temporal feature-based intermediate reduced feature map $$(\text{e.g., } y_t^4).$$

This process may adjust the importance of each channel, and as a result, a current reduced feature map $y_t$ may be output. The gain unit 520 may apply a weight that reflects therein the relative importance of each channel using q to more precisely complete the multilayer feature map reduction process for scaling down (or reducing) a multilayer feature map.

In this case, it may be desirable to set the intermediate reduced feature map $$(\text{e.g., } y_t^4)$$

and the previously quantized reduced feature map $\hat{y}_{ref}$ to have the same spatial resolution and the same number of channels. By maintaining the same resolution and the same number of channels, a reduced feature map in which a temporal context is reflected may be used for subsequent encoding and decoding processes while maintaining a consistent structure.

Figure 14:
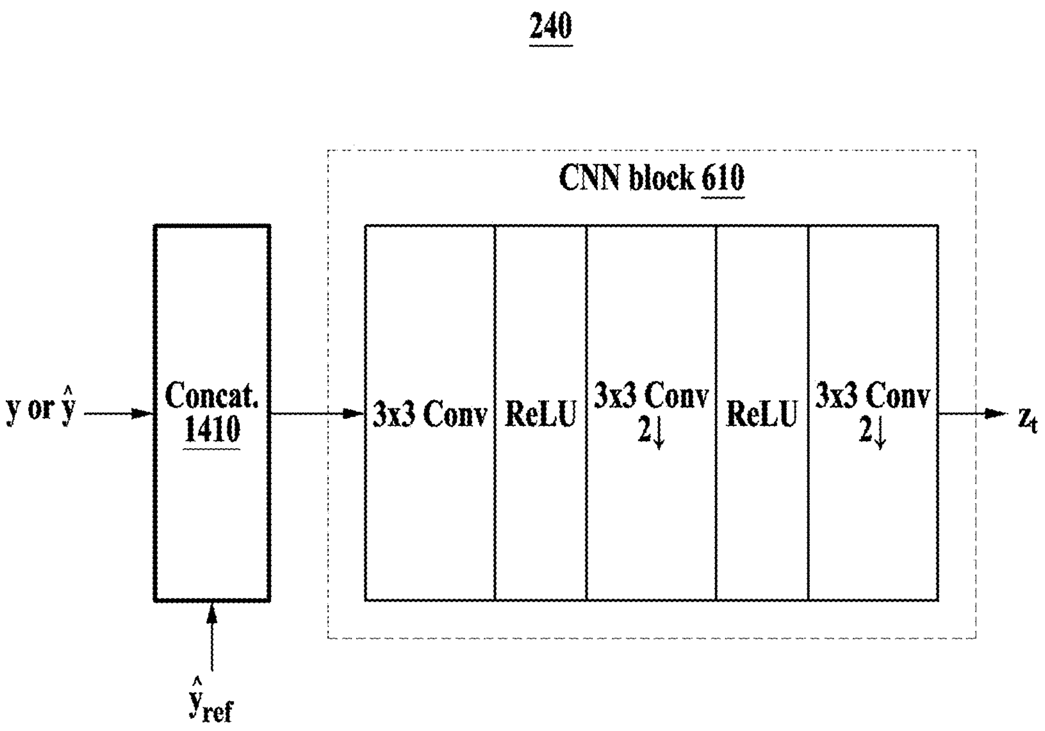
FIG. 14 is a diagram illustrating an operation of a temporal feature-based prior information extraction part, according to an embodiment.

FIG. 14 is a diagram illustrating an operation of a temporal feature-based prior information extraction part according to an embodiment. The description provided above with reference to FIGS. 1C through 13C may be equally applicable to the description provided below with reference to FIG. 14.

Referring to FIG. 14, when outputting prior information, the prior information extraction part 240 of one embodiment may output the prior information by additionally using a previously quantized reduced feature map, in addition to a current reduced feature map or a quantized reduced feature map.

The prior information extraction part 240 may include a concatenation layer (e.g., Concat.) 1410 and the CNN block 610. The concatenation layer 1410 may concatenate a current reduced feature map (or a quantized reduced feature map) and a previously decoded reduced feature map into one in a channel direction. This process may allow the concatenation layer 1410 to merge two different feature maps to more efficiently extract information that reflects a temporal relationship. The concatenation layer 1410 may concatenate the two input feature maps in the channel direction, and the concatenated data may be input to the CNN block 610.

The CNN block 610 of one embodiment may receive, as an input, the concatenated feature map and output temporal feature-based prior information via a 3×3 convolution filter, an activation function (ReLU), and a downsampling layer. The CNN block 610 may process the concatenated information and extract the prior information that reflects therein the temporal correlation.

In particular, the CNN block 610 may extract a temporal feature from a concatenated feature map of a current reduced feature map and a previous reduced feature map and may, based on this, generate prior information useful for encoding or decoding the current reduced feature map.

Figure 15:
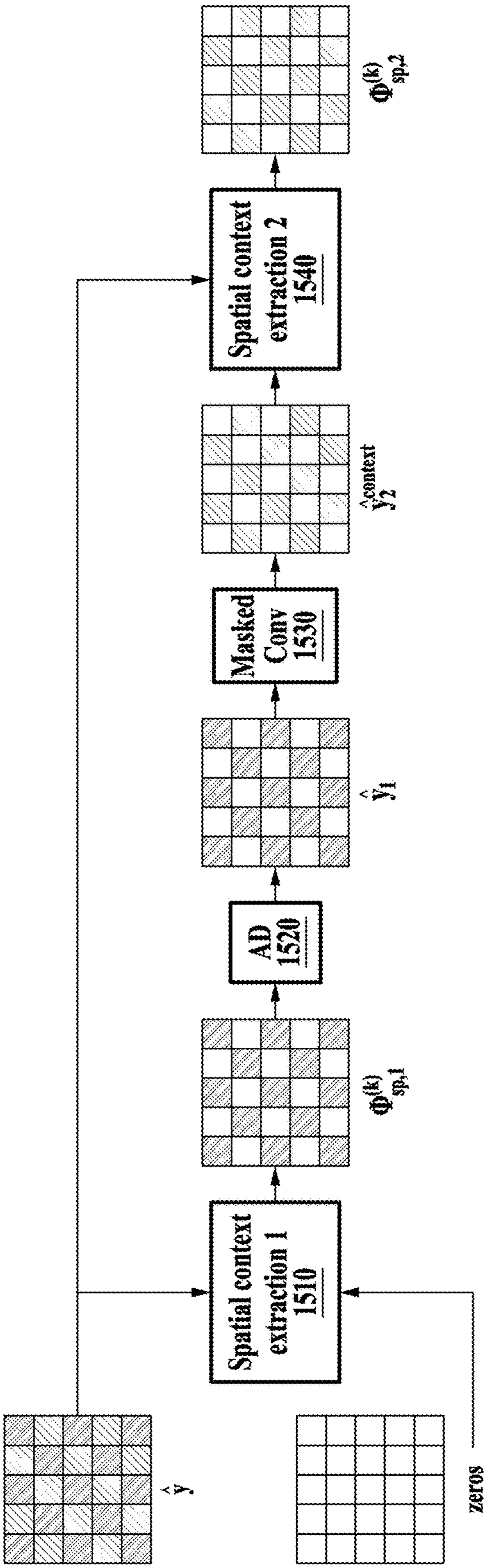
FIG. 15 is a diagram illustrating an operation of a spatial context extraction part, according to an embodiment.

FIG. 15 is a diagram illustrating an operation of a spatial context extraction part according to an embodiment. The description provided above with reference to FIGS. 1C through 14 may be equally applicable to the description provided below with reference to FIG. 15.

According to one embodiment, a spatial context may refer to information that reflects therein a correlation between spatial positions of the same feature map in a multilayer feature map. In particular, since a feature map may include data based on horizontal and vertical (and channel) positions in a two-dimensional (2D) or three-dimensional (3D) space, a relationship between these spatial positions may form a very significant pattern. For example, neighboring pixels in an image may be likely to have similar values or patterns. In this case, information that reflects such a spatial correlation between close positions in a feature map may be referred to as the spatial context. The spatial context may provide information about how each spatial position in a feature map is associated with its neighboring positions, and may be used to reduce data redundancy in an encoding process. In a decoding process, the spatial context may also contribute to more accurately reconstructing a feature map from a bitstream.

Referring to FIG. 15, a first spatial context extraction part 1510 of one embodiment may spatially segment a reduced feature map using a checkerboard pattern and may, using an encoded subgroup, extract information about the remaining subgroups. In this process, the already encoded subgroup may be used as a spatial context, and may provide important information for estimating a probability distribution of the subgroups.

An addition block (AD) 1520 of one embodiment may calculate a predicted reduced feature map $\hat{y}_1$ using information of the already encoded subgroup. This process may use additional information to increase the prediction accuracy for a feature map that is subject to current encoding and may, as a result, generate a feature map to be used as an input to a masked convolution part 1530.

The masked convolution part 1530 of one embodiment may extract a context of a subgroup that is subject to current encoding, using the information of the previously encoded subgroup and the spatial context. In this case, masked convolution may mask a portion of a current feature map and extract information from the remaining portion to form the spatial context. This process may use already encoded information as a mask to more accurately predict a probability distribution of a portion or region that is not encoded.

In addition, a second spatial context extraction part 1540 of one embodiment may extract a second spatial context. The second spatial context may include information of a subgroup that is subject to second encoding, and may be used to finally estimate an overall probability distribution of a reduced feature map. This context may have the same number of channels and the same spatial resolution as the reduced feature map, and may play an important role in improving the encoding and decoding efficiency.

Figure 16:
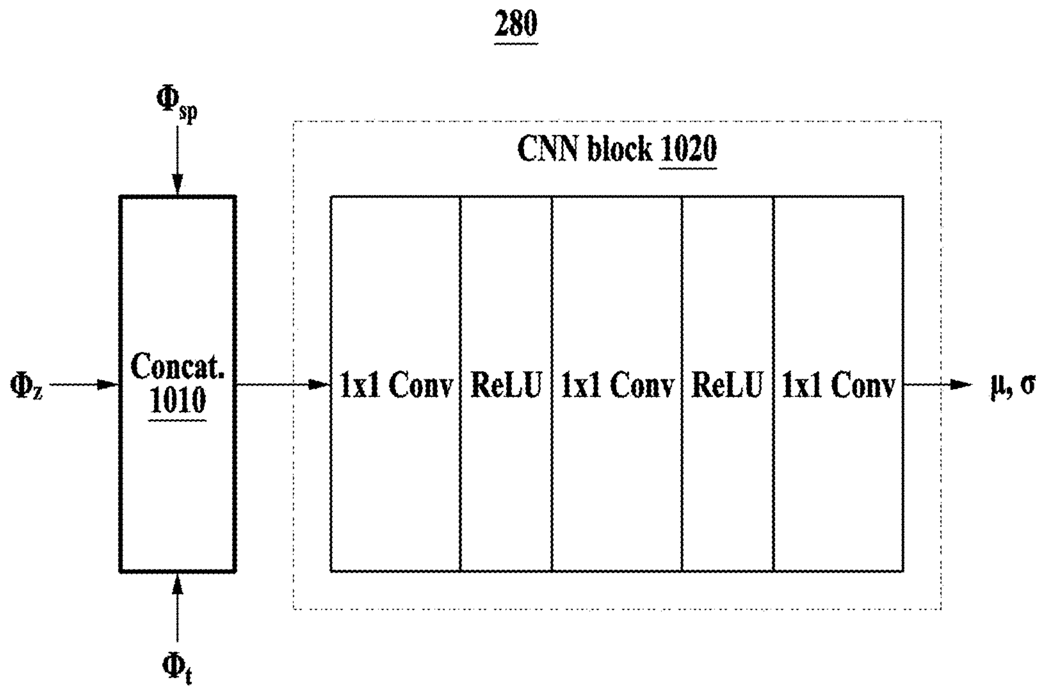
FIG. 16 is a diagram illustrating an operation of a temporal feature-based probability distribution estimation part, according to an embodiment.

FIG. 16 is a diagram illustrating an operation of a temporal feature-based probability distribution estimation part according to an embodiment. The description provided above with reference to FIGS. 1C through 15 may be equally applicable to the description provided below with reference to FIG. 16.

Referring to FIG. 16, a temporal feature-based probability distribution estimation part (e.g., temporal feature-based probability distribution estimation part 280 of FIG. 2 and/or temporal feature-based probability distribution estimation part 380 of FIG. 3) of one embodiment may be configured in a neural network structure that receives, as an input, at least one of a prior context, a temporal context, and a spatial context, and outputs a probability distribution of a current reduced feature map. This probability distribution may be used to process the current reduced feature map in encoding and decoding processes.

Although the temporal context, the prior context, and the spatial context are different pieces of information, two contexts may be effectively concatenated into a single input using inter-channel connection 1010. The inter-channel connection 1010 may serve to concatenate the prior context, the temporal context, and the spatial context into a single tensor, and the spatial resolution of the three contexts may be preferably the same as the resolution of the reduced feature map. The number of channels may differ in the three contexts, but after the concatenation, they may maintain the same spatial resolution for efficient processing.

The CNN block 1020 of one embodiment may serve to process the concatenated context to ultimately estimate the probability distribution. The CNN block 1020 may include a series of 1×1 convolution layer and an activation function (ReLU), and may efficiently process the input data to estimate the probability distribution of the current reduced feature map. This probability distribution may be set to be the same as the number of channels and the spatial resolution of the reduced feature map to ensure consistency during the encoding and decoding processes.

Further, the temporal feature-based probability distribution estimation part (e.g., temporal feature-based probability distribution estimation part 280 of FIG. 2 and/or temporal feature-based probability distribution estimation part 380 of FIG. 3) of one embodiment may be implemented by a combination of various neural network blocks used in image processing and machine learning in addition to the CNN block 1020 shown in FIG. 16. This may be deformed into a structure that is more optimized for the characteristics of specific data.

Figure 17:
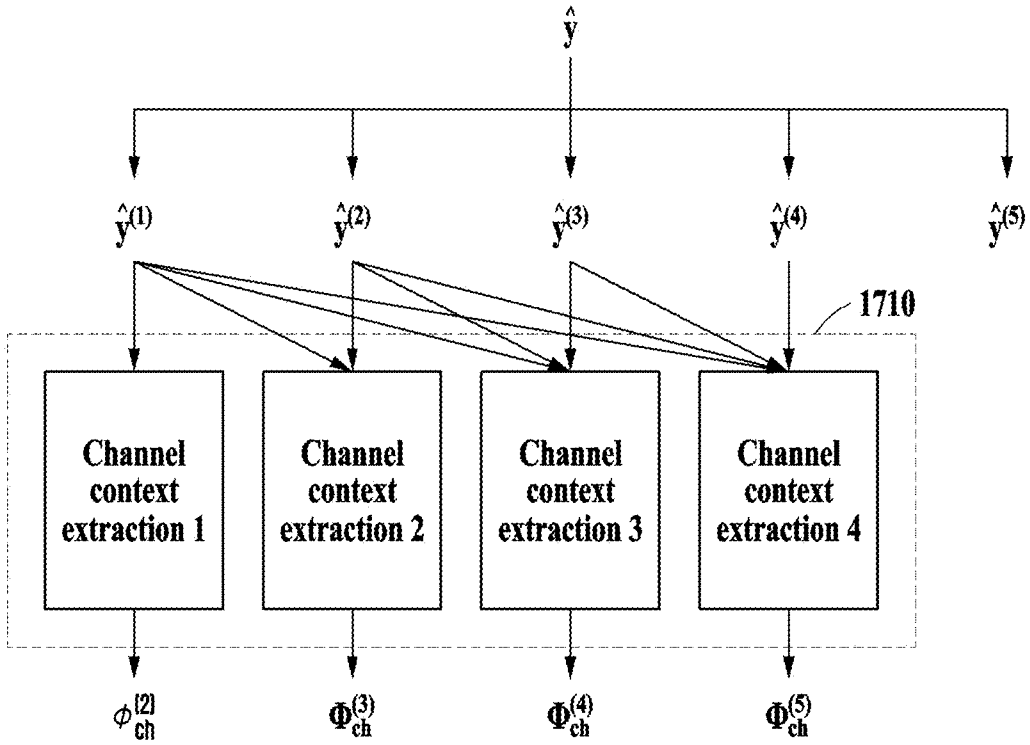
FIG. 17 is a diagram illustrating an operation of a channel context extraction part, according to an embodiment.

FIG. 17 is a diagram illustrating an operation of a channel context extraction part according to an embodiment. The description provided above with reference to FIGS. 1C through 16 may be equally applicable to the description provided below with reference to FIG. 17.

Referring to FIG. 17, a channel context extraction part 1710 of one embodiment may generate additional contextual information for each channel group, using channel-specific information of a previous reduced feature map. A channel context generated as described above may provide important information when estimating a probability distribution of a reduced feature map that is subject to current encoding or decoding. The channel context may contribute to minimizing the redundancy of the channel-specific information and improving compression performance.

When sequentially estimating a probability distribution for each reduced feature map group $\hat{y}^{(k)}$ after segmenting a current reduced feature map (or scaled current reduced feature map) into a plurality of groups (e.g., five groups ($\hat{y}^{(1)}$, $\hat{y}^{(2)}$, $\hat{y}^{(3)}$, $\hat{y}^{(4)}$, $\hat{y}^{(5)}$)) unequally along a channel direction, the channel context extraction part 1710 may additionally use information of an already decoded reduced feature map group $\hat{y}^{(<k)}$.

Figure 18:
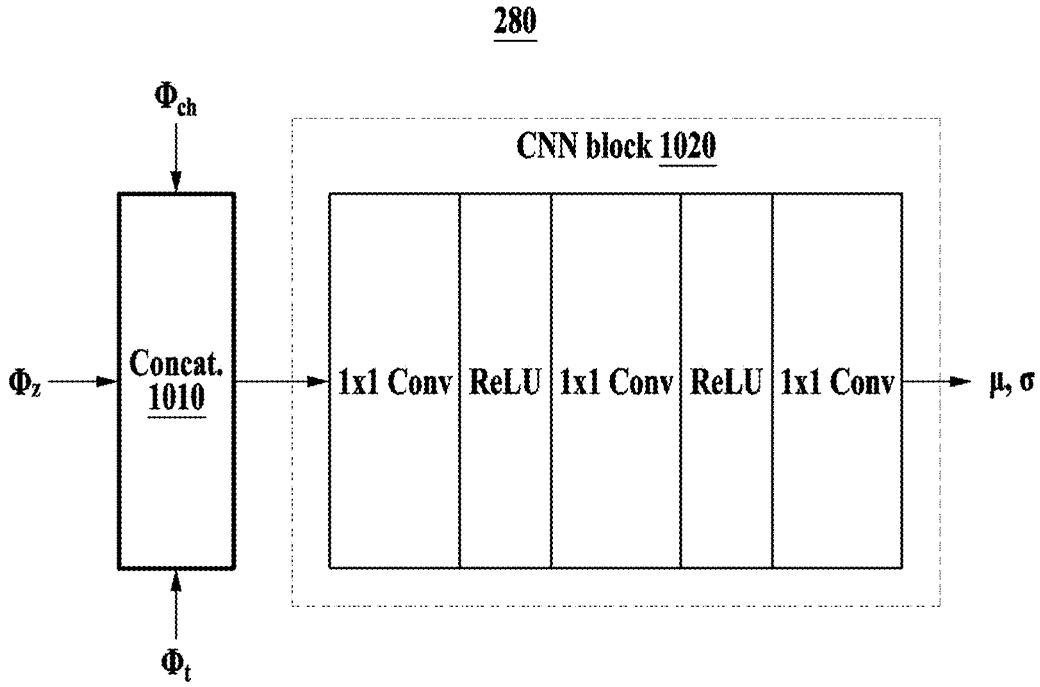
FIG. 18 is a diagram illustrating an operation of a temporal feature-based probability distribution estimation part, according to an embodiment.

FIG. 18 is a diagram illustrating an operation of a temporal feature-based probability distribution estimation part, according to an embodiment. The description provided above with reference to FIGS. 1C through 17 may be equally applicable to the description provided below with reference to FIG. 18.

Referring to FIG. 18, a temporal feature-based probability distribution estimation part (e.g., temporal feature-based probability distribution estimation part 280 of FIG. 2 and/or temporal feature-based probability distribution estimation part 380 of FIG. 3) of one embodiment may be configured in a neural network structure that receives, as an input, at least one of a prior context, a temporal context, and a channel context, and outputs a probability distribution of a current reduced feature map. This probability distribution may be used to process the current reduced feature map in encoding and decoding processes.

Although the temporal context, the prior context, and the channel context are different pieces of information, two contexts may be effectively concatenated into a single input using inter-channel connection 1010. The inter-channel connection 1010 may serve to concatenate the prior context, the temporal context, and the channel context into a single tensor, and the spatial resolution of the three contexts may be preferably the same as the resolution of the reduced feature map. The number of channels may differ in the three contexts, but after the concatenation, they may maintain the same spatial resolution for efficient processing.

The CNN block 1020 of one embodiment may serve to process the concatenated context to ultimately estimate the probability distribution. The CNN block 1020 may include a series of 1×1 convolution layer and an activation function (ReLU), and may efficiently process the input data to estimate the probability distribution of the current reduced feature map. This probability distribution may be set to be the same as the number of channels and the spatial resolution of the reduced feature map to ensure consistency during the encoding and decoding processes.

Further, the temporal feature-based probability distribution estimation part (e.g., temporal feature-based probability distribution estimation part 280 of FIG. 2 and/or temporal feature-based probability distribution estimation part 380 of FIG. 3) of one embodiment may be implemented by a combination of various neural network blocks used in image processing and machine learning in addition to the CNN block 1020 shown in FIG. 18. This may be deformed into a structure that is more optimized for the characteristics of specific data.

Figure 19A:
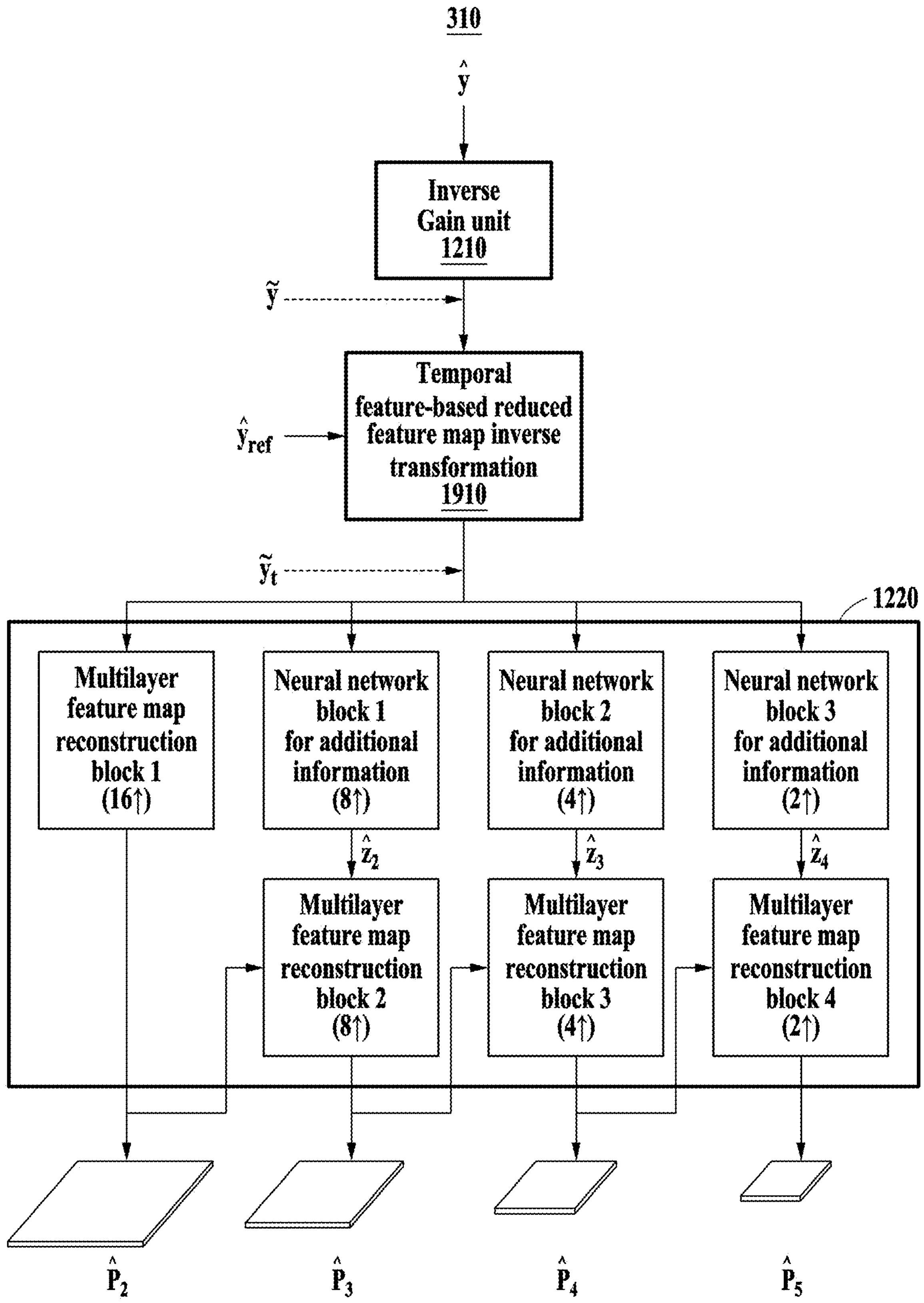
FIGS. 19A through 19C are diagrams illustrating an operation of a temporal feature-based multilayer feature map reconstruction part, according to an embodiment.
Figure 19B:
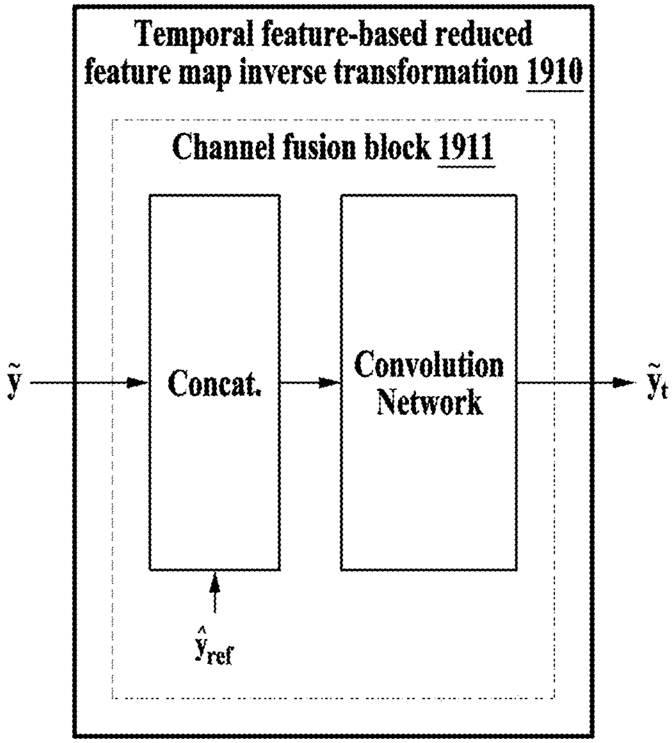
Figure 19C:
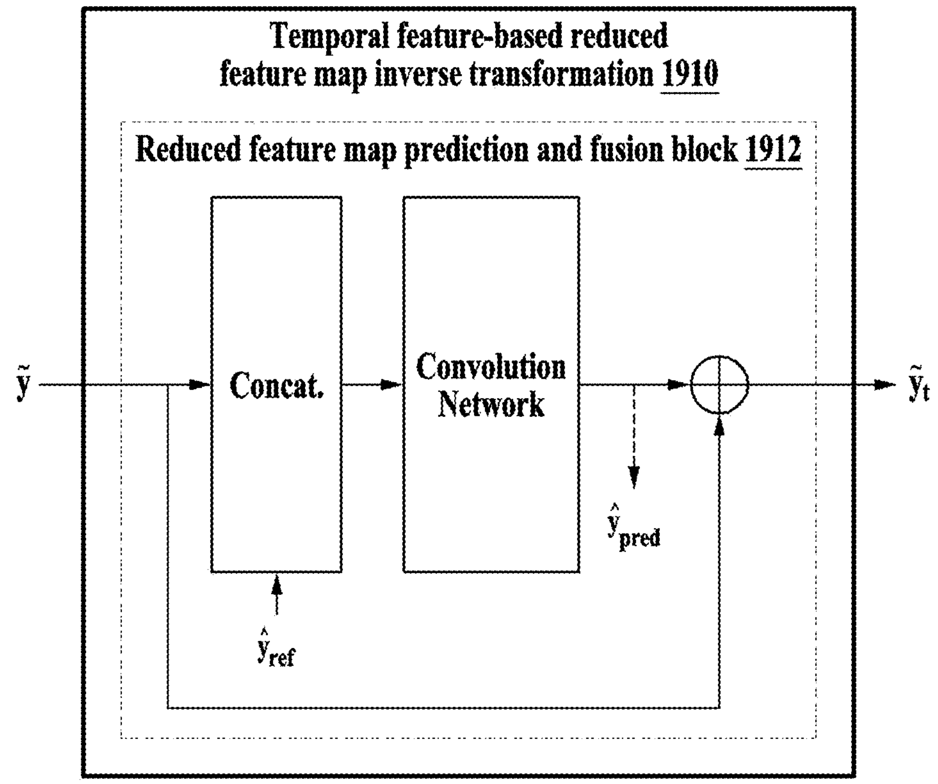

FIGS. 19A through 19C are diagrams illustrating an operation of a temporal feature-based multilayer feature map reconstruction part according to an embodiment. The description provided above with reference to FIGS. 1C through 18 may be equally applicable to the description provided below with reference to FIGS. 19A through 19C.

Referring to FIG. 19A, the multilayer feature map reconstruction part 310 of one embodiment may further use a previously decoded reduced feature map when reconstructing a current multilayer feature map.

According to one embodiment, a decoded reduced feature map may be input to the inverse gain unit 1210, and the inverse gain unit 1210 may output a reduced feature map that is scaled for each channel.

This scaled reduced feature map may be transmitted to a temporal feature-based reduced feature map inverse transformation part 1910. The temporal feature-based reduced feature map inverse transformation part 1910 may receive, as an input, a currently decoded reduced feature map (e.g., the scaled reduced feature map) along with the previously decoded reduced feature map, and may concatenate the two feature maps to inversely transform it into an intermediate reduced feature map.

Referring to FIG. 19B, a channel fusion block 1911 may concatenate two reduced feature maps through inter-channel connection to reflect more precise temporal context information.

Referring to FIG. 19C, a reduced feature map prediction and fusion block 1912 may use, as an input, a previously decoded reduced feature map and a currently decoded reduced feature map to output a predicted intermediate reduced feature map (e.g., $\hat{y}_{pred}$). It may add the currently decoded reduced feature map to the predicted intermediate reduced feature map to inversely transform it into an intermediate reduced feature map.

The temporal feature-based reduced feature map inverse transformation part 1910 may learn such a concatenated feature, and generate the intermediate reduced feature map that reflects therein a temporal feature. The intermediate reduced feature map may be transmitted to the reconstruction block 1220 of one embodiment, and may be used therein to sequentially reconstruct a multilayer feature map.

FIGS. 20 through 24 are diagrams illustrating intra-screen compression and inter-screen compression according to an embodiment. The description provided above with reference to FIGS. 1C through 19C may be equally applicable to the description provided below with reference to FIGS. 20 through 24.

Figure 20:
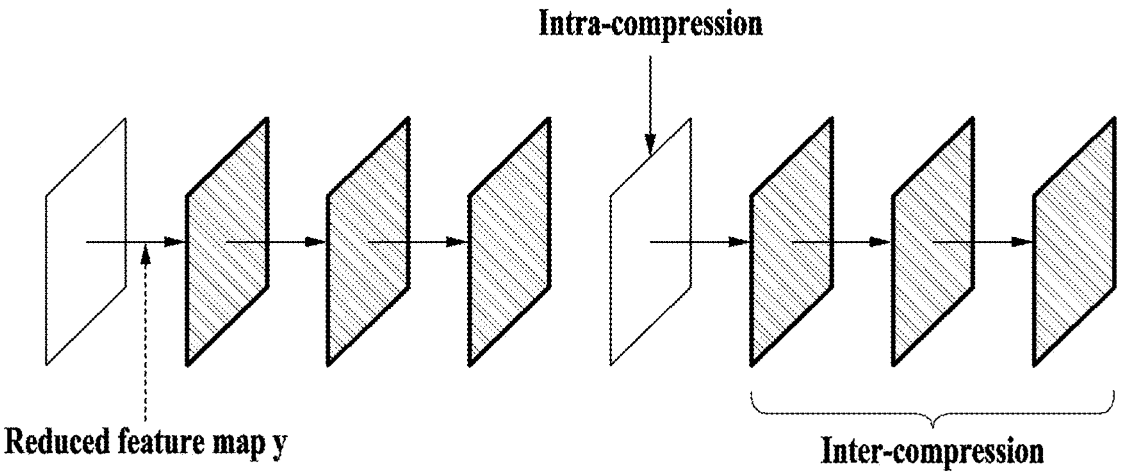
FIGS. 20 through 24 are diagrams illustrating intra-screen compression and inter-screen compression, according to an embodiment.

Referring to FIG. 20, according to one embodiment, intra-screen compression may refer to a method of compressing data by reducing spatial redundancy within an independent frame, which may compress each frame separately. For example, it may be a compression method for a first frame. In contrast, inter-screen compression may refer to a method of compressing data by reducing temporal redundancy between multiple frames, which may reduce data by recording only a difference between frames (e.g., a current frame and a previous or subsequent frame).

Figure 21:
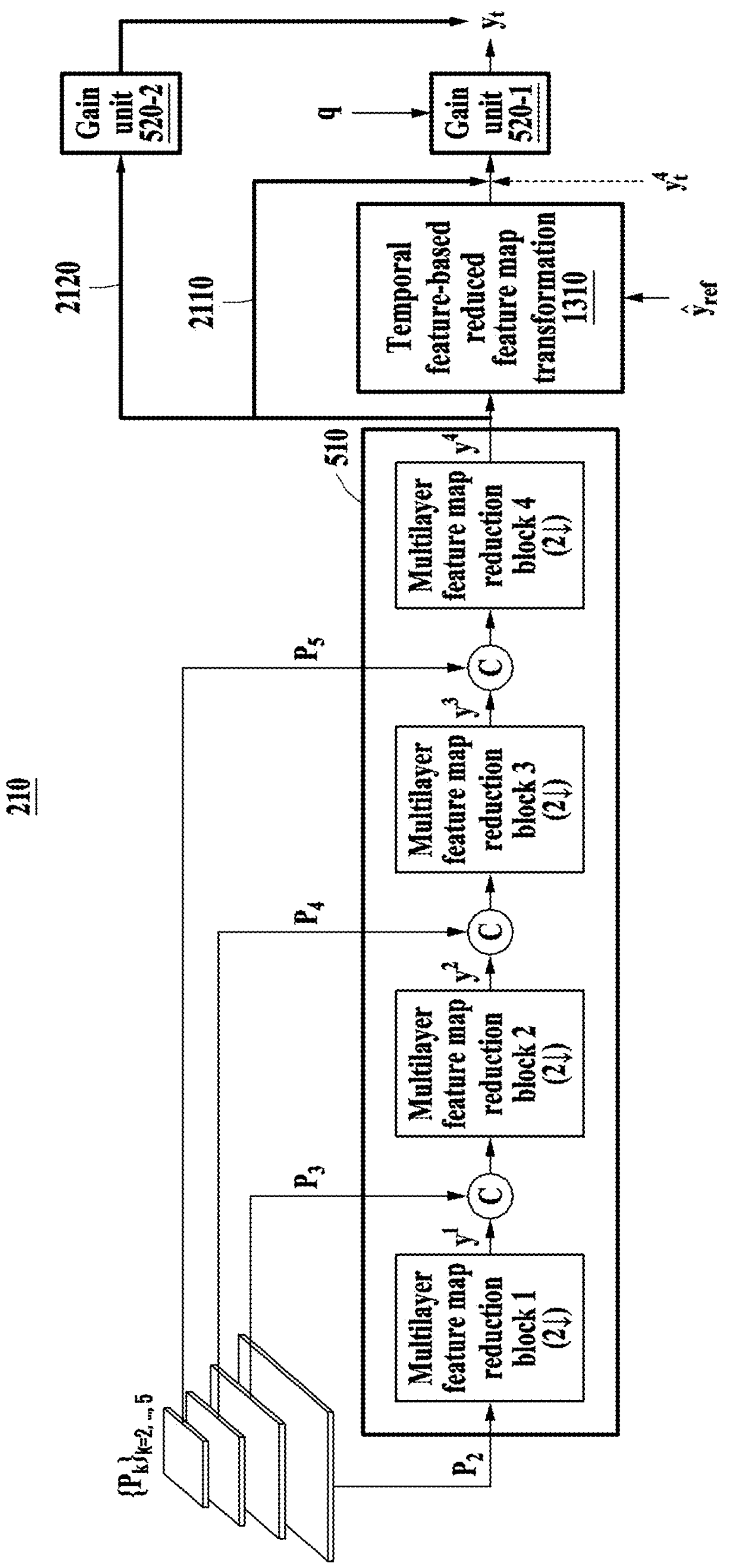

Referring to FIG. 21, the multilayer feature map reduction part 210 of one embodiment may support both an intra-screen compression process and an inter-screen compression process.

The intra-screen compression process may compress data only within a current frame without considering a temporal context, and therefore some processes such as a process of outputting an intermediate latent feature map predicted by the channel fusion block 1311 of the temporal feature-based reduced feature map transformation part 1310 and the reduced feature map prediction and fusion block 1312 of the temporal feature-based reduced feature map transformation part 1310 may be omitted. In contrast, the inter-screen compression process may use information about a previously quantized reduced feature map and a current frame together to perform compression more efficiently.

In the intra-screen compression process, data flow 2110 indicates a flow of a case where a gain unit 520-1 is shared by the intra-screen compression process and the inter-screen compression process, and data flow 2120 indicates a flow of a case where a gain unit 520-2 in the intra-screen compression process and the gain unit 520-1 in the inter-screen compression process are used separately. In both cases, multilayer feature map reduction blocks may be shared with multilayer feature map reduction blocks in the inter-screen compression process.

Figure 22:
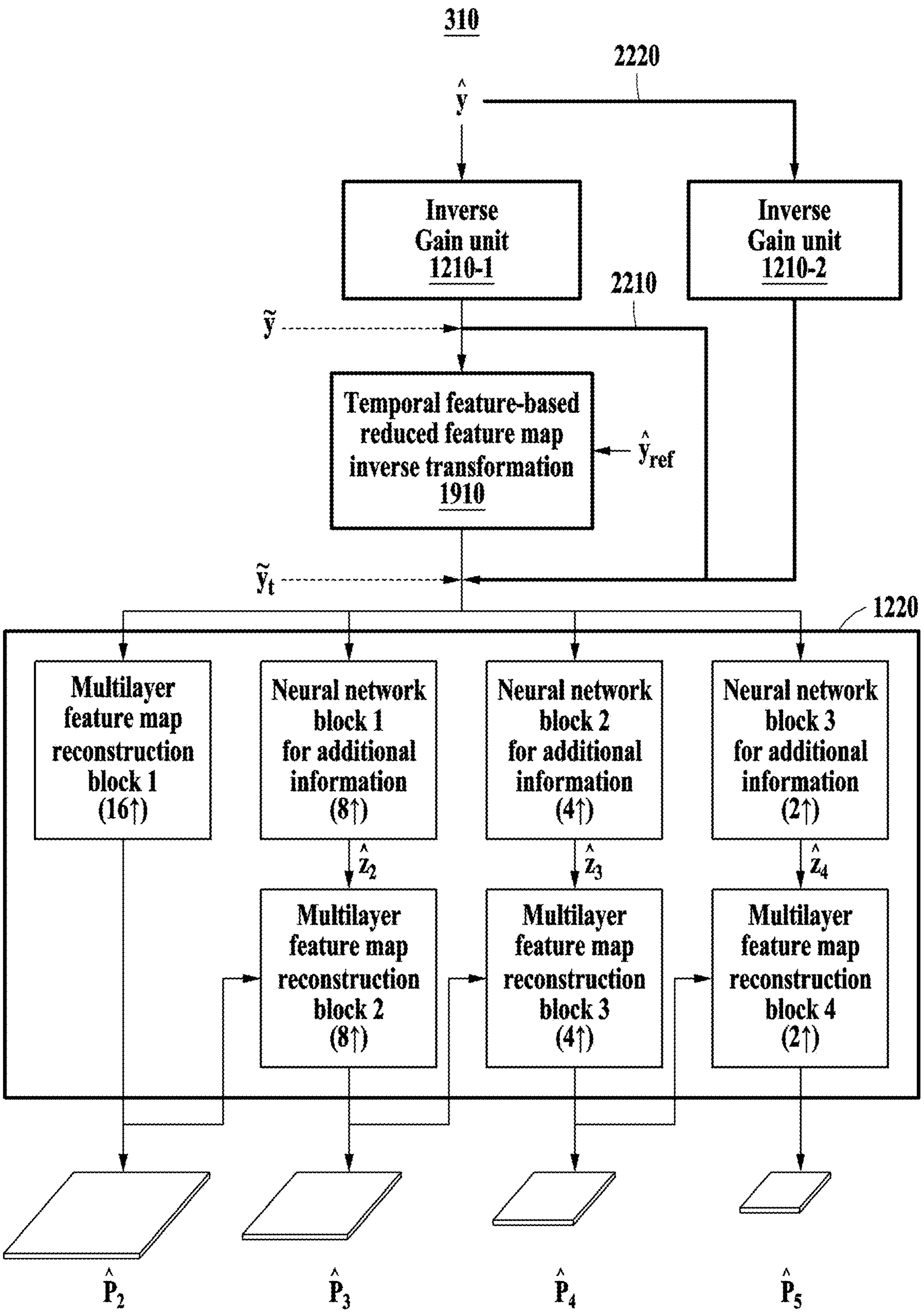

Referring to FIG. 22, the multilayer feature map reconstruction part 310 of one embodiment may also support both an intra-screen reconstruction process and an inter-screen reconstruction process.

The intra-screen reconstruction process may reconstruct data only within a current frame without considering a temporal context, and therefore some processes such as a process of outputting an intermediate reduced feature map predicted by the channel fusion block 1911 of the temporal feature-based reduced feature map inverse transformation part 1910 and the reduced feature map prediction and fusion block 1912 of the temporal feature-based reduced feature map inverse transformation part 1910 may be omitted. In contrast, the inter-screen reconstruction process may use information about a previously decoded reduced feature map and a current frame together to perform reconstruction more efficiently.

In the intra-screen reconstruction process, data flow 2210 indicates a flow of a case where an inverse gain unit 1220-1 is shared by the intra-screen reconstruction process and the inter-screen reconstruction process, and data flow 2220 indicates a flow of a case where an inverse gain unit 1220-2 in the intra-screen reconstruction process and the inverse gain unit 1220-1 in the inter-screen reconstruction process are used separately. In both cases, multilayer feature map reconstruction blocks may be shared with multilayer feature map reconstruction blocks in the inter-screen reconstruction process.

Figure 23:
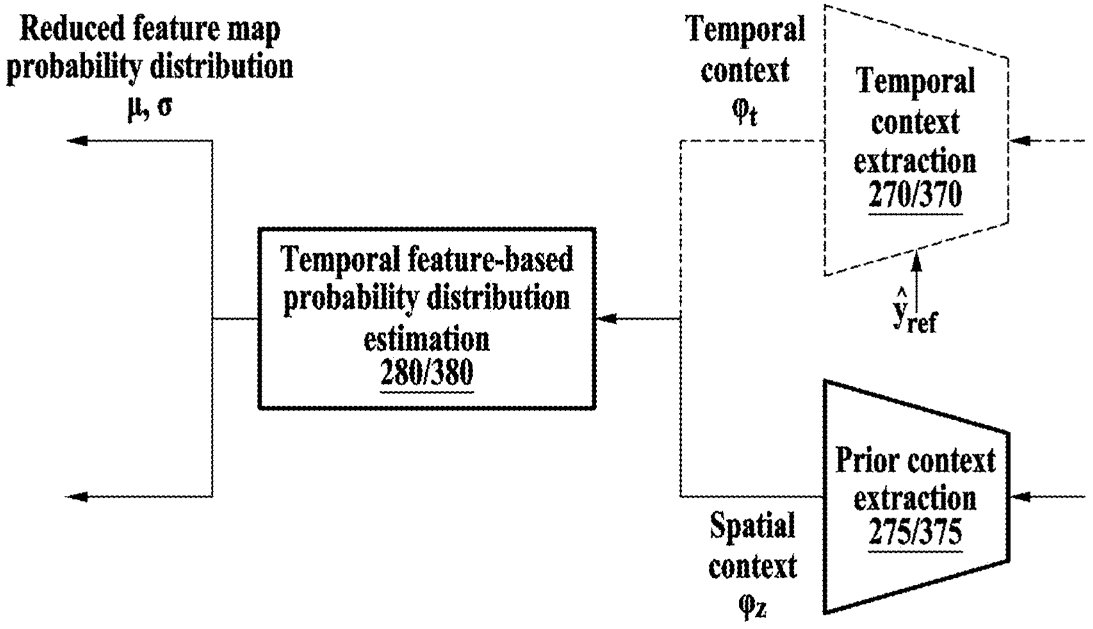
Figure 24:
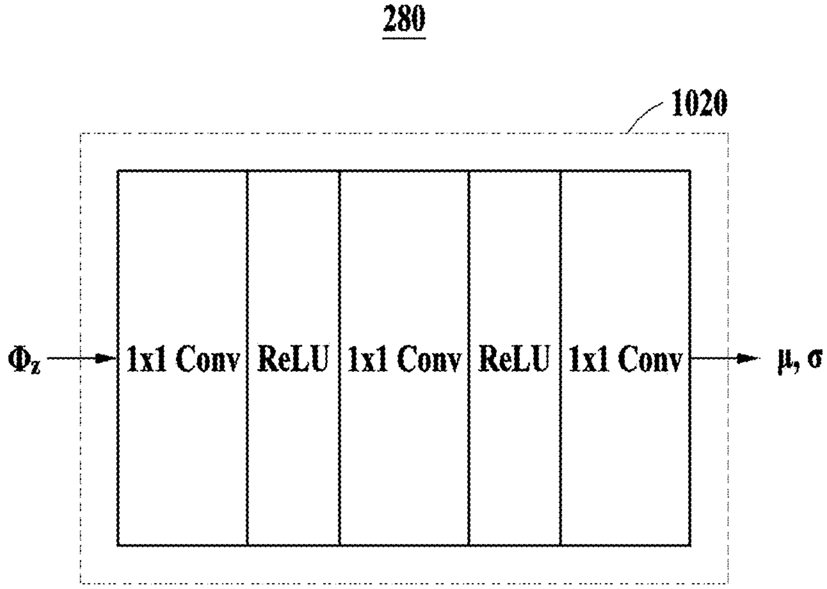

According to one embodiment, an example of using a temporal context extraction part (e.g., temporal context extraction part 270 of FIG. 2 and/or temporal context extraction part 370 of FIG. 3) and a prior context extraction part (e.g., prior context extraction part 275 of FIG. 2 and/or prior context extraction part 375 of FIG. 3) together in an inter-screen compression/reconstruction process is described with reference to FIG. 23. In an intra-screen compression/reconstruction process, the temporal context extraction part (e.g., temporal context extraction part 270 of FIG. 2 and/or temporal context extraction part 370 of FIG. 3) may not be used, and the prior context extraction part (e.g., prior context extraction part 275 of FIG. 2 and/or prior context extraction part 375 of FIG. 3) may only be used to estimate a probability distribution of a reduced feature map. Thus, referring to FIG. 24, in the intra-screen compression/reconstruction process, a temporal feature-based probability distribution estimation part (e.g., temporal feature-based probability distribution estimation part 280 of FIG. 2 and/or temporal feature-based probability distribution estimation part 380 of FIG. 3) may estimate the probability distribution based only on a prior context.

In contrast, in the inter-screen compression/reconstruction process, the temporal context extraction part (e.g., temporal context extraction part 270 of FIG. 2 and/or temporal context extraction part 370 of FIG. 3) may be additionally used, enabling more accurate probability distribution estimation. A temporal context may contribute to increasing the compression/reconstruction efficiency as it reflects therein a temporal correlation of reduced feature maps. Therefore, high efficiency may be achieved in the inter-screen compression/reconstruction process.

Figure 25:
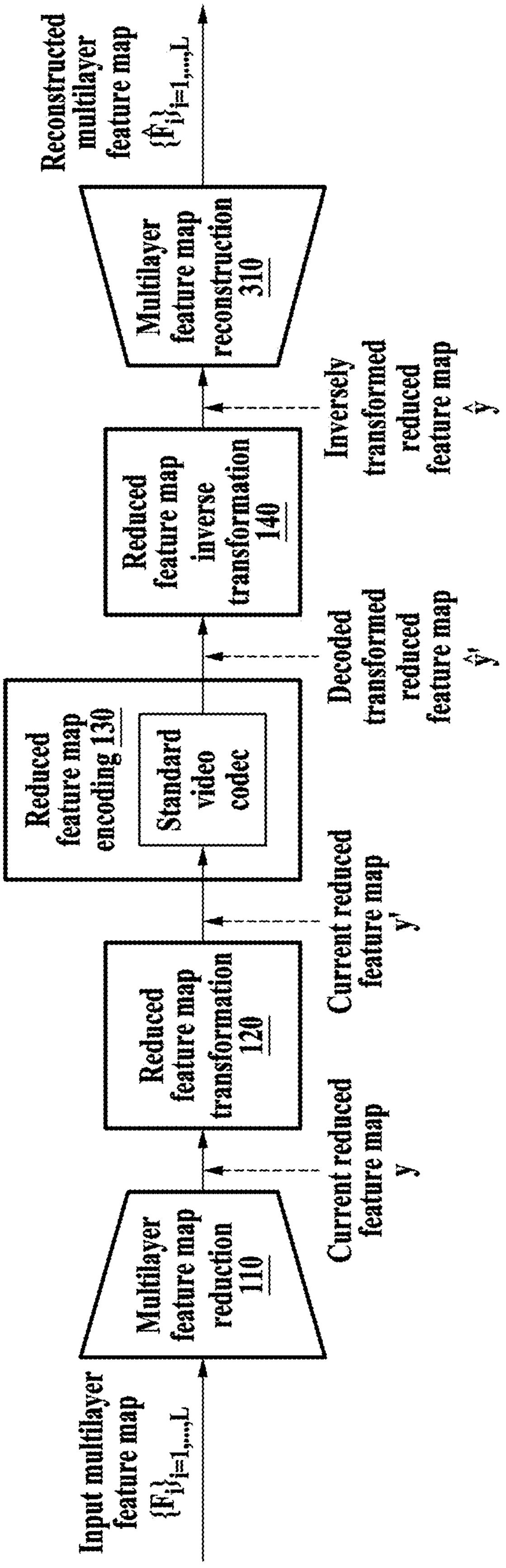
FIGS. 25 and 26 are diagrams illustrating processes of compressing and reconstructing a reduced feature map using a standard video codec, respectively, according to an embodiment.
Figure 26:
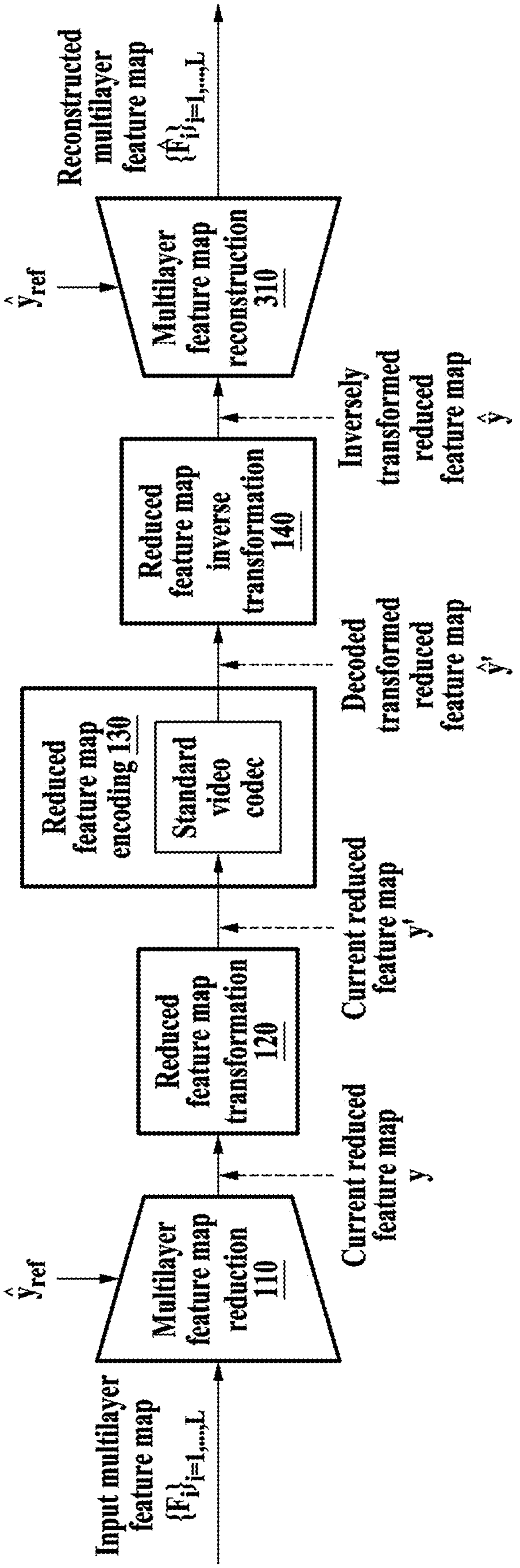

FIGS. 25 and 26 are diagrams illustrating processes of compressing and reconstructing a reduced feature map using a standard video codec, respectively. The description provided above with reference to FIGS. 1C through 24 may be equally applied to the description provided below with reference to FIGS. 25 and 26.

FIG. 25 illustrates an example of using a standard video codec in a related multilayer feature map reduction and reconstruction process, and FIG. 26 illustrates an example of using a temporal feature to reduce and reconstruct a multilayer feature map Referring to FIG. 25, a multilayer feature map reduction part 210 shown in FIG. 25 may be the multilayer feature map reduction part 210 described above with reference to FIG. 5. After the multilayer feature map reduction part 210 reduces a multilayer feature map, the reduced feature map may be transformed spatially and channel-wise via the reduced feature map transformation part 120. The reduced feature map may be encoded using a standard video codec of the reduced feature map encoding part 130, and the encoded reduced feature map may be transformed into its original spatial and channel structure via the reduced feature map inverse transformation part 140 after decoding. In addition, the feature map may be reconstructed to the original multilayer feature map via the multilayer feature map reconstruction part 310.

Referring to FIG. 26, a multilayer feature map reduction part 210 shown in FIG. 26 may include and/or may be similar in many respects to the multilayer feature map reduction part 210 described above with reference to FIG. 13, and may include additional features not mentioned above. The multilayer feature map reduction part 210 of FIG. 26 may generate a current reduced feature map by additionally using a previous reduced feature map.

Referring to FIGS. 25 and 26, the process of using the standard video codec may indicate that the process of encoding and reconstructing a reduced feature map according to one embodiment may also be applicable to a case of using the standardized codec rather than using a neural network-based entropy encoding part, and may include transforming a feature map requiring a spatial and channel-wise transformation to increase compatibility with the video codec.

Figure 27:
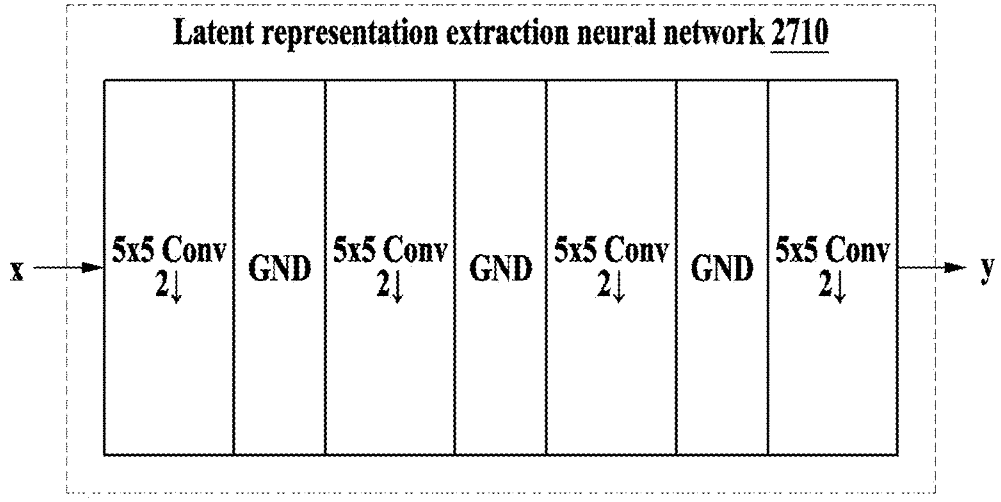
FIG. 27 is a diagram illustrating an example of a neural network showing how an encoding method, according to an embodiment, is applicable to a single layer or a natural image.

FIG. 27 is a diagram illustrating an example of a neural network showing how an encoding method according to an embodiment is applicable to a single layer or a natural image. The description provided above with reference to FIGS. 1C through 26 may be equally applicable to the description provided below with reference to FIG. 27.

Referring to FIG. 27, the multilayer feature map reduction part 210 of one embodiment may be implemented based on a neural network 2710 of FIG. 27. The neural network 2710 of one embodiment may be a latent representation extraction neural network that receives, as an input, a single layer or a natural image and outputs a latent representation. The neural network 2710 may include a 5×5 convolution layer and a GDN layer, which are alternately formed, and may compress and transform information of an input image to generate a latent representation. The neural network 2710 may be used in an image compression process, enabling more efficient compression by learning high-dimensional features.

Figure 28:
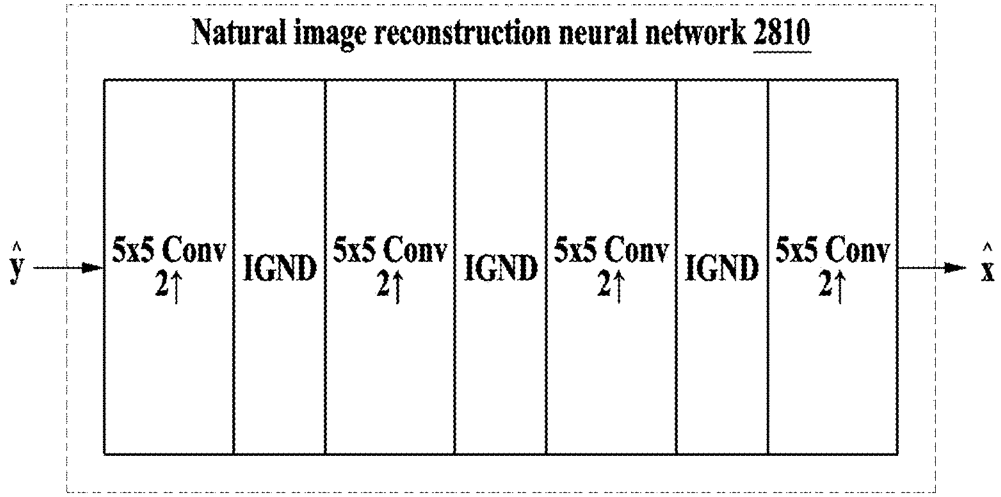
FIG. 28 is a diagram illustrating an example of a neural network showing how a decoding method, according to an embodiment, is applicable to a single layer or a natural image.

FIG. 28 is a diagram illustrating an example of a neural network showing how a decoding method according to an embodiment is applicable to a single layer or a natural image. The description provided above with reference to FIGS. 1C through 27 may be equally applicable to the description provided below with reference to FIG. 28.

Referring to FIG. 28, the multilayer feature map reconstruction part 310 of one embodiment may be implemented based on a neural network 2810 of FIG. 28. The neural network 2810 of one embodiment may receive, as an input, a decoded latent representation and output a reconstructed single layer or natural image. The neural network 2810 may perform a reconstruction process that is opposite to what is performed by the neural network 2710 of FIG. 27, and may include a 5×5 convolution layer and an IGDN layer, which are alternately formed, to reconstruct the latent representation to an image similar to the original image. The neural network 2810 may decompress the compressed image data and reconstruct the original natural image.

Figure 29:
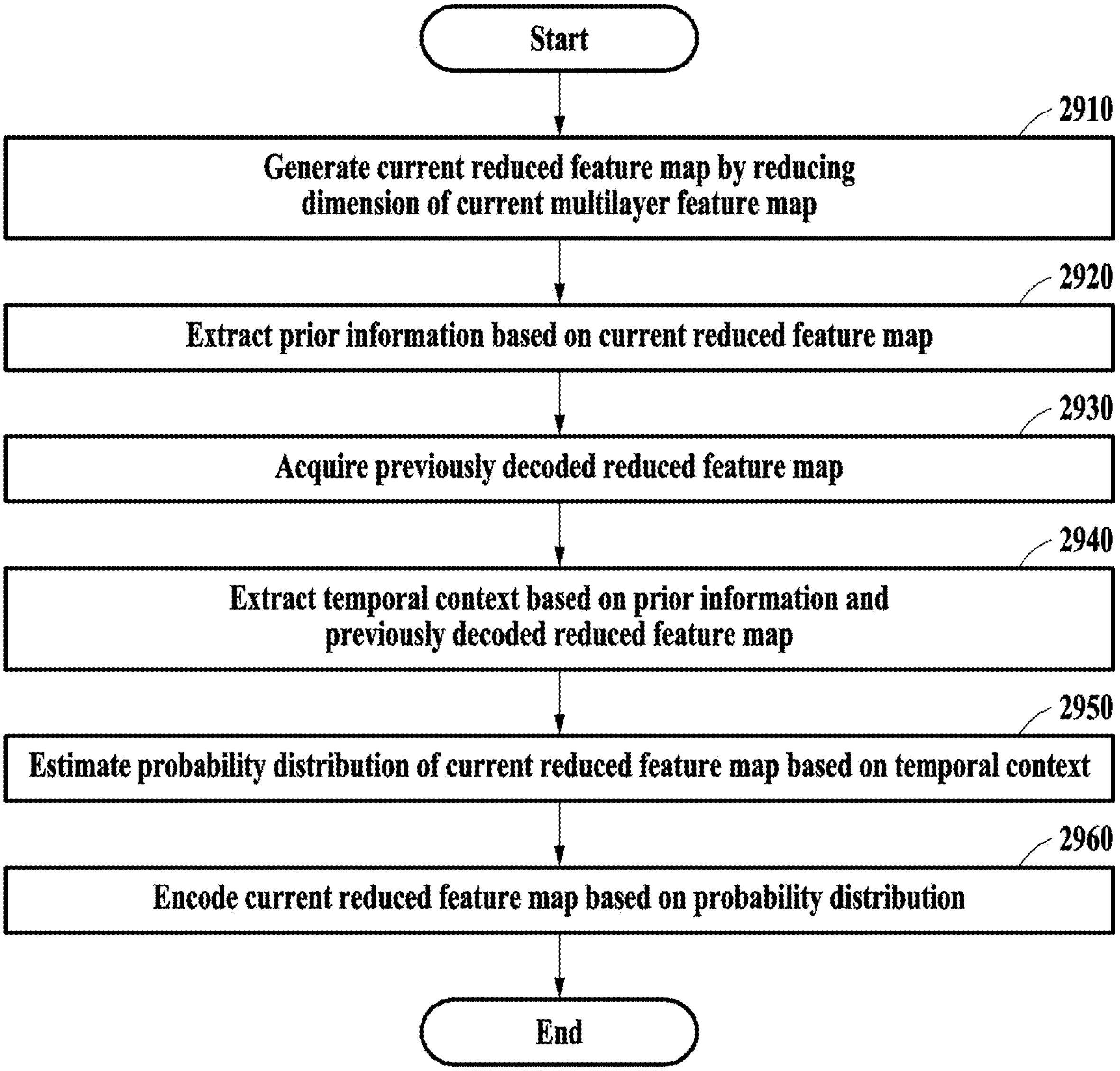
FIG. 29 is a flowchart illustrating an encoding method, according to an embodiment.

FIG. 29 is a flowchart illustrating an encoding method according to an embodiment. The description provided above with reference to FIGS. 1C through 28 may be equally applicable to the description provided below with reference to FIG. 29.

For ease of description, operations 2910 through 2960 are described as being performed using the encoder shown in FIG. 2. However, operations 2910 through 2960 may be used in any suitable system via any other suitable electronic device.

In addition, although the operations described below with reference to FIG. 29 may be performed in the illustrated order and manner, the order of some operations may be changed, or some operations may be omitted without departing from the spirit and scope of the embodiments described herein. In addition, some of the operations described below with reference to FIG. 29 may be performed in parallel or simultaneously. For example, operation 2930 may be performed before performing operation 2920.

At operation 2910, the encoder of one embodiment may generate a current reduced feature map by reducing (or scaling down) a dimension of a current multilayer feature map. The encoder may generate the current reduced feature map based on the current multilayer feature map and a previous reduced feature map. For example, the encoder may reduce the current multilayer feature map, generate an intermediate latent feature map, and generate the current reduced feature map based on the intermediate latent feature map and the previous reduced feature map. In a first reduction operation, the encoder may perform channel-wise scaling on the intermediate latent feature map to generate the current reduced feature map. The first reduction operation may correspond to the intra-screen compression process described above. In a second reduction operation, the encoder may concatenate the intermediate latent feature map and the previous reduced feature map and perform channel-wise scaling on the concatenated feature map to generate the current reduced feature map. The second reduction operation may correspond to the inter-screen compression process described above.

At operation 2920, the encoder of one embodiment may extract prior information based on the current reduced feature map. The encoder may extract the prior information based on the current reduced feature map and the previous reduced feature map.

At operation 2930, the encoder of one embodiment may acquire the previous reduced feature map.

At operation 2940, the encoder of one embodiment may extract a temporal context based on the prior information and the previous reduced feature map. The encoder may extract an offset based on the prior information and extract the temporal context based on the offset and the previous reduced feature map.

At operation 2950, the encoder of one embodiment may estimate a probability distribution of the current reduced feature map based on the temporal context. The encoder may estimate the probability distribution based on the temporal context and a prior context.

At operation 2960, the encoder of one embodiment may encode the current reduced feature map based on the probability distribution.

The encoder may generate a quantized reduced feature map by quantizing the current reduced feature map. The encoder may also generate quantized prior information by quantizing the prior information. In this case, the current reduced feature map and the prior information may be quantized by the same method. The encoder may perform quantization equally (e.g., using a related rounding operation) on all components of the current reduced feature map or the prior information to output the quantized reduced feature map or the quantized prior information. In neural network-based image compression, the quantization may be replaced with a process of adding uniform noise between −0.5 and 0.5, in a training phase, and a rounding function in an inference phase, to enable the use of a backpropagation algorithm. In addition, to reduce a mismatch between the training phase and the inference phase, the rounding function may also be used in the training phase, and in this case, an identity function may be used to calculate a gradient for the rounding function.

Figure 30:
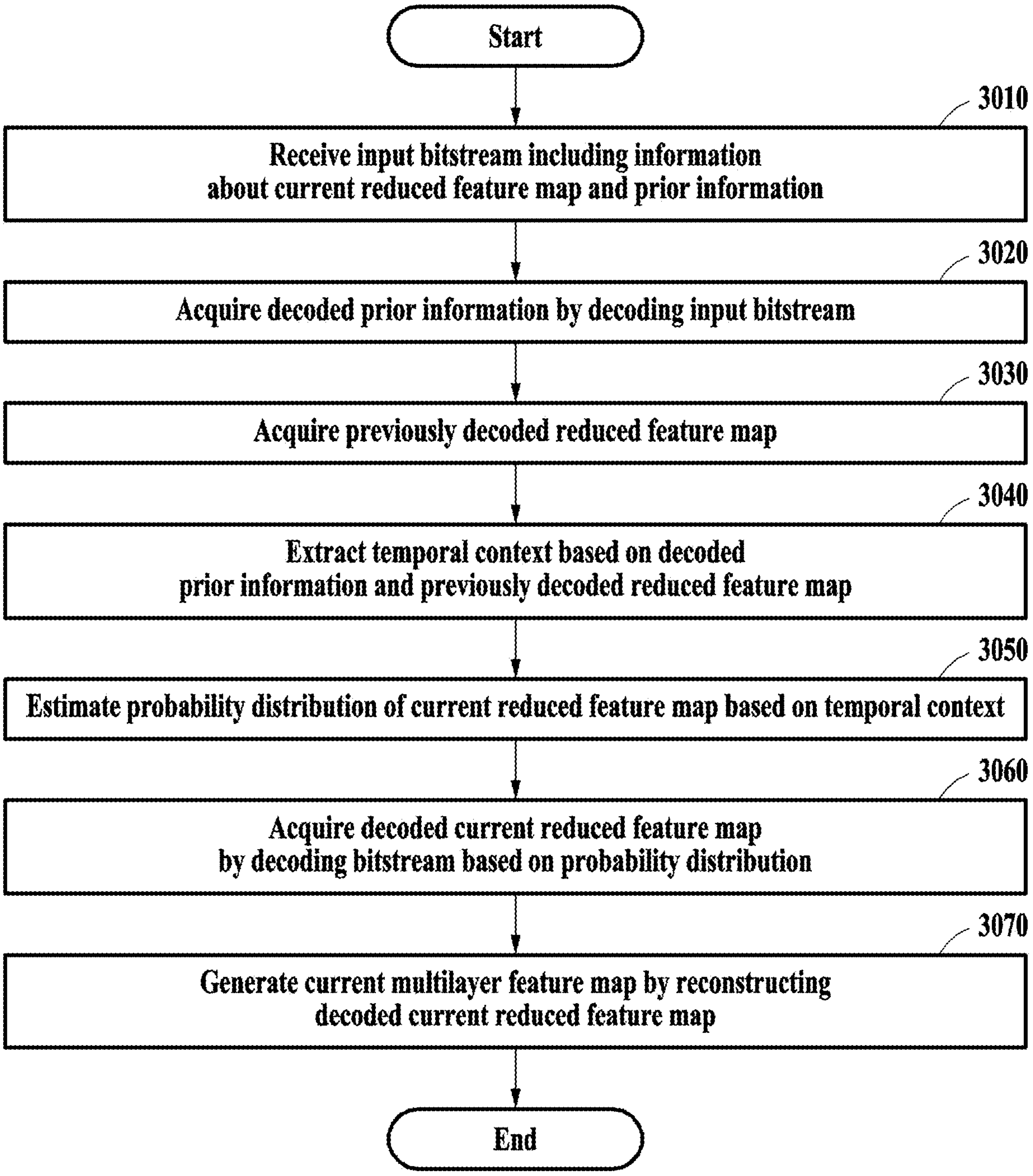
FIG. 30 is a flowchart illustrating a decoding method, according to an embodiment.

FIG. 30 is a flowchart illustrating a decoding method according to an embodiment. The description provided above with reference to FIGS. 1C through 29 may be equally applicable to the description provided below with reference to FIG. 30.

For ease of description, operations 3010 through 3070 are described as being performed using the decoder shown in FIG. 3. However, operations 3010 through 3070 may be used in any suitable system via any other suitable electronic device.

In addition, although the operations described below with reference to FIG. 30 may be performed in the illustrated order and manner, the order of some operations may be changed, or some operations may be omitted without departing from the spirit and scope of the embodiments described herein. In addition, some of the operations described below with reference to FIG. 30 may be performed in parallel or simultaneously.

At operation 3010, the decoder of one embodiment may receive an input bitstream including information about a current reduced feature map and prior information.

At operation 3020, the decoder of one embodiment may acquire decoded prior information by decoding the input bitstream. The decoder may decode the prior information included in the input bitstream.

At operation 3030, the decoder of one embodiment may acquire a previous reduced feature map.

At operation 3040, the decoder of one embodiment may extract a temporal context based on the decoded prior information and the previous reduced feature map. The decoder may extract an offset based on the decoded prior information and extract the temporal context based on the offset and the previous reduced feature map.

At operation 3050, the decoder of one embodiment may estimate a probability distribution of the current reduced feature map based on the temporal context.

At operation 3060, the decoder of one embodiment may acquire a decoded current reduced feature map by decoding the bitstream based on the probability distribution. The decoder may decode the information about the current reduced feature map included in the input bitstream.

At operation 3070, the decoder of one embodiment may generate a current multilayer feature map by reconstructing the decoded current reduced feature map. Based on the decoded current reduced feature map and the previous reduced feature map, the decoder may generate an intermediate reduced feature map and reconstruct the intermediate reduced feature map to generate the current multilayer feature map. In particular, in a first reconstruction operation, the decoder may perform channel-wise scaling on the decoded current reduced feature map to generate the intermediate reduced feature map, and reconstruct the intermediate reduced feature map to generate the current multilayer feature map. The first reconstruction operation may correspond to the intra-screen reconstruction process described above. In a second reconstruction operation, the decoder may perform channel-wise scaling on the decoded current reduced feature map to generate the intermediate reduced feature map based on a result of the scaling and the previous reduced feature map, and reconstruct the intermediate reduced feature map to generate the current multilayer feature map. The second reconstruction operation may correspond to the inter-screen reconstruction process described above.

Figure 31:
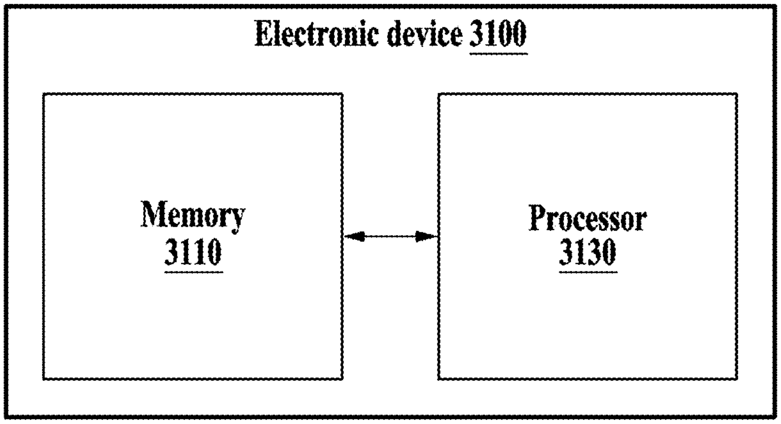
FIG. 31 is a diagram illustrating an example of an electronic device, according to an embodiment.

FIG. 31 is a diagram illustrating an example of an electronic device according to an embodiment. The description provided above with reference to FIGS. 1C through 30 may be equally applicable to the description provided below with reference to FIG. 31. For example, an electronic device 3100 may include the encoder described above with reference to FIG. 2.

Referring to FIG. 31, the electronic device 3100 of one embodiment may include a memory 3110 and a processor 3130.

The memory 3110 may store instructions (e.g., programs) executable by the processor 3130. The instructions may include, for example, instructions for executing operations of the processor 3130 and/or instructions for executing operations of each component of the processor 3130.

The memory 3110 may be implemented as a volatile memory device or a non-volatile memory device.

The volatile memory device may be implemented as, for example, a dynamic random-access memory (DRAM), a static random-access memory (SRAM), a thyristor RAM (T-RAM), a zero-capacitor RAM (Z-RAM), or a twin-transistor RAM (TTRAM).

The non-volatile memory device may be implemented as, for example, an electrically erasable programmable read-only memory (EEPROM), a flash memory, a magnetic RAM (MRAM), a spin-transfer torque (STT)-MRAM (STT-MRAM), a conductive bridging RAM (CBRAM), a ferro-electric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

The processor 3130 may process data stored in the memory 3110. The processor 3130 may execute computer-readable code (e.g., software) stored in the memory 3110 and execute instructions triggered by the processor 3130.

The processor 3130 may be a hardware-implemented data processing device with a physically structured circuit for executing desired operations. The desired operations may include, for example, code or instructions included in a program.

The hardware-implemented data processing device may include, for example, a microprocessor, a central processing unit (CPU), a processor core, a multi-core processor, a multiprocessor, an application-specific integrated circuit (ASIC), or a field-programmable gate array (FPGA).

The encoder of FIG. 2 may be stored in the memory 3110 and executed by the processor 3130 or may be embedded in the processor 3130. The processor 3130 may perform substantially similar and/or the same operations of the encoder described above with reference to FIGS. 1C through 29, and consequently repeated descriptions thereof may be omitted for the sake of brevity.

Figure 32:
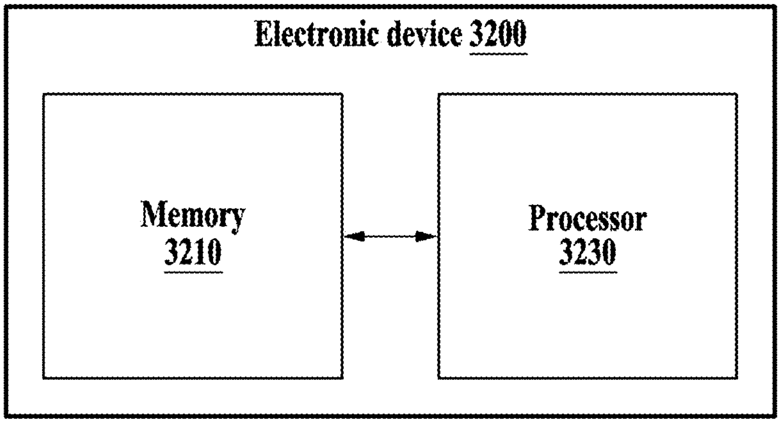
FIG. 32 is a diagram illustrating an example of an electronic device, according to an embodiment.

FIG. 32 is a diagram illustrating an example of an electronic device according to an embodiment. The description provided above with reference to FIGS. 2A through 30 may be equally applicable to the description provided below with reference to FIG. 32. For example, an electronic device 3200 may include the decoder described above with reference to FIG. 3.

Referring to FIG. 32, the electronic device 3200 of one embodiment may include a memory 3210 and a processor 3230.

The memory 3210 may store instructions (e.g., programs) executable by the processor 3230. The instructions may include, for example, instructions for executing operations of the processor 3230 and/or instructions for executing operations of each component of the processor 3230.

The memory 3210 may be implemented as a volatile memory device or a non-volatile memory device.

The volatile memory device may be implemented as, for example, a dynamic random-access memory (DRAM), a static random-access memory (SRAM), a thyristor RAM (T-RAM), a zero-capacitor RAM (Z-RAM), or a twin-transistor RAM (TTRAM).

The non-volatile memory device may be implemented as, for example, an electrically erasable programmable read-only memory (EEPROM), a flash memory, a magnetic RAM (MRAM), a spin-transfer torque (STT)-MRAM (STT-MRAM), a conductive bridging RAM (CBRAM), a ferro-electric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

The processor 3230 may process data stored in the memory 3210. The processor 3230 may execute computer-readable code (e.g., software) stored in the memory 3210 and execute instructions triggered by the processor 3230.

The processor 3230 may be a hardware-implemented data processing device with a physically structured circuit for executing desired operations. The desired operations may include, for example, code or instructions included in a program.

The hardware-implemented data processing device may include, for example, a microprocessor, a central processing unit (CPU), a processor core, a multi-core processor, a multiprocessor, an application-specific integrated circuit (ASIC), or a field-programmable gate array (FPGA).

The decoder of FIG. 3 may be stored in the memory 3210 and executed by processor 3230 or may be embedded in the processor 3230. The processor 3230 may perform substantially similar and/or the same operations of the decoder described above with reference to FIGS. 3A through 30, and consequently repeated descriptions thereof may be omitted for the sake of brevity.

The example embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art may appreciate that a processing device may include multiple processing elements and multiple types of processing elements. For example, a processing device may include multiple processors or a processor and a controller. In addition, different processing configurations may be possible, such as, parallel processors.

The software may include a computer program, a piece of code, an instruction, or some combination thereof, to independently or collectively instruct and/or configure the processing device to operate as desired. The software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, or the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as compact disc read-only memory (CD-ROM) discs, digital versatile discs (DVDs), and/or Blue-ray discs; magneto-optical media such as optical discs; and hardware devices that are specially configured to store and perform program instructions, such as read-only memory (ROM), random access memory (RAM), flash memory (e.g., universal serial bus (USB) flash drives, memory cards, memory sticks, or the like), or the like. Examples of program instructions include both machine code, such as produced by a compiler, and files containing higher-level code that may be executed by the computer using an interpreter. The above-described hardware devices may be configured to act as one or more software modules in order to perform the operations of the above-described examples, or vice versa.

While the present disclosure includes specific examples, it is to be apparent after an understanding of the present disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An encoding method, comprising:

generating a current reduced feature map by reducing a dimension of a current multilayer feature map;

generating a scaled current reduced feature map by performing channel-wise scaling on the current reduced feature map;

extracting prior information based on the scaled current reduced feature map;

acquiring a scaled previous reduced feature map;

extracting a temporal context based on the prior information and the scaled previous reduced feature map;

estimating a probability distribution of the current reduced feature map based on the temporal context; and encoding the current reduced feature map based on the probability distribution.

2. The encoding method of claim 1, wherein the acquiring of the scaled previous reduced feature map comprises:

acquiring a previous reduced feature map from a buffer memory; and acquiring the scaled previous reduced feature map by performing channel-wise scaling on the previous reduced feature map.

3. The encoding method of claim 1, wherein the acquiring of the scaled previous reduced feature map comprises:

acquiring the scaled previous reduced feature map from a buffer memory.

4. The encoding method of claim 1, wherein the extracting of the prior information comprises:

extracting the prior information based on the scaled current reduced feature map and the scaled previous reduced feature map.

5. The encoding method of claim 1, further comprising:

acquiring a first scaled previous reduced feature map by performing channel-wise scaling on a previous reduced feature map, based on a first scaling parameter; and acquiring a second scaled previous reduced feature map by performing channel-wise scaling on the previous reduced feature map, based on a second scaling parameter, wherein the extracting of the temporal context comprises extracting the temporal context based on the prior information and the first scaled previous reduced feature map, and wherein the extracting of the prior information comprises extracting the prior information based on the scaled current reduced feature map and the second scaled previous reduced feature map.

6. The encoding method of claim 1, wherein the extracting of the temporal context comprises:

extracting an offset based on the prior information; and extracting the temporal context based on the offset and the scaled previous reduced feature map.

7. The encoding method of claim 1, wherein the generating of the current reduced feature map comprises:

generating the current reduced feature map based on the current multilayer feature map and the scaled previous reduced feature map.

8. The encoding method of claim 1, wherein the generating of the current reduced feature map comprises:

generating an intermediate latent feature map by reducing the current multilayer feature map; and generating the current reduced feature map based on the intermediate latent feature map and the scaled previous reduced feature map.

9. The encoding method of claim 8, wherein the generating of the current reduced feature map comprises:

concatenating, in a second reduction operation, the intermediate latent feature map and the scaled previous reduced feature map to generate a concatenated feature map, and wherein the generating of the scaled current reduced feature map comprises:

performing channel-wise scaling on the concatenated feature map to generate the current reduced feature map.

10. The encoding method of claim 1, further comprising:

generating a quantized reduced feature map by quantizing the current reduced feature map, wherein the extracting of the prior information comprises:

extracting the prior information based on at least one of the scaled current reduced feature map or the quantized reduced feature map.

11. The encoding method of claim 10, further comprising:

storing the quantized reduced feature map in a buffer memory, wherein the acquiring of the scaled previous reduced feature map comprises:

acquiring a previously quantized reduced feature map from the buffer memory.

12. The encoding method of claim 1, further comprising:

generating quantized prior information by quantizing the prior information, wherein the extracting of the temporal context comprises:

extracting the temporal context based on the quantized prior information and the scaled previous reduced feature map.

13. The encoding method of claim 1, further comprising:

extracting a prior context based on the prior information, wherein the estimating of the probability distribution comprises:

estimating the probability distribution based on the temporal context and the prior context.

14. The encoding method of claim 13, further comprising:

extracting a spatial context based on the scaled current reduced feature map, wherein the estimating of the probability distribution comprises:

estimating the probability distribution based on the temporal context, the prior context, and the spatial context.

15. The encoding method of claim 13, further comprising:

extracting a channel context based on the scaled current reduced feature map, wherein the estimating of the probability distribution comprises:

estimating the probability distribution based on the temporal context, the prior context, and the channel context.

16. A decoding method, comprising:

receiving an input bitstream comprising information about a scaled current reduced feature map and prior information;

acquiring decoded prior information by decoding the input bitstream;

acquiring a scaled previous reduced feature map;

extracting a temporal context based on the decoded prior information and the scaled previous reduced feature map;

estimating a probability distribution of the scaled current reduced feature map, based on the temporal context;

acquiring a decoded scaled current reduced feature map by decoding the input bitstream, based on the probability distribution;

reconstructing a current reduced feature map by performing channel-wise scaling on the decoded scaled current reduced feature map; and generating a current multilayer feature map by reconstructing the reconstructed current reduced feature map.

17. The decoding method of claim 16, wherein the acquiring of the scaled previous reduced feature map comprises:

acquiring the scaled previous reduced feature map from a buffer memory.

18. The decoding method of claim 17, wherein the extracting of the temporal context comprises:

extracting the temporal context based on the decoded prior information and the scaled previous reduced feature map.

19. The decoding method of claim 16, wherein the extracting of the temporal context comprises:

extracting an offset based on the decoded prior information; and extracting the temporal context based on the offset and the scaled previous reduced feature map.

20. An electronic device, comprising:

at least one processor comprising processing circuitry; and a memory storing instructions, wherein the instructions, when executed individually or collectively by the at least one processor, cause the electronic device to:

receive an input bitstream comprising information about a scaled current reduced feature map and prior information;

acquire decoded prior information by decoding the input bitstream;

acquire a scaled previous reduced feature map;

extract a temporal context based on the decoded prior information and the scaled previous reduced feature map;

estimate a probability distribution of the scaled current reduced feature map, based on the temporal context;

acquire a decoded scaled current reduced feature map by decoding the input bitstream, based on the probability distribution;

reconstruct a current reduced feature map by performing channel-wise scaling on the decoded scaled current reduced feature map; and generate a current multilayer feature map by reconstructing the decoded scaled current reduced feature map.

* * * * *